(12) United States Patent
Hayashi

(10) Patent No.: US 12,273,494 B2
(45) Date of Patent: Apr. 8, 2025

(54) INFORMATION PROCESSING APPARATUS, INFORMATION PROCESSING SYSTEM, AND INFORMATION PROCESSING METHOD FOR COUNTING USAGE HISTORY OF COMPONENT

(71) Applicant: Yuuichiroh Hayashi, Kanagawa (JP)

(72) Inventor: Yuuichiroh Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/349,272

(22) Filed: Jul. 10, 2023

(65) Prior Publication Data

US 2023/0353694 A1 Nov. 2, 2023

Related U.S. Application Data

(63) Continuation of application No. 17/809,676, filed on Jun. 29, 2022, now Pat. No. 11,743,410.

(30) Foreign Application Priority Data

Jul. 20, 2021 (JP) .................................. 2021-119205

(51) Int. Cl.
*H04N 1/32* (2006.01)
*H04N 1/00* (2006.01)
*H04N 1/34* (2006.01)

(52) U.S. Cl.
CPC ..... *H04N 1/32368* (2013.01); *H04N 1/00949* (2013.01); *H04N 1/346* (2013.01)

(58) Field of Classification Search
None
See application file for complete search history.

(56) References Cited

U.S. PATENT DOCUMENTS 7,916,324 B2 3/2011 Tanaka
7,916,327 B2 3/2011 Yamaguchi
(Continued)

FOREIGN PATENT DOCUMENTS

| JP | 2008-065702 | | 3/2008 |
|----|----|----|----|
| JP | 2014134872 | A * | 7/2014 |
| JP | 2017-142766 | | 8/2017 |

OTHER PUBLICATIONS

JP-2014134872-A English Translation (Year: 2014).*

*Primary Examiner* — Miya J Cato
(74) *Attorney, Agent, or Firm* — IPUSA, PLLC

(57) ABSTRACT

An information processing apparatus, an information processing system, and an information processing method. The information processing apparatus executes a predetermined workflow including a component whose usage history is to be counted, transmits to a user terminal through a communication network, count target contract input screen information for displaying a count target contract input screen on a display of the user terminal, the count target contract input screen associating a predetermined count target contract with the predetermined workflow, in response to an operation on the count target contract input screen displayed on the display of the user terminal based on the count target contract input screen information, associates the predetermined workflow with predetermined count target contract information indicating the predetermined count target contract, and in response to an execution of the predetermined workflow, counts the usage history of the component included in the predetermined workflow in association with the predetermined count target contract.

13 Claims, 43 Drawing Sheets

(56) References Cited

U.S. PATENT DOCUMENTS

| | | | |
|---|---|---|---|
| 2001/0034745 A1* | 10/2001 | Ishii | G06Q 10/10 |
| | | | 715/255 |
| 2007/0013943 A1 | 1/2007 | Sawayanagi et al. | |
| 2013/0003119 A1 | 1/2013 | Yamaguchi | |
| 2016/0259933 A1 | 9/2016 | Sugimura et al. | |
| 2016/0266977 A1 | 9/2016 | Hayashi et al. | |
| 2017/0230526 A1 | 8/2017 | Hayashi et al. | |
| 2017/0255486 A1 | 9/2017 | Zhang et al. | |
| 2018/0343352 A1 | 11/2018 | Hayashi et al. | |
| 2020/0097162 A1 | 3/2020 | Hayashi et al. | |
| 2020/0366810 A1* | 11/2020 | Tanaka | H04N 1/342 |
| 2020/0396343 A1 | 12/2020 | Hayashi | |
| 2021/0019199 A1 | 1/2021 | Hayashi | |
| 2021/0304145 A1* | 9/2021 | Arai | G06Q 10/063118 |
| 2022/0191341 A1* | 6/2022 | Ikeda | H04N 1/00949 |
| 2022/0276859 A1 | 9/2022 | Brevoort et al. | |
| 2023/0010119 A1 | 1/2023 | Hayashi | |

\* cited by examiner

FIG. 6A

| APPLICATION ID | APPLICATION NAME | COMPONENT ID | APPLICATION PROCESSING INFORMATION |
|---|---|---|---|
| A10000 | WORKFLOW APPLICATION A | CA01(OCR), CB01(FILE UPLOAD) | ... |
| A10001 | WORKFLOW APPLICATION B | CA01(OCR), CT00001(COUNT), CA02(IMAGE CONVERSION), CB01(FILE UPLOAD) | ... |
| A10002 | WORKFLOW APPLICATION C | CA01(OCR), CT00002(COUNT), CB02(EMAIL TRANSMISSION) | ... |
| A10003 | WORKFLOW APPLICATION D | CA01(OCR), CB02(EMAIL TRANSMISSION), CT00003(COUNT), CT00004(COUNT) | ... |
| ... | ... | ... | ... |

FIG. 6B

| APPLICATION ID | APPLICATION NAME | COMPONENT ID | APPLICATION PROCESSING INFORMATION |
|---|---|---|---|
| A10000 | WORKFLOW APPLICATION A | CA01(OCR), CB01(FILE UPLOAD) | ... |
| A10001 | WORKFLOW APPLICATION B | CA01(OCR), CONDITION 1, CA02(IMAGE CONVERSION), CB01(FILE UPLOAD) | ... |
| A10002 | WORKFLOW APPLICATION C | CA01(OCR), CONDITION 2, CB02(EMAIL TRANSMISSION) | ... |
| A10003 | WORKFLOW APPLICATION D | CA01(OCR), CB02(EMAIL TRANSMISSION), CONDITION 3, CONDITION 4 | ... |
| ... | ... | ... | ... |

FIG. 7

```
[
    {
        "data_id": 1,
        "data_key": "storage_filename",
        "format": "input_text",
        "data_source": null
    },
    {
        "data_id": 2,
        "data_key": "storage_targetfolder",
        "format": "select",
        "data_source": http://sample.ricoh.xxx/service-a/folders
    }
]
```

FIG. 8

```
[
  {
    "data_id": 1,
    "display_name": "file name",
    "layout" : {
      "order": 1
    }
  },
  {
    "data_id": 2,
    "display_name": "destination",
    "layout": {
      "order": 2
    }
  }
]
```

FIG. 9

| APPLICATION ID | COMPONENT ID | SETTINGS INFORMATION |
|---|---|---|
| A10000 | CA01 | { "operation":"ocr", "parameters":{ "language":["Japanese", "Chinese", "Thai"] } } |
| A10001 | CB02 | { "operation":"sendMail", "parameters":["to", "cc"] } |
| ... | ... | ... |

FIG. 10

| CONTRACT ID | TENANT ID | APPLICA- TION ID | USER ACCOUNT | BILLING CONDITIONS ||| 
| --- | --- | --- | --- | --- | --- | --- |
| | | | | BILLING FREQUENCY | BILLING UNIT | CALCULATION FORMULA |
| CONTR1001 | TENANT A | A10001 | ABC@MMM.COM DEF@MMM.COM ... | MONTHLY | BY CONTRACT | JPY30/PROCESSING JPY15/PAGE |
| CONTR1002 | TENANT B | A10002 | XXX@NNN.COM YYY@NNN.COM ... | WEEKLY | BY TENANT | JPY9/PAGE |
| CONTR1003 | TENANT A | A10003 | ... | AT EACH USAGE | BY USER | JPY20/PAGE |
| ... | ... | ... | ... | ... | ... | ... |

FIG. 11A

| COUNT SETTING ID | COUNT SETTING (CONDITIONAL EXPRESSION) |
| --- | --- |
| C00001 | ocr_pages |
| C00002 | ocr_pages |
| C00003 | ocr_pages |
| C00004 | ocr_jp_pages |
| C00005 | ocr_pages >= 5 |
| C00006 | executions |
| ... | ... |

FIG. 11B

| CONDITION | COUNT SETTING (CONDITIONAL EXPRESSION) |
| --- | --- |
| 1 | ocr_pages |
| 2 | ocr_pages |
| 3 | ocr_pages |
| 4 | ocr_jp_pages |
| 5 | ocr_pages >= 5 |
| 6 | executions |
| ... | ... |

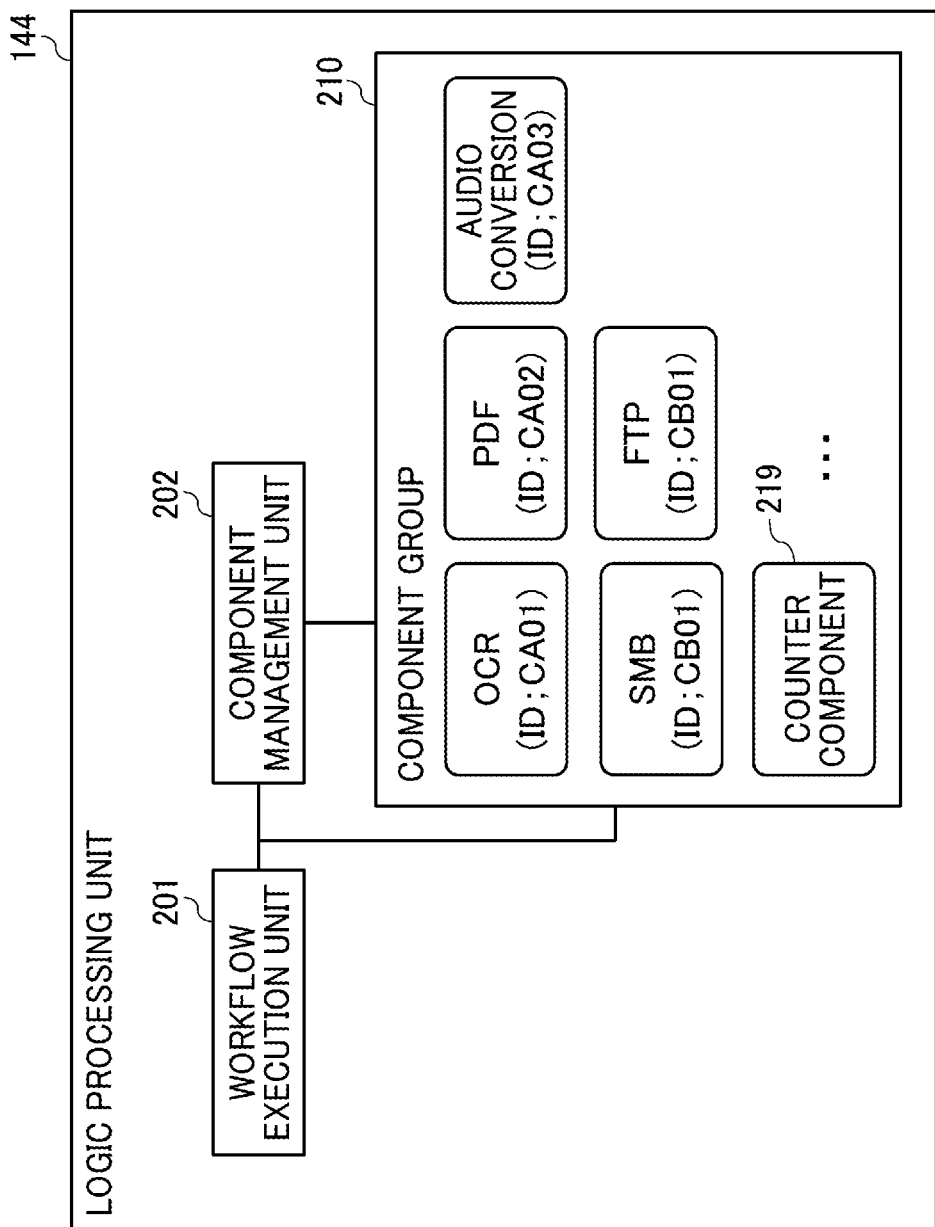

FIG. 16

```
{
  "ocr": {
    "filename": "output.pdf",
    "fileSize": 307200,
    "pages": 5
  }
}
```

FIG. 22

| CONTRACT ID | TENANT ID | USER ACCOUNT (ADMINISTRATOR ID) | BILLING TARGET CONTRACT | BILLING DESTINA-TION | DEFAULT PARAMETERS ||| |
|---|---|---|---|---|---|---|---|
| | | | | | OCR LANGUAGE | BLANK PAGE REMOVAL | DELIVERY DESTINATION |
| CONTR 1001 | TENANT A | UVW@.MMM.COM XYZ@.MMM.COM ... | PERSONNEL DEPARTMENT CONTRACT | PERSONNEL DEPARTMENT | JAPANESE | YES | FOLDER A |
| CONTR 1002 | TENANT B | AAA@.NNN.COM BBB@.NNN.COM ... | DEVELOPMENT DEPARTMENT CONTRACT | DEVELOPMENT DEPARTMENT | ENGLISH | NO | FOLDER B |
| CONTR 1003 | TENANT A | ... | SALES DEPARTMENT CONTRACT | SALES DEPARTMENT | CHINESE | YES | HTTPS://... |
| ... | ... | ... | ... | ... | ... | ... | ... |

FIG. 23

| CONTRACT ID | TENANT ID | APPLICATION ID |
|---|---|---|
| CONTR 1001 | TENANT A | A10001 |
| CONTR 1002 | TENANT B | A10002 A10003 |
| CONTR 1003 | TENANT A | A10003 |
| CONTR 1004 | TENANT C | A10004 |
| ... | ... | ... |

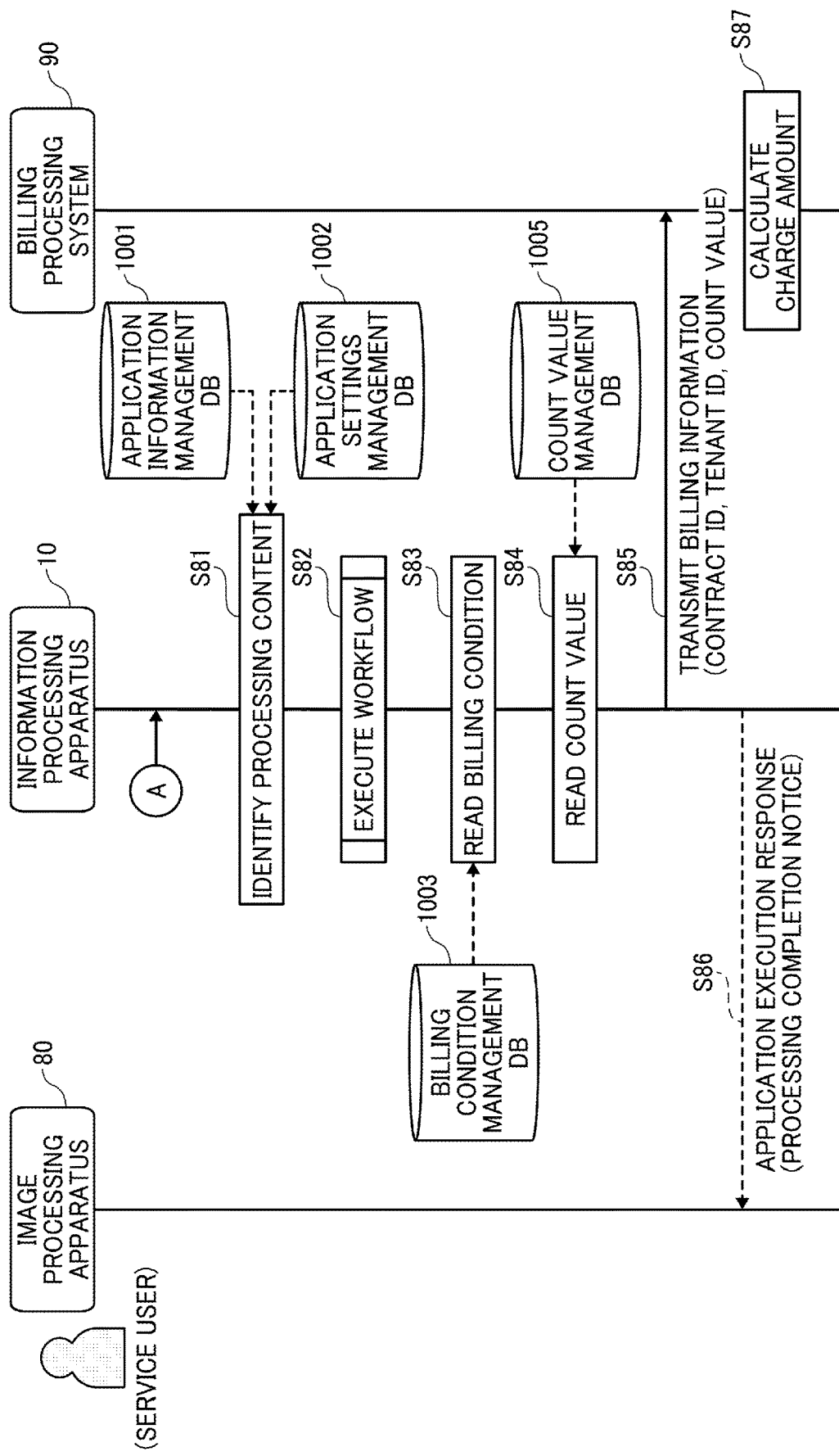

FIG. 34A

| CONTRACT ID | TENANT ID | USER ACCOUNT | COUNT VALUE |
|---|---|---|---|
| CONTR 1001 | - | - | 20 |
| - | TENANT A | - | 10 |
| - | - | ABC@.MMM.COM | 30 |
| ... | ... | ... | ... |

FIG. 34B

| CONTRACT ID | TENANT ID | USER ACCOUNT | KEYWORD | COUNT VALUE |
|---|---|---|---|---|
| CONTR 1001 | TENANT A | - | OCR_PAGES | 20 |
| - | - | ABC@MMM.COM | OCR_PAGES | 10 |
| CONTR 1006 | - | - | OCR_PAGES | 30 |
| ... | ... | ... | EXECUTIONS | 15 |
| | | | ... | ... |

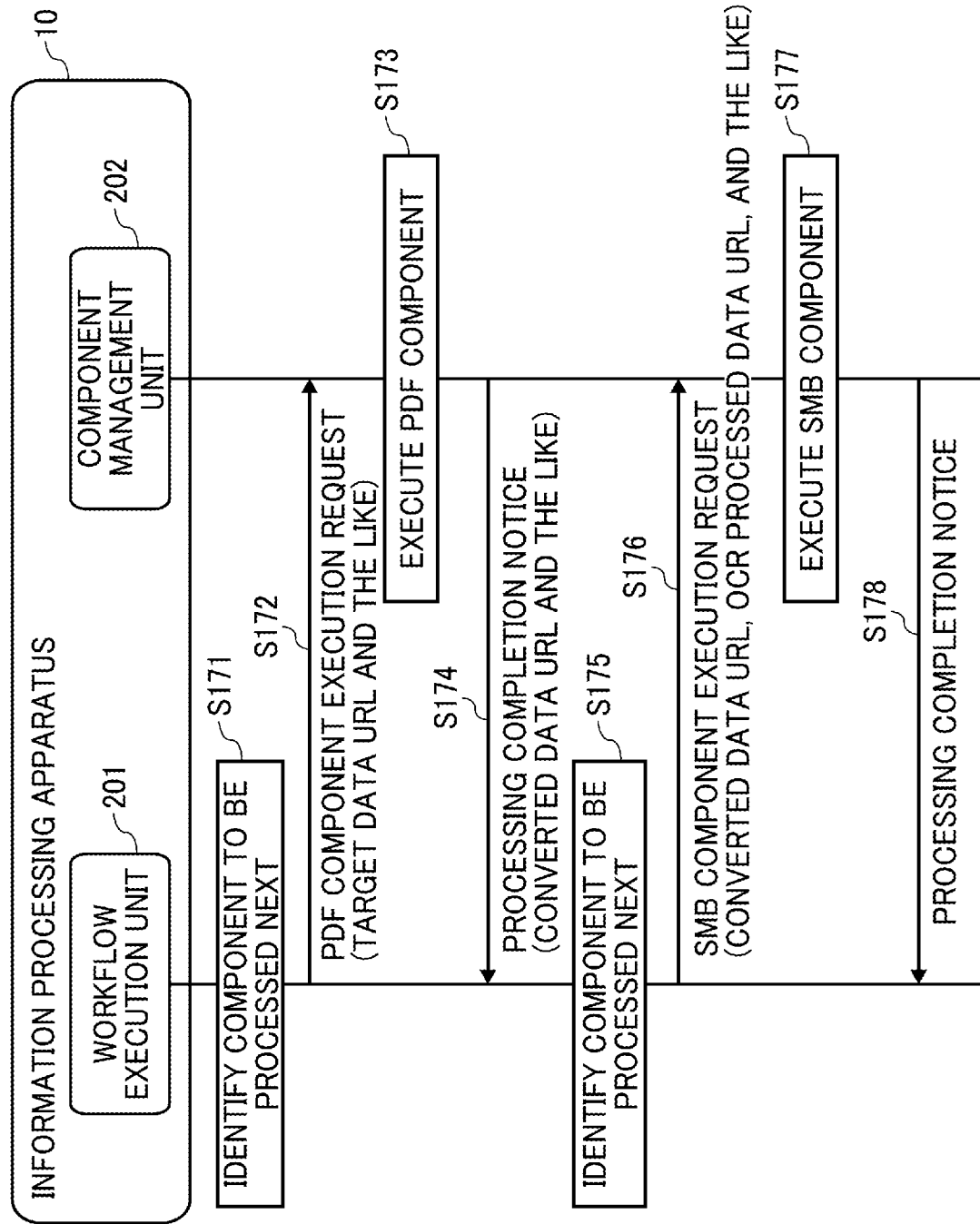

INFORMATION PROCESSING APPARATUS, INFORMATION PROCESSING SYSTEM, AND INFORMATION PROCESSING METHOD FOR COUNTING USAGE HISTORY OF COMPONENT

CROSS-REFERENCE TO RELATED APPLICATIONS

This present application is a continuation of U.S. patent application Ser. No. 17/809,676 filed on Jun. 29, 2022, which is based on and claims priority to Japanese Patent Application No. 2021-119205, filed on Jul. 20, 2021, in the Japan Patent Office, the entire disclosure of which is hereby incorporated by reference herein.

BACKGROUND

Technical Field

The present disclosure relates to an information processing apparatus, an information processing system, and an information processing method.

Related Art

In recent years, services that provide functions combining a plurality of functions (for example, scanning, printing, mail delivery, etc.) have become known. For example, a service in which an electronic file (image file) generated by scanning is processed in a certain way and then delivered by an email is known. Such a service is provided by executing one or more processes that implement each function as a series of processes.

SUMMARY

Embodiments of the present disclosure describe an information processing apparatus, an information processing system, and an information processing method. The information processing apparatus executes a predetermined workflow including a component whose usage history is to be counted, transmits to a user terminal through a communication network, count target contract input screen information for displaying a count target contract input screen on a display of the user terminal, the count target contract input screen associating a predetermined count target contract with the predetermined workflow, in response to an operation on the count target contract input screen displayed on the display of the user terminal based on the count target contract input screen information, associates the predetermined workflow with predetermined count target contract information indicating the predetermined count target contract, and in response to an execution of the predetermined workflow, counts the usage history of the component included in the predetermined workflow in association with the predetermined count target contract.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6A is a table illustrating an example of an application information management table;

FIG. 6B is a table illustrating another example of the application information management table;

FIG. 7 is a conceptual diagram illustrating an example of a data definition;

FIG. 8 is a conceptual diagram illustrating an example of layout information;

FIG. 9 is a table illustrating an example of an application settings management table;

FIG. 10 is a table illustrating an example of a billing conditions management table;

FIG. 11A is a table illustrating an example of a count setting management table;

FIG. 11B is a table illustrating another example of the count setting management table;

FIG. 12 is a block diagram illustrating an example of a detailed configuration of a logic processing unit;

FIG. 16 is a conceptual diagram illustrating an example of output data after executing an optical character recognition (OCR) process;

FIG. 22 is a table illustrating an example of a contract information management table;

FIG. 23 is a table illustrating an example of an available application management table;

FIG. 32 is a sequence diagram illustrating an example of a workflow execution process;

FIG. 34A is a table illustrating an example of a count value management table;

FIG. 34B is a table illustrating another example of the count value management table;

FIGS. 36A and 36B are a sequence diagram illustrating an example of detailed process of executing the workflow according to the second embodiment.

Figure 1:
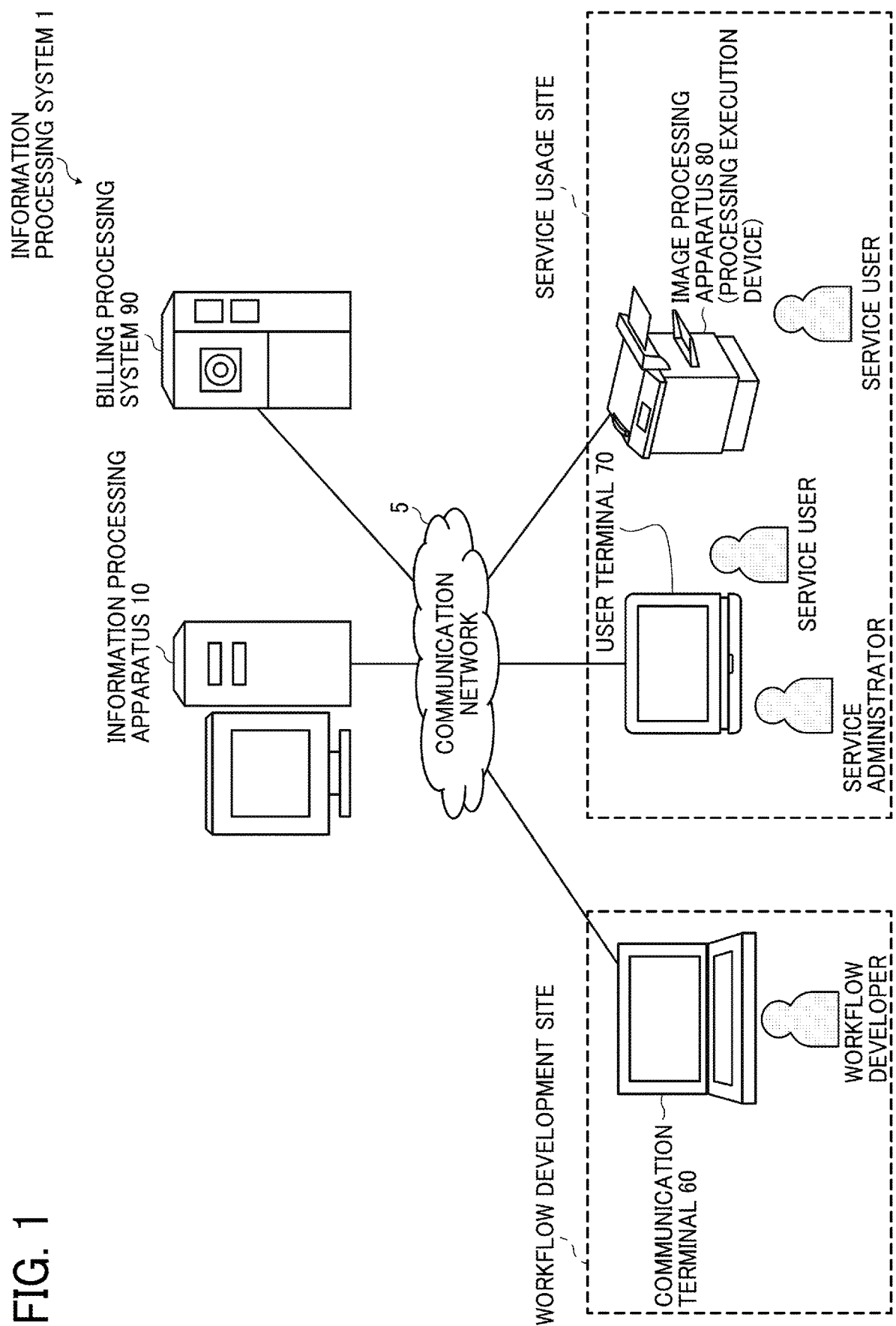
FIG. 1 is a diagram illustrating an example of an overall configuration of an information processing system.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present disclosure are described with reference to the drawings. In the description of the drawings, the same elements are denoted by the same reference numerals, and redundant descriptions thereof are omitted.

FIG. 1 is a diagram illustrating an example of an overall configuration of an information processing system according to a first embodiment of the present disclosure. In the information processing system 1 illustrated in FIG. 1, a workflow developer creates or updates an application that executes a service provided by an information processing apparatus 10.

The information processing system 1 includes the information processing apparatus 10, a communication terminal 60, an image processing apparatus 80, and a billing processing system 90. The information processing apparatus 10, the communication terminal 60, a user terminal 70, the image processing apparatus 80, and the billing processing system 90 included in the information processing system 1 communicates with each other through a communication network 5. The communication network 5 is implemented by the internet, a mobile communication network, a local area network (LAN), and the like. The examples of the communication network 5 include in addition to wired communication, wireless communication networks such as 3rd Generation (3G), 4th Generation (4G), 5th Generation (5G), WIRELESS FIDELITY (Wi-Fi, a registered trademark), Worldwide Interoperability for Microwave Access (WiMAX), and Long Term Evolution (LTE). Further, the information processing apparatus 10, the communication terminal 60, the user terminal 70, and the image processing apparatus 80 may be provided with a communication function by a short-range communication technique such as NFC (Near Field Communication). The information processing system 1 may provide a firewall between each apparatus and each terminal connected to the communication network 5 and implement a private network such as the LAN inside the firewall.

The information processing apparatus 10 provides various services through the communication network 5. The information processing apparatus 10 provides, for example, a billing service in which an electronic file generated by scanning a document by the image processing apparatus 80 of a service usage site is processed by OCR and usage information is transmitted to the billing processing system 90. Further, the information processing apparatus 10 provides, for example, a service (cloud print service) for printing an electronic file stored in a cloud system that provides a predetermined service with an image processing apparatus 80 at a service usage site.

The services provided by the information processing apparatus 10 are not limited to the services described above. For example, a service that projects an electronic file stored in the cloud system that provides the predetermined service with a projector installed in the service usage site, or a service that translates an electronic file generated by scanning a document by the image processing apparatus 80 into a specific language (for example, from English to Japanese) after OCR processing and saves the electronic file in the cloud system that provides a predetermined service may be included. Further, in the first embodiment, the information processing apparatus 10 provides the cloud service as described above, but the information processing apparatus 10 may provide, for example, a service or a web service provided by an application service provider (ASP), and various services may be provided through the communication network 5.

Further, the information processing apparatus 10 includes a workflow application that provides various services implemented by a series of processes in which one or more of a plurality of processes that implements various functions are combined. Here, the function is a function related to an electronic file such as a document file or an image file. Functions include, for example, printing, scanning, facsimile transmission, data format conversion, email delivery, OCR processing, file processing, compression, decompression, or storage in a repository.

Figure 2:
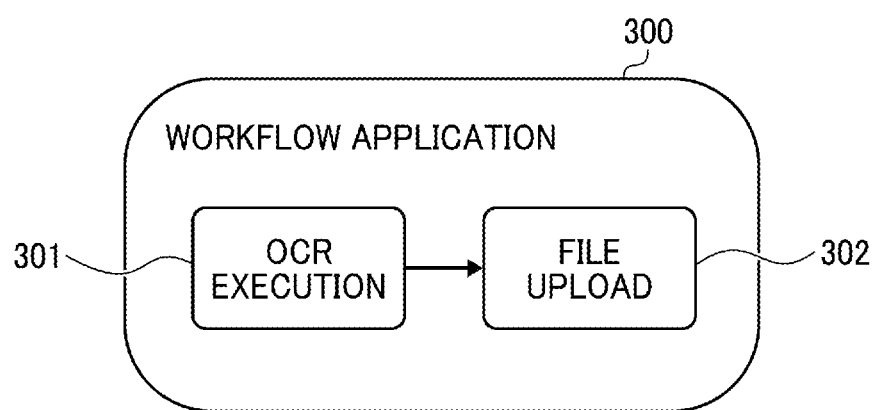
FIG. 2 is a diagram illustrating an example of a workflow application.

An outline of the workflow application is described with reference to FIG. 2. FIG. 2 is a diagram illustrating an example of the workflow application. The workflow application (workflow) is, for example, an application configured by combining a plurality of components (functions) to provide service according to a workflow desired by a user. Some workflow applications may not be made of in-house components, but may also be developed in combination with components produced by a third party such as a development partner. Accordingly, even in one application, set values (specifications) between individual components included in the application may not match. Therefore, in order to manage the workflow application, the set value for each component included in the application is to be shared.

The workflow application 300 illustrated in FIG. 2 includes a combination of an OCR processing component 301 and a file upload component 302. The number of components included in the workflow application 300 is not limited to two and may be appropriately set according to the workflow desired by the user. Hereinafter, the workflow application in the first embodiment is referred to as an application.

Returning to FIG. 1, the billing processing system 90 is, for example, an external system that manages subscriptions of various executed applications. Specifically, the billing processing system 90 counts usage history (log information including the number of times of processing and the usage amount) of each component included in a specific application executed by the image processing apparatus 80 and performs billing corresponding to the usage history. The billing processing system 90 stores (uploads), for example, the number of pages of an OCR-processed electronic file as a count value (usage amount) in a storage area assigned by the billing processing system 90 in a scan distribution service.

The information processing apparatus 10 and the billing processing system 90 may be implemented by a single computer, or may be implemented by a plurality of computers each computer being assigned with each unit (function) of each device. Alternatively, the information processing apparatus 10 and the billing processing system 90 may be, for example, a single computer in which all or a part of the functions are integrated. Further, all or a part of the functions of the information processing apparatus 10 may be a server computer residing in a cloud environment or a server computer residing in an on-premises environment.

The communication terminal 60 is a computer such as a personal computer (PC) used by the workflow developer who develops the application for providing a service by the information processing apparatus 10. The workflow developer develops the application by using an application development tool provided by the information processing apparatus 10 at a workflow development site. The application development tool is software for developing the workflow application. The application development tool enables to select a function from a plurality of functions and register and execute a series of processes connecting the functions as a workflow. The workflow developer implements a desired operation by combining the plurality of functions using the application development tool and selecting parameters of settings associated with the functions. The communication terminal 60 is not limited to the PC, and may be, for example, a terminal such as a tablet terminal, a smartphone, or a wearable terminal. Further, the communication terminal 60 may be used for a system developer of the information processing system 1 to develop a system in addition to the workflow developer described above for developing the application.

The user terminal 70 is a computer such as a PC used by the service administrator who inputs settings related to workflow operations to the information processing apparatus 10 and selects and sets a billing target contract, or the like concluded with at least one tenant. The service administrator executes the application at the service usage site by using the service usage tool provided by the information processing apparatus 10.

An application usage tool is software for selecting an application from a plurality of applications, after selecting a billing contract associated with the selected application, and executing a series of processes related to the application associated with the billing contract as a workflow. The service administrator allows the service user to execute the workflow operation based on the desired contract (billing contract) by associating the application and the billing target contract selected using the service usage tool. The user terminal 70 is not limited to the PC, and may be, for example, a terminal such as the tablet terminal, the smartphone, or the wearable terminal. In the first embodiment, the user terminal 70 functions as an example of the user terminal.

The image processing apparatus 80 is used by the service user who uses the service provided by the information processing apparatus 10. The image processing apparatus 80 is, for example, an image forming apparatus including a communication function and an image processing function, such as a multifunction peripheral (MFP), a facsimile, a scanner, or a printer. The service user performs processing related to the service provided by the information processing apparatus 10 using the image processing apparatus 80 in the service usage site.

Examples of the devices installed in the service usage site are not limited to the image processing apparatus 80, and may include a projector (PJ), an interactive whiteboard (IWB: whiteboard including an electronic whiteboard function capable of mutual communication), the PC, an industrial machine such as a machine tool, a medical device, a three dimensional (3D) printer or an imaging device, an air conditioning system, an autonomous traveling robot, or the like. Further, in addition to the devices installed at a specific place in the service usage site, the image processing apparatus 80 may be a portable handy printer, a handy scanner, or the like. Further, in the first embodiment, the service administrator or the service user may be simply referred to as a user.

Further, when the information processing apparatus 10 transmits data (information) to the communication terminal 60, the information processing apparatus 10 may notify the communication terminal 60 by a push notice (transmission). The information processing apparatus 10 may perform the push notice using, for example, Firebase Cloud Messaging (FCM), which is an example of a push notice server.

Figure 3:
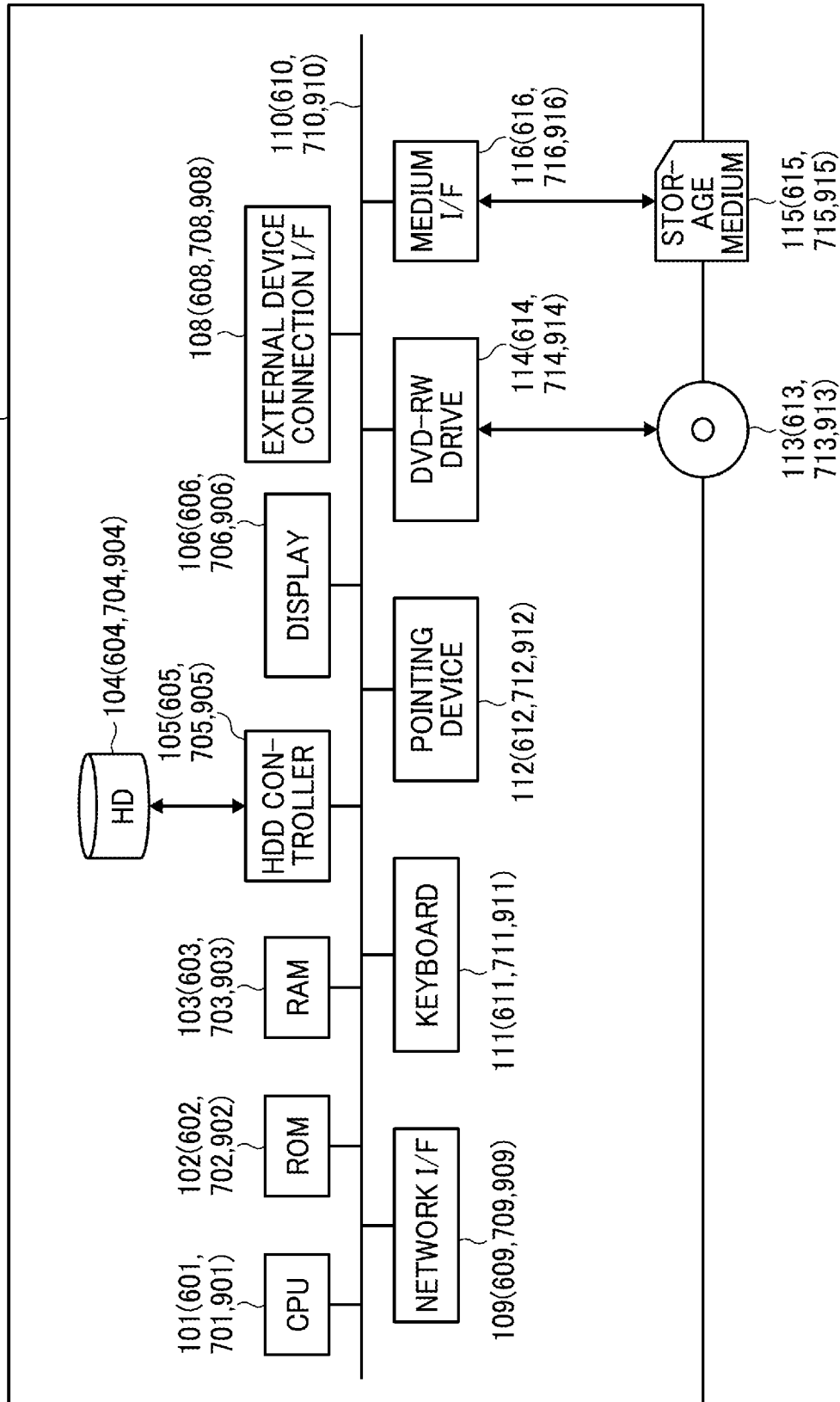
FIG. 3 is a block diagram illustrating an example of a hardware configuration of an information processing apparatus, a communication terminal, a user terminal, and a billing processing system.
Figure 4:
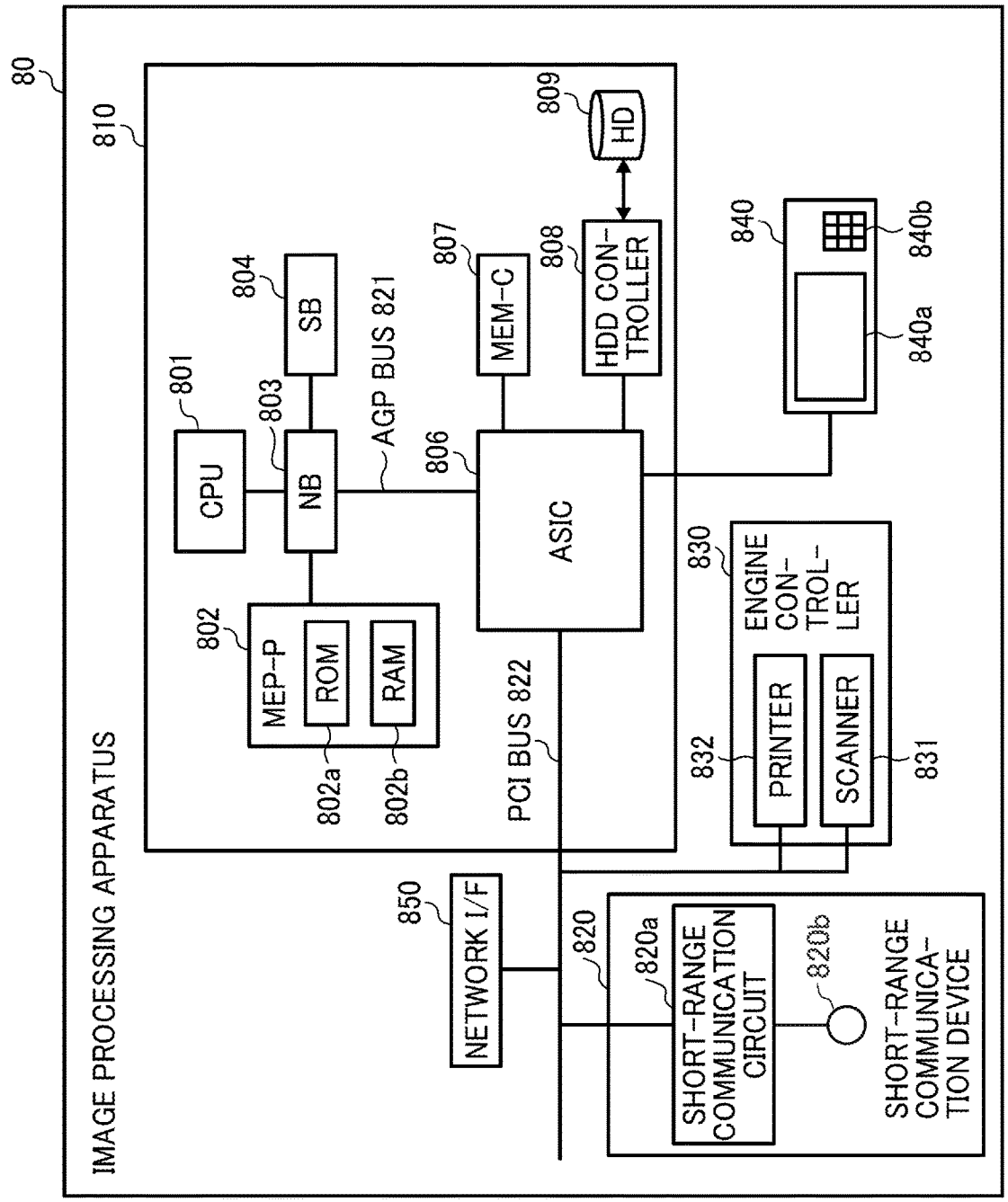
FIG. 4 is a block diagram illustrating an example of a hardware configuration of an image processing apparatus.

With reference to FIGS. 3 and 4, a hardware configuration of the apparatus or the terminal included in the information processing system according to the first embodiment is described. In the hardware configuration of the apparatus or terminal illustrated in FIGS. 3 and 4, components may be added or deleted as appropriate.

FIG. 3 is a diagram illustrating an example of the hardware configuration of the information processing apparatus. Each hardware configuration of the information processing apparatus 10 is indicated by a code in the 100 series. The information processing apparatus 10 is implemented by a computer, and as illustrated in FIG. 3, includes a central processing unit (CPU) 101, a read only memory (ROM) 102, a random access memory (RAM) 103, a hard disk (HD) 104, a hard disk drive (HDD) controller 105, a display 106, an external device connection interface (I/F) 108, a network I/F 109, a bus line 110, a keyboard 111, a pointing device 112, a digital versatile disc rewritable (DVD-RW) drive 114, and a medium I/F 116.

Among these elements, the CPU 101 controls all operations of the information processing apparatus 10. The ROM 102 stores a program used for executing the CPU 101, such as an initial program loader (IPL). The RAM 103 is used as a work area of the CPU 101. The HD 104 stores various data such as a control program. The HDD controller 105 controls reading or writing of various data to the HD 104 according to the control of the CPU 101.

The display 106 displays various information such as cursors, menus, windows, characters, or images. The display 106 is an example of a display. In one example, the display 106 is a touch panel display provided with an input device. The external device connection/F 108 is an interface for connecting the computer to various external devices. The external device in this case is, for example, a Universal Serial Bus (USB) memory or a printer. The network IF 109 is an interface for controlling communication of data through the communication network 5. The bus line 110 is an address bus, a data bus, or the like for electrically connecting each component such as the CPU 101 illustrated in FIG. 3.

The keyboard 111 is one example of an input device provided with a plurality of keys for enabling a user to input characters, numerals, or various instructions. The pointing device 112 is another example of the input device that allows a user to select or execute a specific instruction, select a target for processing, or move a cursor being displayed. The input device is not limited to the keyboard Il 1 and the pointing device 112, and may be a touch panel, a voice input device, or the like. The DVD-RW drive 114 controls reading or writing of various data to the DVD-RW 113 as an example of a detachable recording medium.

The removable recording medium is not limited to the DVD-RW and may be a digital versatile disc recordable (DVD-R) or BLU-RAY DISC (registered trademark), or the like. The medium I/F 116 reads or writes (stores) data from or to a storage medium 115 such as a flash memory.

FIG. 3 is a block diagram illustrating an example of a hardware configuration of the communication terminal. Each hardware component of the communication terminal 60 is indicated by a code in the 600 series in parentheses. Since the communication terminal 60 is implemented by the computer and have the same configuration as the information processing apparatus 10 as illustrated in FIG. 3, the description of each hardware configuration is omitted.

FIG. 3 is a block diagram illustrating an example of a hardware configuration of the user terminal. Each hardware component of the user terminal 70 is indicated by a code in the 700 series in parentheses. Since the user terminal 70 is implemented by the computer and have the same configuration as the information processing apparatus 10 as illustrated in FIG. 3, the description of each hardware configuration is omitted.

FIG. 3 is a diagram illustrating an example of a hardware configuration of the billing processing system. Each hardware configuration of the billing processing system 90 is indicated by a code in the 900 series in parentheses. Since the billing processing system 90 is implemented by the computer and have the same configuration as the information processing apparatus 10 as illustrated in FIG. 3, the description of each hardware component is omitted.

FIG. 4 is a block diagram illustrating an example of a hardware configuration of the image processing apparatus. As illustrated in FIG. 4, the image processing apparatus 80 includes a controller 810, a short-range communication device 820, an engine controller 830, a control panel 840, and a network I/F 850. The controller 810 includes a CPU 801 which is a main part of the computer, a system memory (MEM-P) 802, a north bridge (NB) 803, a south bridge (SB) 804, an application specific integrated circuit (ASIC) 806, a local memory (MEM-C) 807 as a storage unit, an HDD controller 808, and an HD 809 as a storage unit. In the controller 810, the NB 803 and the ASIC 806 are connected by an Accelerated Graphics Port (AGP) bus 821.

The CPU 801 is a control unit that controls the entire image processing apparatus 80. The NB 803 is a bridge for connecting the CPU 801 and the MEM-P 802, SB 804, and the AGP bus 821. The NB 803 has a memory controller that controls reading from and writing to the MEM-P 802, a Peripheral Component Interconnect (PCI) master, and an AGP target. The MEM-P 802 includes a ROM 802a which is a memory for storing programs and data that implements each function of the controller 810, and a RAM 802b which is used as a memory for developing programs and data and a memory for drawing in memory printing. The SB 804 is a bridge for connecting the NB 803 and the PCI bus 822 to peripheral devices. The ASIC 806 is dedicated to image processing that includes hardware elements for image processing. The ASIC 806 serves as a bridge connecting the AGP bus 821, the PCI bus 822, the HDD controller 808, and the MEM-C 807, respectively. The ASIC 806 includes a PCI target and an AGP master, an arbiter (ARB) which is the core of the ASIC 806, a memory controller that controls the MEM-C 807, and a plurality of direct memory access controllers (DMACs) that rotate image data by hardware logic and the like, and a PCI unit that transfers data between a scanner 831 and a printer 832 through the PCI bus 822. The ASIC 806 may be connected to a USB interface or an Institute of Electrical and Electronics Engineers 1394 (IEEE1394) interface.

The MEM-C 807 is a local memory used as a copy image buffer and a code buffer. The HD 809 is a storage for accumulating image data, accumulating font data used in printing, and accumulating forms. The HDD controller 808 controls reading or writing of data from and to the HD 809 according to the control of the CPU 801.

The AGP bus 821 is a bus interface for a graphics accelerator card, which has been proposed to accelerate graphics processing. Through directly accessing the MEM-P 802 by high-throughput, speed of the graphics accelerator card is improved. Further, the short-range communication device 820 includes a short-range communication circuit 820a and an antenna 820b of the short-range communication circuit 820a. The short-range communication circuit 820a is a communication circuit for short-range wireless communication such as Near Field Communication (NFC), BLUETOOTH (registered trademark), millimeter wave wireless communication, QUICK RESPONSE (QR) code (registered trademark), visible light, environmental sound, or ultrasonic wave.

The engine controller 830 includes a scanner 831 and a printer 832. The scanner 831 and the printer 832 include an image processing function such as error diffusion or gamma conversion. The control panel 840 displays a current set value, selection screen, or the like and includes a display panel 840a such as a touch panel that receives input from the operator, and an operation panel 840b including a numeric keypad for receiving set values of conditions related to image formation such as density settings conditions and a start key for receiving copy start instructions. The controller 810 controls the entire image processing apparatus 80, and controls, for example, rendering, communication, input from the control panel 840, and the like. The network I/F 850 is an interface that controls communication of data through the communication network 5. The short-range communication circuit 820a and the network I/F 850 are electrically connected to the ASIC 806 through the PCI bus 822.

Any one of the above-described programs may be recorded in a file in a format installable or executable on a computer-readable storage medium for distribution. Examples of the storage medium include, but not limited to a Compact Disc Recordable (CD-R), Digital Versatile Disk (DVD), BLU-RAY (registered trademark) disc, secure digital (SD) card, USB memory, and the like. In addition, such storage medium may be provided in a form of a program product to users within a certain country or outside that country. For example, the information processing apparatus 10 implements the remote management method according to the present disclosure by executing the program according to the present disclosure.

Figure 5:
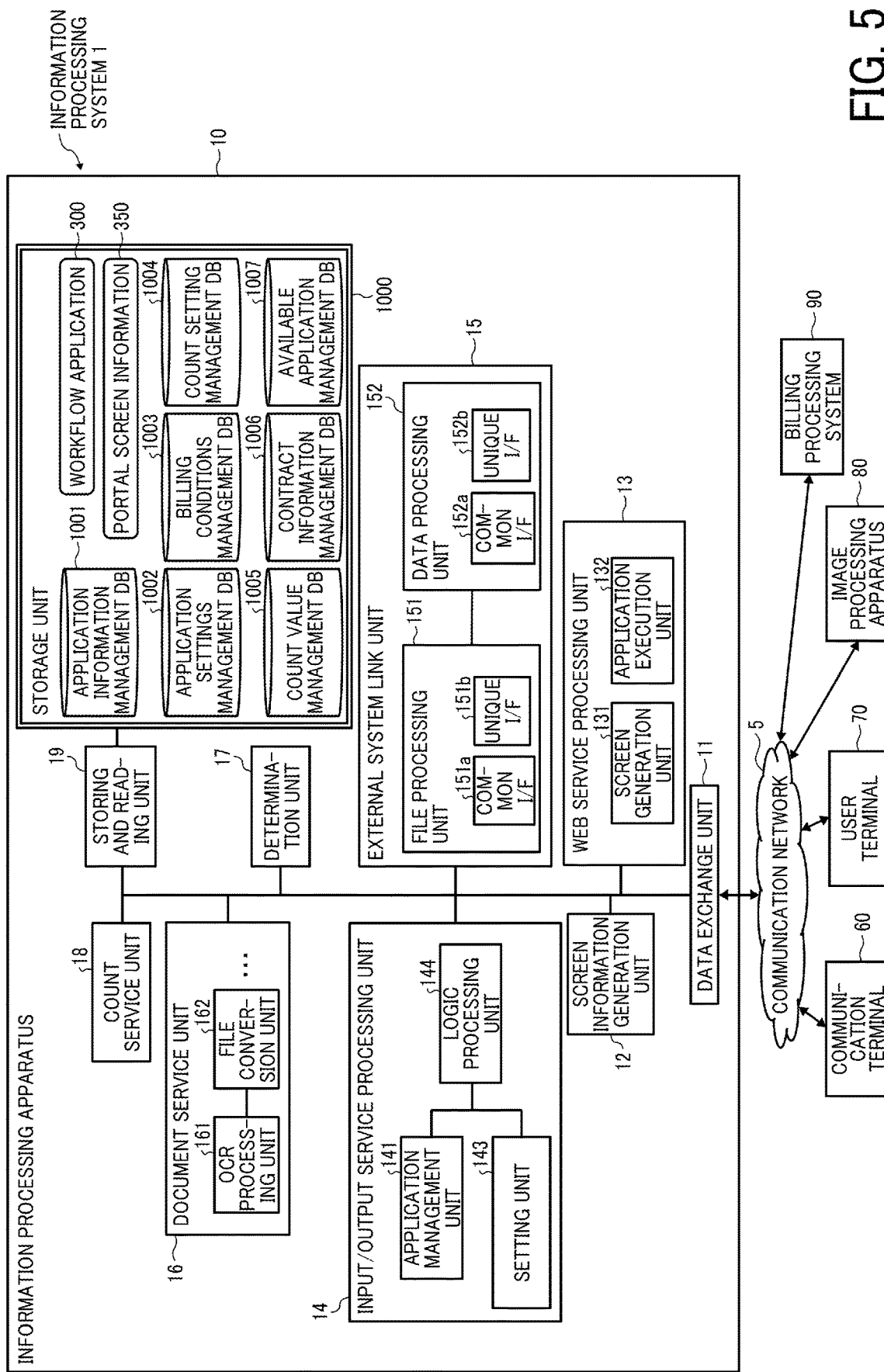
FIG. 5 is a block diagram illustrating an example of a functional configuration of the information processing system.
Figure 13:
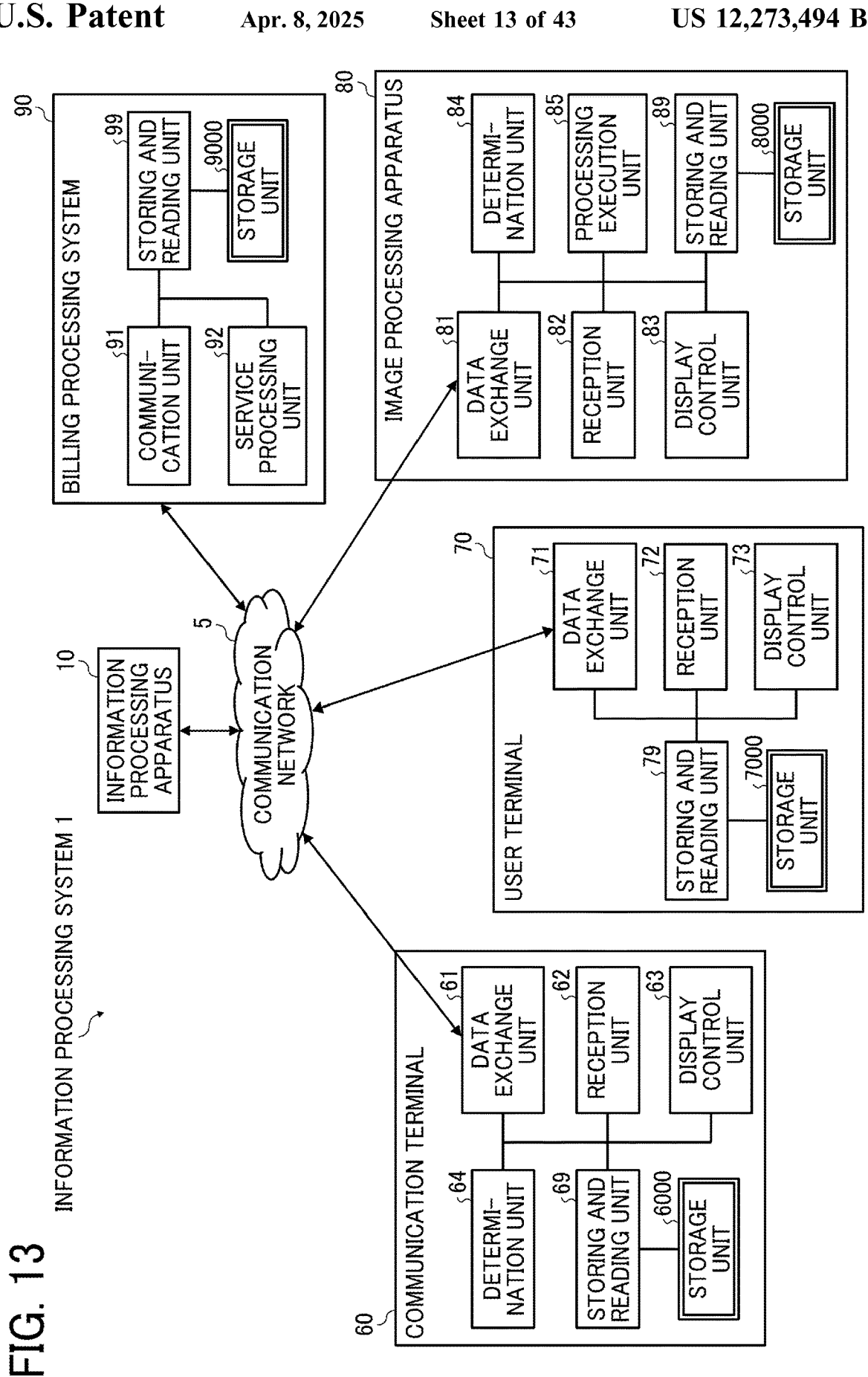
FIG. 13 is a block diagram illustrating an example of a functional configuration of the image processing apparatus, the communication terminal, the user terminal, and the billing processing system.

With reference to FIGS. 5 to 13, a functional configuration of the information processing system according to the first embodiment is described. Note that FIGS. 5, 12 and 13 illustrate the apparatuses or terminals illustrated in FIG. 1 that are related to the processing or operation described below.

FIG. 5 is a diagram illustrating an example of the functional configuration of the information processing apparatus. The information processing apparatus 10 includes a data exchange unit 11, a screen information generation unit 12, a web service processing unit 13, an input/output service processing unit 14, an external system link unit 15, a document service unit 16, a determination unit 17, a count service unit 18, and a storing and reading unit 19. Each of these units includes a function or functions implemented by operating any of the components illustrated in FIG. 3 by an instruction from the CPU 101 according to the information processing apparatus program developed on the RAM 103. Further, the information processing apparatus 10 includes a storage unit 1000 implemented by at least one hardware resource among the ROM 102, the HD 104 and the storage medium 115 illustrated in FIG. 3.

The data exchange unit 11 is implemented mainly by processing of the CPU 101 and the network I/F 109, and exchanges various data or information to and from the communication terminal 60, the user terminal 70, the image processing apparatus 80, and a billing processing system 90 capable of communicating with the information processing apparatus 10 through the communication network 5. For example, the data exchange unit 11 transmits input screen information of an input screen for inputting a workflow including a plurality of components to a communication terminal 60.

Further, the data exchange unit 11 receives the input information for inputting the workflow including the plurality of components, transmitted by the communication terminal 60. Further, the data exchange unit 11 receives a tenant identifier (ID) (an example of tenant identification information) transmitted by the user terminal 70 for identifying a tenant who is allowed to execute a predetermined workflow. Further, the data exchange unit 11 transmits count target contract input screen information for displaying a count target contract input screen for associating a predetermined billing target contract (an example of a count target contract) with the predetermined workflow, to the user terminal 70 through the communication network 5. Further, the data exchange unit 11 receives contract information (billing target contract information) indicating a predetermined contract (billing target contract) for the workflow, transmitted by the user terminal 70 for inputting the settings related to the workflow operation. Further, the data exchange unit 11 receives from the user terminal 70, at least one application ID (an example of workflow identification information for identifying a workflow) for identifying the predetermined workflow selected from at least one workflow. Further, the data exchange unit 11 notifies one or more user terminals including the user terminal 70 for inputting the settings related to the workflow operation, that a predetermined count target contract and the predetermined workflow are associated with each other before the predetermined workflow is executed. Further, based on a determination by the determination unit 17 that the predetermined workflow is not associated with the predetermined count target contract (billing target contract), the data exchange unit 11 transmits a notice prompting to set a predetermined count target contract to a predetermined processing execution device. Further, the data exchange unit 11 transmits the usage history counted according to the time set for each tenant to the billing processing system 90 that performs billing process based on the usage history.

The screen information generation unit 12 is mainly implemented by the processing of the CPU 101 and generates screen information for the workflow developer to set the workflow using the communication terminal 60. Further, based on the tenant ID (an example of tenant identification information) received by the data exchange unit 11 and an application ID (an example of workflow identification information for identifying a workflow) transmitted by the user terminal 70, the screen information generation unit 12 generates the count target contract input screen information for displaying the count target contract input screen.

The screen information generation unit 12 outputs portal screen information 350 stored in the storage unit 1000 in response to a request from the communication terminal 60. Here, the portal is a website on which an application is to be registered by using a browser. The portal screen information 350 is information in which various screens such as a portal top screen or an application input screen are defined. The portal screen information 350 is information in which various screens are defined in, for example, HyperText Markup Language (HTML), Extensible HyperText Markup Language (XHTML), Cascading Style Sheets (CSS), JAVASCRIPT (registered trademark), or the like. The communication terminal 60 displays the portal top screen, the input screen of the application, or the like by using the browser. The workflow developer performs the registration operation of the application (application information) on the input screen of the application (for example, the workflow input screen described below) using the communication terminal 60.

The web service processing unit 13 is implemented mainly by the processing of the CPU 101 and performs processing for the user to use various services by using the image processing apparatus 80. In other words, the web service processing unit 13 functions as an application server that provides a web application (application information) to the browser of the image processing apparatus 80. The web service processing unit 13 includes a screen generation unit 131 and an application execution unit 132.

The screen generation unit 131 outputs application screen information stored in the storage unit 1000 and application settings information stored in the storage unit 1000 in response to a request from the browser of the image processing apparatus 80. The application screen information defines a template of a screen (application screen) for using the service provided by the application information. The application screen information is information in which a template of the application screen is defined in, for example, HTML, XHTML, CSS, JAVASCRIPT, or the like. The application settings information defines various settings of the application (application information). The application settings information defines, for example, parameters input by the user, parameters set by default, and the like, among the parameters used for executing a series of processes. Further, the application settings information defines, for example, parameters for the user to input on the application screen, information to be displayed on the application screen (for example, application name), and the like. The settings information is, for example, information in which various application settings are defined in JavaScript Object Notation (JSON) or the like. The image processing apparatus 80 displays the application screen for using the service provided by the information processing apparatus 10 by the browser based on the settings information.

The application execution unit 132 outputs an application (application information) execution request to the input/output service processing unit 14 in response to a request from the browser of the image processing apparatus 80.

The input/output service processing unit 14 is implemented mainly by the processing of the CPU 101, and performs processing related to the service provided by the information processing apparatus 10. The input/output service processing unit 14 includes an application management unit 141, a setting unit 143, and a logic processing unit 144.

The application management unit 141 manages the application information stored in an application information management database (DB) 1001 described below. The application information is an application for using a service implemented by a series of processes. In other words, the various services provided by the information processing apparatus 10 are provided by the application information. Further, the application management unit 141 outputs processing flow information included in the application information in response to a request from the logic processing unit 144. The processing flow information defines a series of processes that implements the service provided by the application information.

Further, the application management unit 141 stores (registers) the application information in the storage unit 1000 in response to a request from the screen information generation unit 12. Accordingly, the application information for providing the service is stored in the information processing apparatus 10 by the application management unit 141.

The setting unit 143 sets (generates) the workflow including component whose usage history is to be counted, count conditions, and an explanatory note based on the input information input by the workflow developer or the like on the communication terminal 60 or the operation on the screen displayed on the communication terminal 60. In addition, the setting unit 143 sets as the predetermined workflow that is allowed to be used by a predetermined tenant, a workflow represented by at least one application ID (an example of workflow identification information for identifying a workflow) among the workflow identification information associated with the tenant identification information that identifies the tenant corresponding to the billing target contract information. Further, the setting unit 143 sets at the communication terminal 60, a character string or explanatory note in which a variable indicating a count value counted under a specific condition is embedded. Further, the setting unit 143 sets at the communication terminal 60, the character string in which the variable indicating the count value as the usage history of the component, or the explanatory note relating to the execution of the component is embedded. Further, the setting unit 143 replaces the variable indicating the count value with the count value actually counted and sets the explanatory note. Further, the setting unit 143 sets the predetermined workflow by associating the tenant ID (an example of tenant identification information) received by the data exchange unit 11 with the predetermined count target contract information.

The logic processing unit 144 executes processing of various services such as a document service or an external service based on the processing flow information included in the application information in response to a request from the web service processing unit 13. The logic processing unit 144 executes a series of processing (processing flow) for implementing the service provided by the application based on the processing flow information acquired from the application management unit 141. As a result, the information processing apparatus 10 provides various services such as a file upload service. Further, the logic processing unit 144 also includes a function of reading and acquiring each component included in the component group 210 managed in the logic processing unit 144.

The external system link unit 15 is implemented mainly by the processing of the CPU 101, and performs processing related to file input and output, data acquisition or writing, etc. to the billing processing system 90, external services, and the like. The information processing apparatus 10 includes an external system link unit 15 corresponding to each billing processing system 90 that performs processing in cooperation with the information processing apparatus 10.

The external system link unit 15 includes a file processing unit 151 and a data processing unit 152.

The file processing unit 151 performs file related processing (for example, file transmission or file acquisition) with respect to the billing processing system 90. The data processing unit 152 performs data processing expressed by text other than the file with respect to the billing processing system 90, for example, acquisition of a folder list and the like.

The file processing unit 151 includes a common I/F 151*a* in which an application programming interface (API) for performing an operation (for example, acquisition, saving, editing, etc.) on the usage history and the electronic file stored in the billing processing system 90 is defined and a unique I/F 151*b*. The common I/F 151*a* is, for example, an API commonly used among a plurality of billing processing systems 90 and an API group for using functions related to file operations (for example, acquisition or storage of files, etc.), used by all billing processing systems 90. On the other hand, the unique I/F 151*b* is, for example, an API used for a specific billing processing system 90 and an API group for using a function related to file operations (for example, adding a file to a document) used for the specific billing processing system 90. Accordingly, the common I/F 151*a* is similarly defined for all external system link units 15. On the other hand, the unique I/F 151*b* is defined for the external system link unit 15 corresponding to the specific billing processing system 90 in which the API defined by the unique I/F 151*b* is used.

The data processing unit 152 includes a common I/F 152*a* in which an API for acquiring metadata such as bibliographic information of an electronic file (for example, a file list or a folder list, etc.) stored in the billing processing system 90 is defined and a unique I/F 152*b*. The common I/F 152*a* is an API commonly used among a plurality of billing processing systems 90 and an API group for using a function related to metadata acquisition (for example, acquisition of a file list or acquisition of a folder list) used in all billing processing systems 90. On the other hand, the unique IF 152*b* is an API used in a specific billing processing system 90 and an API group for using a function related to metadata acquisition or the like (for example, acquisition of a list of image files or acquisition of a list of customer information) used in the specific billing processing system 90. Accordingly, the common IF 152*a* is similarly defined for all external system link units 15. On the other hand, the unique I/F 152*b* is defined for the external system link unit 15 corresponding to the specific billing processing system 90 for which the API defined by the unique I/F 152*b* is available.

As described above, to execute a simple process such as transmitting a file, the external system link unit 15 uses the common I/F to implement the same method for various linked services. In addition, the external system link unit 15 implements processing specialized for a partner service by widely utilizing the functions of the partner service using the unique I/F. The external system link unit 15 may transmit (register) the count value (usage amount) to the billing processing system 90 described below, instead of the count service unit 18. The external system link unit 15 may transmit the count value (usage amount) to the billing processing system 90 through an interface that implements direct connection instead of transmitting to the communication network 5 through the data exchange unit 11.

The document service unit 16 is implemented mainly by the processing of the CPU 101 and executes a specific process included in a series of processes (process flow) based on the process flow information. The document service unit 16 includes an OCR processing unit 161 and a file conversion unit 162.

The OCR processing unit 161 is mainly implemented by the processing of the CPU 101, and performs the OCR processing on the electronic file. The file conversion unit 162 performs format conversion, image size conversion, and the like for the electronic file. In addition to the OCR processing unit 161 and file conversion unit 162, the document service unit 16 may include various functional units such as a compression/decompression processing unit for compressing or decompressing the electronic file, or an email transmission unit for transmitting the electronic file by email.

The determination unit 17 is mainly implemented by the processing of the CPU 101, and makes various determinations in the information processing apparatus 10. Further, the determination unit 17 determines whether a workflow is associated with a count target contract before the workflow is executed.

The count service unit 18 is mainly implemented by the processing of the CPU 101, and based on the execution of the workflow, the count service unit 18 counts the usage history (for example, usage amount indicated by counter information) of the component to be counted included in the workflow. The data counted by the count service unit 18 is, for example, the counter information (usage amount). For example, a dedicated upload module is implemented in the count service unit 18, and at a certain interval or in response to an execution of processing by a user, data is collected from the logic processing unit 144 and converted into data having a data structure that is acceptable by the billing processing system 90. The data having converted data structure is transmitted by the data exchange unit 11 to the billing processing system 90 that performs billing processing through the communication network 5 according to the time set for each tenant. On the other hand, the component management unit 202 (counter component 219) may count the usage history of the component to be counted included in the workflow based on the execution of the workflow, instead of the count service unit 18. In this case, the count value (usage amount) counted by the component management unit 202 (counter component 219) may be transmitted from the data exchange unit 11 to the communication network 5, and further transmitted from the communication network 5 to the billing processing system 90.

The storing and reading unit 19 is mainly implemented by the processing of the CPU 101, stores various data (or information) in the storage unit 1000, and reads various data (or information) from the storage unit 1000. Further, the storage unit 1000 stores the portal screen information 350 indicating the screen content provided by the workflow application 300 and the screen information generation unit 12.

FIGS. 6A and 6B are tables illustrating examples of an application information management table. In the storage unit 1000, an application information management DB 1001 storing application information management tables as illustrated in FIGS. 6A and 6B are implemented.

In the application information management table illustrated in FIG. 6A, an application name, a component ID that identifies the component included in the application, and application processing information indicating processing content of the application are stored in association with each application ID that identifies the application. The component ID is identification information that identifies the component. The components include, for example, an OCR function, an image conversion function, and a file upload function. In addition, the component includes a count component that counts the usage history of the component in the previous stage (upper stage) in the workflow. The application processing information includes screen definition which is information to be displayed on the screen used by the user and processing flow information indicating the processing flow in the application. Further, the screen definition includes a data definition indicating data to be displayed on the screen and layout information indicating a screen layout. The processing flow information describes how to use the processing of the document service or the external system link unit 15.

The application information management table illustrated in FIG. 6B includes the same items as the application information management table illustrated in FIG. 6A. However, among the respective IDs indicated as the component IDs, the condition number (condition 1, condition 2, etc.) for identifying the count condition is assigned instead of the component IDs for identifying the counter component. Here, different count setting is assigned to each condition number. Accordingly, in the case of FIG. 6B, even when the count component included in the workflow is not uniquely identified by the component ID as in FIG. 6A, the count setting is identified by the condition number inserted in the workflow.

FIG. 7 is a conceptual diagram illustrating an example of a data definition. FIG. 7 illustrates an array in which the data definition included in a screen definition is described. The data definition illustrated in FIG. 7 represents a set of a data ID (data_id), a data name (data_key), a data format (format), and a data source (data_source) as the array. The data name is a parameter for processing. The data format is an element that configures the screen and is the same as an HTML form element. The data format is, for example, input_text, textarea, select, radio and the like. The data source indicates a uniform resource locator (URL) that holds the data. When the data source is fixed, the data may be directly described.

FIG. 8 is a conceptual diagram illustrating an example of layout information. FIG. 8 illustrates a data array in which the data ID of the data definition included in the screen definition and layout information holding position information for displaying the screen are described. The layout information illustrated in FIG. 8 expresses a set of the data ID (data_id), the display name (display_name), and the position information (layout) as an array. The position information may be in a form expressed by coordinate information instead of a form (order) in which the order is specified from the top. When displaying the screen on the communication terminal 60 (client) using the client application instead of the browser, or when a screen configuration is complicated, the information processing apparatus 10 may be configured to interpret the data definition on the client or in the screen generation process without the layout information.

FIG. 9 is a table illustrating an example of an application settings management table. In the storage unit 1000, an application settings management DB 1002 storing the application settings management table as illustrated in FIG. 9 is implemented.

In the application settings management table, application settings information associating the component ID that identifies the component included in the application and the settings information that indicates the settings of the component for each application ID that identifies the application is stored. The settings information indicates the setting value (parameter) of the associated component.

FIG. 10 is a table illustrating an example of a billing conditions management table. In the storage unit 1000, a billing conditions management DB 1003 storing the billing conditions management table as illustrated in FIG. 10 is implemented.

In the billing conditions management table, for each contract ID that indicates the identification information of the tenant or the contract to which the tenant is related, a tenant ID that identifies the tenant, the application ID that identifies the application, a user account such as an email address as an example, and billing conditions that indicate the conditions for requesting payment for the component to be counted are stored in association with each other. The billing conditions include a billing frequency indicating frequency of billing, a billing unit, and a calculation formula used for calculating a usage fee. The billing frequency is set to, for example, monthly, weekly, or at each use. As the billing unit, for example, a unit such as a contract unit, a tenant unit, or a user unit is set. For the calculation formula, for example, a usage fee (usage fee) for each processing count or page is set.

FIGS. 11A and 11B are tables illustrating examples of count setting management tables. In the storage unit 1000, a count setting management DB 1004 including the count setting management table as illustrated in FIG. 11A or FIG. 11B is stored.

In the count setting management table illustrated in FIG. 11A, a count setting (conditional expression) indicating a condition for counting the usage history is stored in association with each count setting ID that identifies the counter component. The count setting ID is the identification information for managing the count setting (conditional expression) described below in association with the count component among the component IDs described with reference to FIG. 6A. The count setting (conditional expression) represents a count target of the component (OCR component). The counting target includes, for example, the number of pages that the OCR is executed, a threshold value (for example, 5 pages or more) of the number of pages, execution time (for example, when the "execution" instruction is made), and the like. The count setting management table illustrated in FIG. 11A may be used in combination with the application information management table illustrated in FIG. 6A.

In the count setting management table illustrated in FIG. 11B, a count condition indicating the condition for counting is stored in association with the above-mentioned component ID. In FIG. 11B, instead of the count setting ID illustrated in FIG. 11A, the count setting (conditional expression) indicating the condition for counting the usage history is stored for each condition number. The count setting management table illustrated in FIG. 11B may be used in combination with the application information management table illustrated in FIG. 6B. The conditions 1 and 2 illustrated in FIG. 6B indicate conditional expressions corresponding to the values of the count setting IDs (CT00001, CT00002, etc.) of the count setting management DB 1004 illustrated in FIG. 11A. For condition 1, for example, the count setting (conditional expression) "ocr_pages" corresponding to the count setting ID (CT00001) is indicated as the conditional expression. Similarly, for condition 2, for example, the count setting (conditional expression) "ocr_pages" corresponding to the count setting ID (CT00002) is indicated as the conditional expression.

With reference to FIG. 12, a functional configuration of the logic processing unit 144 included in the input/output service processing unit 14 is described in detail. FIG. 12 is a diagram illustrating an example of a detailed configuration of the logic processing unit. As illustrated in FIG. 12, the logic processing unit 144 includes a workflow execution unit 201, a component management unit 202, and a component group 210 in which each component such as a counter component 219 is included.

The workflow execution unit 201, for example, interprets and executes various processes in the external system link unit 15 and the process indicated in the process content that describes the order in which the document service is used. The workflow execution unit 201 calls the component according to the description in the process content to execute the process. The configuration of various processes includes component names, processes, and optional parameters.

The component management unit 202 generates each component included in the workflow requested by the workflow execution unit 201. Further, the component management unit 202 registers and stores each generated component in the component group 210.

The stored components include, for example, OCR, Portable Document Format (PDF), voice conversion, Server Message Block (SMB), File Transfer Protocol (FTP), and counter component 219. Further, each component has an ID that identifies each component.

With reference to FIG. 13, functional configurations of the communication terminal 60, the image processing apparatus 80, and the billing processing system 90 are described. FIG. 13 is a block diagram illustrating examples of the functional configurations of the image processing apparatus, the communication terminal, and the billing processing system.

The communication terminal 60 includes a data exchange unit 61, a reception unit 62, a display control unit 63, a determination unit 64, and a storing and reading unit 69. Functions of each of these units are implemented by operating any of the components illustrated in FIG. 3 by an instruction from the CPU 601 according to a communication terminal program developed on the RAM 603. Further, the communication terminal 60 includes a storage unit 6000 implemented by at least one hardware resource among the ROM 602, HD 604 and storage medium 615 illustrated in FIG. 3.

The data exchange unit 61 is implemented mainly by the processing of the CPU 601 and the network I/F 609, and exchanges various data or information to and from the information processing apparatus 10 through the communication network 5. Further, the data exchange unit 61 transmits to the information processing apparatus 10, operation information for setting a workflow based on a placement operation of one or more components received by the reception unit 62.

The reception unit 62 is implemented mainly by the processing of the CPU 601 with reference to the keyboard 611 or the pointing device 612, and receives various selections or inputs from the user. Further, the reception unit 62 receives the placement operation of one or more components displayed on the input screen. Further, the reception unit 62 receives input of a plurality of count conditions for the component to be counted.

The display control unit 63 is mainly implemented by the processing of the CPU 601 and displays various information and images on the display 606. The display control unit 63 uses, for example, a browser to display a display screen created in HTML or the like on the display 606. Further, the display control unit 63 displays an input screen for inputting a workflow on the display 606. Further, the display control unit 63 displays on the display 606 that the workflow is not set correctly when an error occurs in the placement of the components. Further, the display control unit 63 displays the character string or explanatory note transmitted by the information processing apparatus 10 for setting the variable indicating the count value counted under the specific condition on the display 606. Further, the display control unit 63 displays the explanatory note in which the variable is replaced with the actual count value on the display 606.

The determination unit 64 is mainly implemented by the processing of the CPU 601 and makes various determinations in the communication terminal 60.

The storing and reading unit 69 is mainly implemented by the processing of the CPU 601, stores various data (or information) in the storage unit 6000, and reads various data (or information) from the storage unit 6000.

The user terminal 70 includes a data exchange unit 71, a reception unit 72, a display control unit 73, and a storing and reading unit 79. Functions of each of these units are implemented by operating any of the components illustrated in FIG. 3 by an instruction from the CPU 701 according to a communication terminal program developed on the RAM 703. Further, the user terminal 70 includes a storage unit 7000 implemented by at least one hardware resource among the ROM 702, HD 704, and storage medium 715 illustrated in FIG. 3.

The data exchange unit 71 is implemented mainly by the processing of the CPU 701 and the network I/F 709, and transmits and receives various data or information to and from the information processing apparatus 10 through the communication network 5.

The reception unit 72 is implemented mainly by the processing of the CPU 701 with reference to the keyboard 711 or the pointing device 712, and receives various selections or inputs from the user. The reception unit 72 receives a selection of the count target contract information indicating the predetermined count target contract associated with the predetermined workflow on the count target contract input screen displayed on the display 706.

The display control unit 73 is mainly implemented by the processing of the CPU 701 and displays various information and images on the display 706. The display control unit 73 uses, for example, a browser to display a display screen created in HTML or the like on the display 706. Specifically, the display control unit 73 selectively displays the billing target contract information related to at least one or more billing target contracts on the display 706. The display control unit 73 displays a notice indicating that the predetermined workflow is associated with the predetermined billing target contract on the display 706.

Specifically, the display control unit 73 displays on the display 706, the count target contract input screen based on the count target contract input screen information for displaying the count target contract input screen for associating the predetermined count target contract with the predetermined workflow transmitted by the information processing apparatus 10.

The storing and reading unit 69 is mainly implemented by the processing of the CPU 701, stores various data (or information) in the storage unit 7000, and reads various data (or information) from the storage unit 7000.

The image processing apparatus 80 includes a data exchange unit 81, a reception unit 82, a display control unit 83, a determination unit 84, a processing execution unit 85, and a storing and reading unit 89. Functions of each of these units are implemented by operating any of the components illustrated in FIG. 4 by a command from the CPU 801 according to a program for the image processing apparatus developed on the RAM 802b from the HD 809. Further, the image processing apparatus 80 includes a storage unit 8000 implemented by at least one hardware resource of the ROM 802a and the HD 809 illustrated in FIG. 4.

The data exchange unit 81 is mainly implemented by processing of the CPU 801 with respect to the network I/F 850, and transmits and receives various data or information to and from the information processing apparatus 10 through the communication network 5.

The reception unit 82 is implemented mainly by the processing of the CPU 801 with respect to the control panel 840 and receives various selections or inputs from the user. The display control unit 83 is mainly implemented by the processing of the CPU 801 and displays various images on the control panel 840. The display control unit 83 displays the display screen created in HTML or the like on the control panel 840 using, for example, a browser. Further, based on the determination by the determination unit 17 of the information processing apparatus 10 that the predetermined workflow is not associated with the predetermined count target contract, which indicates that a workflow that is not associated with the billing target contract information is being executed, the display control unit 83 displays a notice prompting to set the predetermined count target contract on the control panel 840. The determination unit 84 is mainly implemented by the processing of the CPU 801 and makes various determinations in the image processing apparatus 80. The processing execution unit 85 is implemented mainly by the processing of the CPU 801 with respect to the engine controller 830 and executes an image data printing process.

The storing and reading unit 89 is mainly implemented by the processing of the CPU 801, stores various data (or information) in the storage unit 8000, and reads various data (or information) from the storage unit 8000.

The billing processing system 90 includes a communication unit 91, a service processing unit 92, and a storing and reading unit 99. Each of these units is implemented by operating any of the components illustrated in FIG. 3 by an instruction from the CPU 901 according to a billing processing system program developed on the RAM 903. Further, the billing processing system 90 includes a storage unit 9000 implemented by at least one hardware resource among the ROM 902, HD 904 and storage medium 915 illustrated in FIG. 3.

The communication unit 91 is mainly implemented by the processing of the CPU 901, and communicates various data or information with the information processing apparatus 10. The service processing unit 92 is implemented mainly by the processing of the CPU 901 and executes the processing for providing the predetermined service in response to the request from the information processing apparatus 10. In the first embodiment, the predetermined service includes a service provided by executing the predetermined workflow application including a plurality of components (functions).

The storing and reading unit 99 is mainly implemented by the processing of the CPU 901, stores various data (or information) in the storage unit 9000, and reads various data (or information) from the storage unit 9000.

Figure 14:
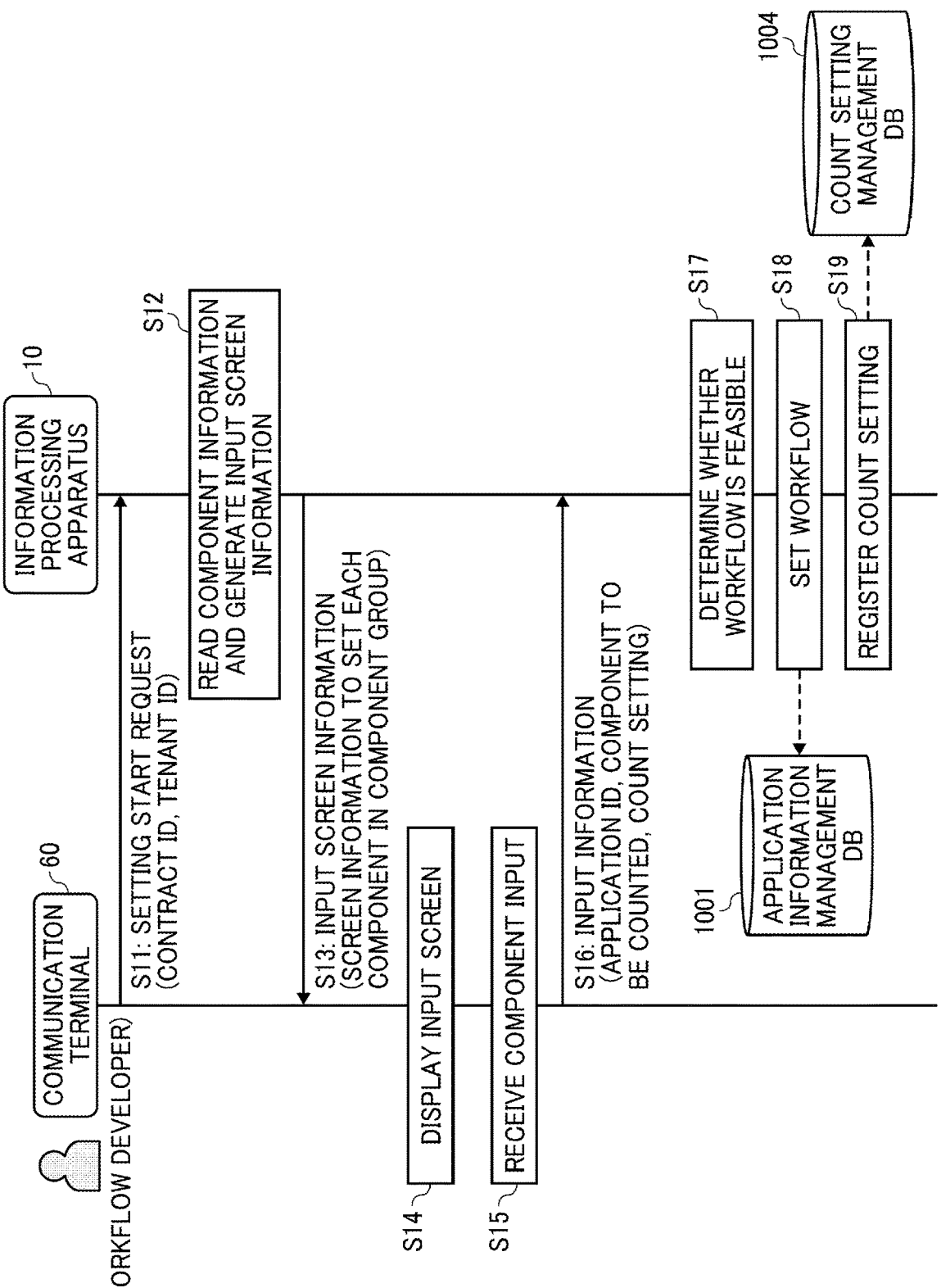
FIG. 14 is a sequence diagram illustrating an example of a workflow setting process.

With reference to FIGS. 14 to 34, processing or operation of the information processing system according to the first embodiment is described. With reference to FIGS. 14 to 34, a process from the creation of a new application initiated by the workflow developer to the registration by the information processing apparatus 10 is described. FIG. 14 is a sequence diagram illustrating an example of the workflow setting process.

In step S11, in response to an input operation or the like on the communication terminal 60 by the workflow developer, the data exchange unit 61 of the communication terminal 60 transmits a setting start request to the information processing apparatus 10. Accordingly, the data exchange unit 11 of the information processing apparatus 10 receives the setting start request transmitted by the communication terminal 60. The setting start request includes the contract ID and the tenant ID.

In step S12, the logic processing unit 144 of the information processing apparatus 10 cooperates with the storing and reading unit 19 to read the component information that configures the input screen information from the component group 210. Specifically, the logic processing unit 144 acquires screen information for setting each component by reading the ID of each component managed by the component group 210. Further, in step S12, the screen information generation unit 12 outputs the portal screen information 350 stored in the storage unit 1000, and generates the input screen information which is the screen information for inputting each component in the communication terminal 60. In step S13, the data exchange unit 11 transmits the generated input screen information to the communication terminal 60. Here, the screen information for setting each component is the screen information for setting the workflow including the plurality of components. Accordingly, the data exchange unit 61 of the communication terminal 60 receives the input screen information which is the screen information for setting each component transmitted from the information processing apparatus 10.

In step S14, the display control unit 63 of the communication terminal 60 displays the workflow input screen 6001 on the display 606 based on the input screen information received in step S13. FIGS. 15A to 15D are diagrams illustrating an example of screen transition of the workflow input screen displayed on the communication terminal. The workflow input screen 6001 illustrated in FIGS. 15A to 15D is an input screen for the workflow developer to make detailed settings of the application. The workflow developer uses the workflow input screen 6001 to set the processing flow executed by each component (function) included in the workflow application.

In response to an input operation (drag and drop, etc.) performed by the workflow developer for each desired component on the workflow input screen 6001, the reception unit 62 of the communication terminal 60 receives the input operation (for example, component input) performed by the workflow developer in step S15.

Figure 15A:
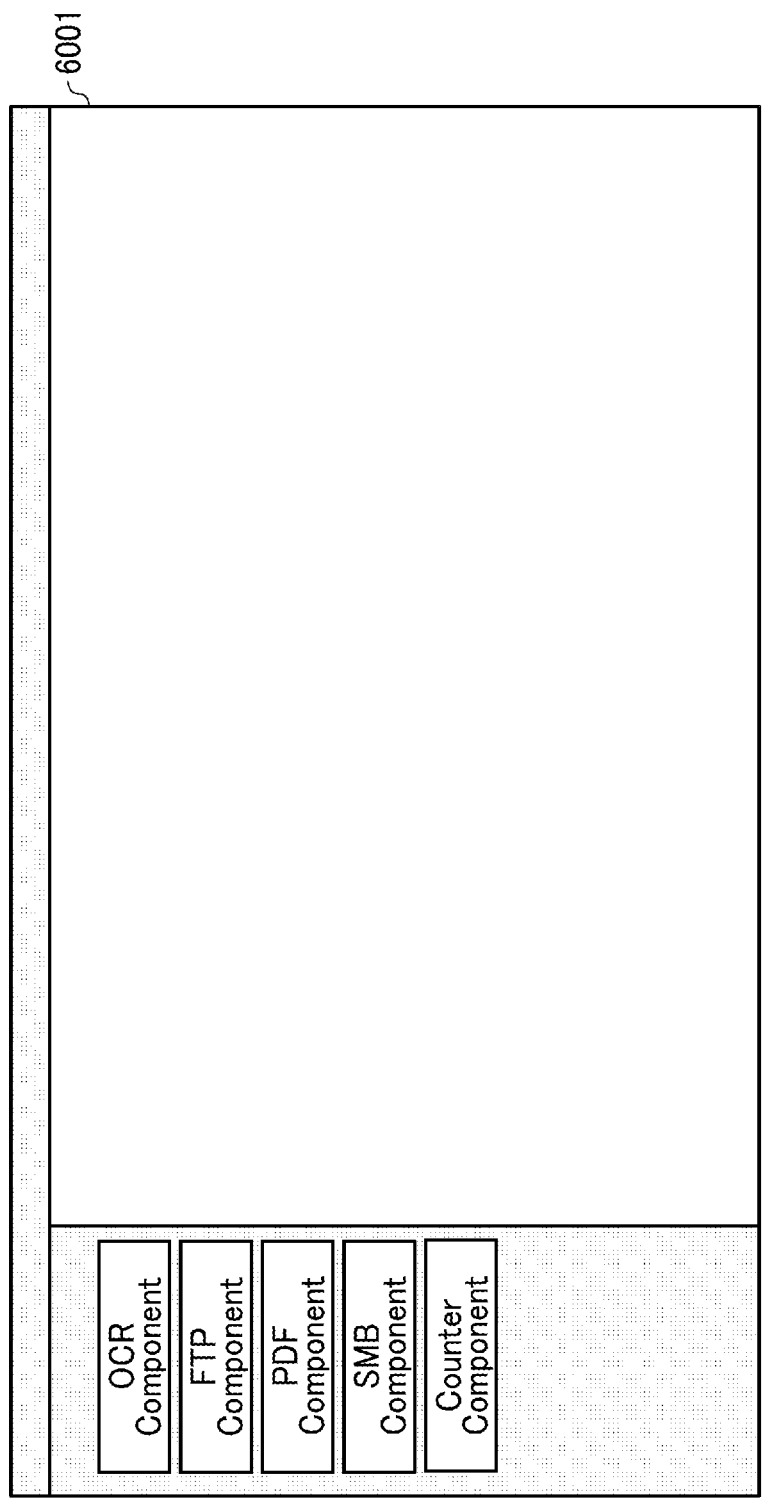
FIGS. 15A, 15B, 15C, and 15D are diagrams illustrating an example of screen transition of a workflow input screen displayed on the communication terminal.

The screen transition of the communication terminal 60 according to the operation (input) performed by the workflow developer in step S15 is described in the following. FIG. 15A is a diagram illustrating an example of screen transition of the workflow input screen displayed on the communication terminal. As illustrated in FIG. 15A, the display control unit 63 of the communication terminal 60 displays the workflow input screen 6001 on the display 606, for example, in response to an operation of the workflow developer. On the workflow input screen 6001, the display control unit 63 displays the components included in the workflow application received in step S13. Specifically, the display control unit 63 displays, for example, the OCR component, the FTP component, the PDF component, the SMB component, and the counter component arranged in a particular area of the workflow input screen 6001. Here, all the components managed by the information processing apparatus 10 may be displayed, or some components may be displayed.

Figure 15B:
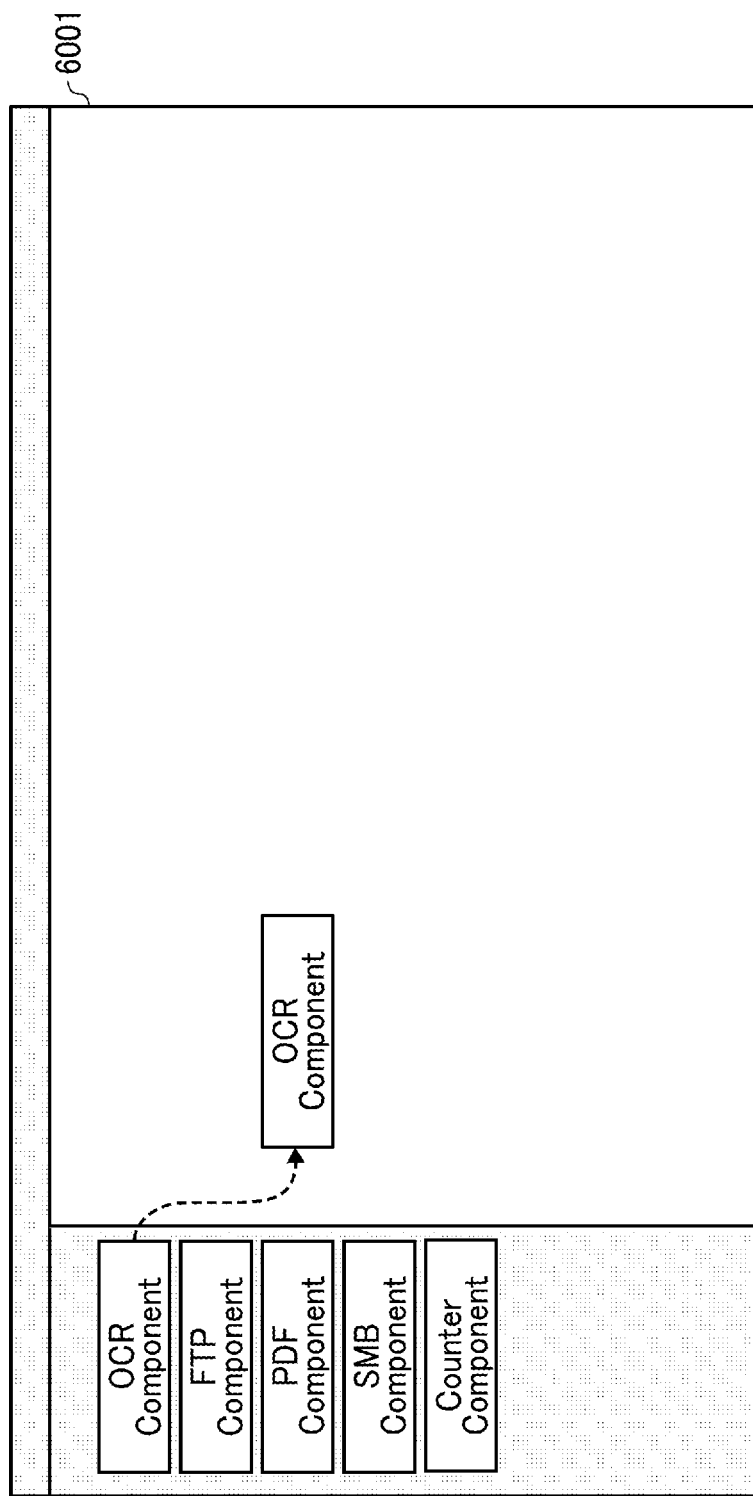

The screen transition in response to the workflow developer arranging the component on the workflow input screen 6001 is described in the following. FIG. 15B is a diagram illustrating an example of screen transition of the workflow input screen displayed on the communication terminal. As illustrated in FIG. 15B, the workflow developer clicks on any component displayed on the workflow input screen 6001 and by clicking on a blank area of the workflow input screen 6001, the component is placed at the clicked area. Alternatively, an operation such as drag and drop is performed on the blank area of the workflow input screen 6001 for any component among the components arranged on the workflow input screen 6001. In the case of FIG. 15B, the workflow developer selects, drags, and drops the OCR component. Accordingly, the display control unit 63 arranges an icon of the OCR component or the like at the position (coordinate position) dropped by the workflow developer on the workflow input screen 6001.

Figure 15C:
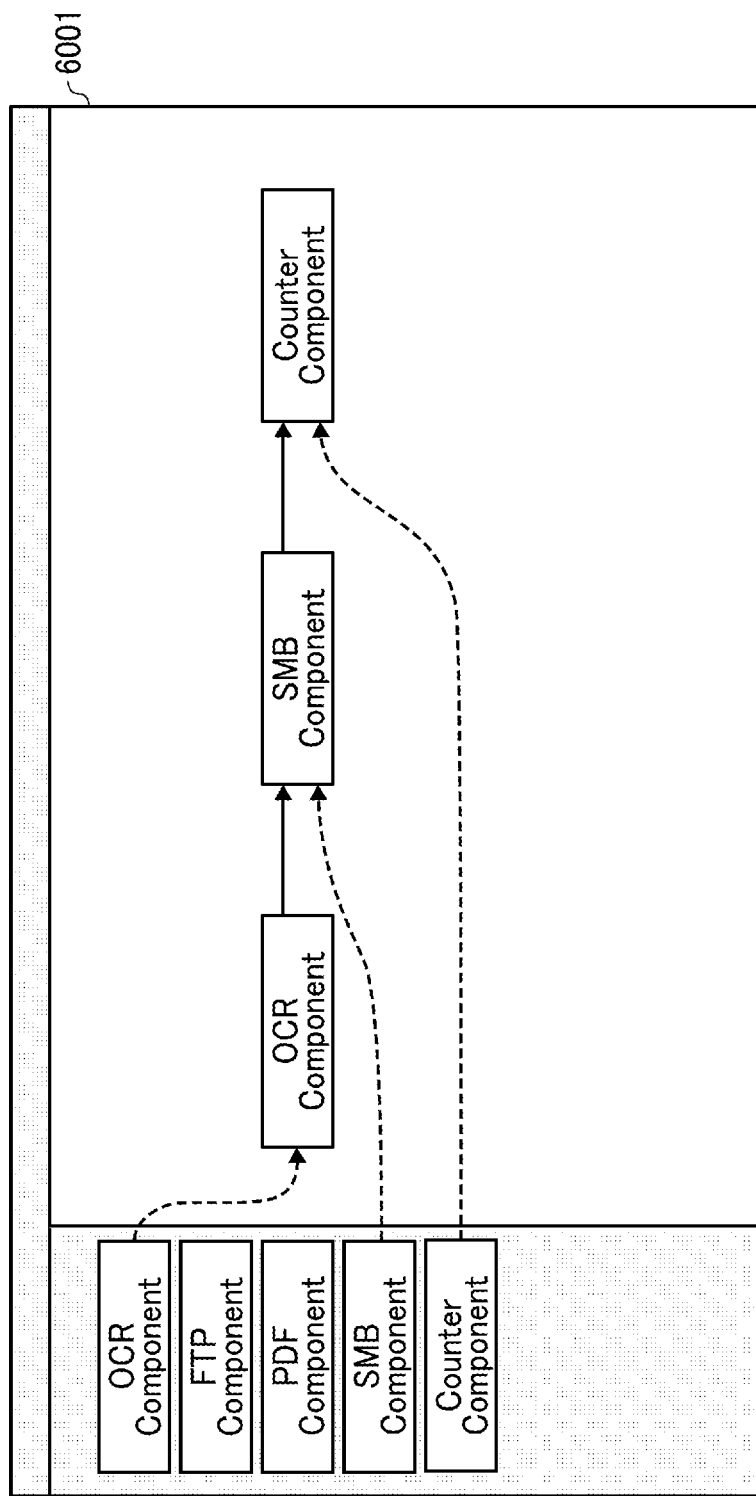

The screen transition in response to the workflow developer further arranging the component on the workflow input screen 6001 is described in the following. FIG. 15C is a diagram illustrating an example of screen transition of the workflow input screen displayed on the communication terminal. As illustrated in FIG. 15C, the workflow developer drags and drops the SMB component and the counter component in the order of the SMB component and the counter component in the blank area of the workflow input screen 6001 following the OCR component arranged on the workflow input screen 6001. Accordingly, the display control unit 63 arranges the icons of the SMB component and the counter component at the position (coordinate position) designated by the workflow developer on the workflow input screen 6001. As a result, a workflow is generated in which OCR is executed on a file, the file is saved in the SMB, and then the number of pages in which the OCR is executed is counted. Further, the OCR component, the SMB component, and the counter component are connected by arrows. Based on a determination that the components are in a positional relationship that can be connected to each other, a user interface (UI) such as an arrow that indicates a connection between the components are displayed at the time after the workflow developer dragged and dropped each component using a pointing device such as a mouse.

Figure 15D:
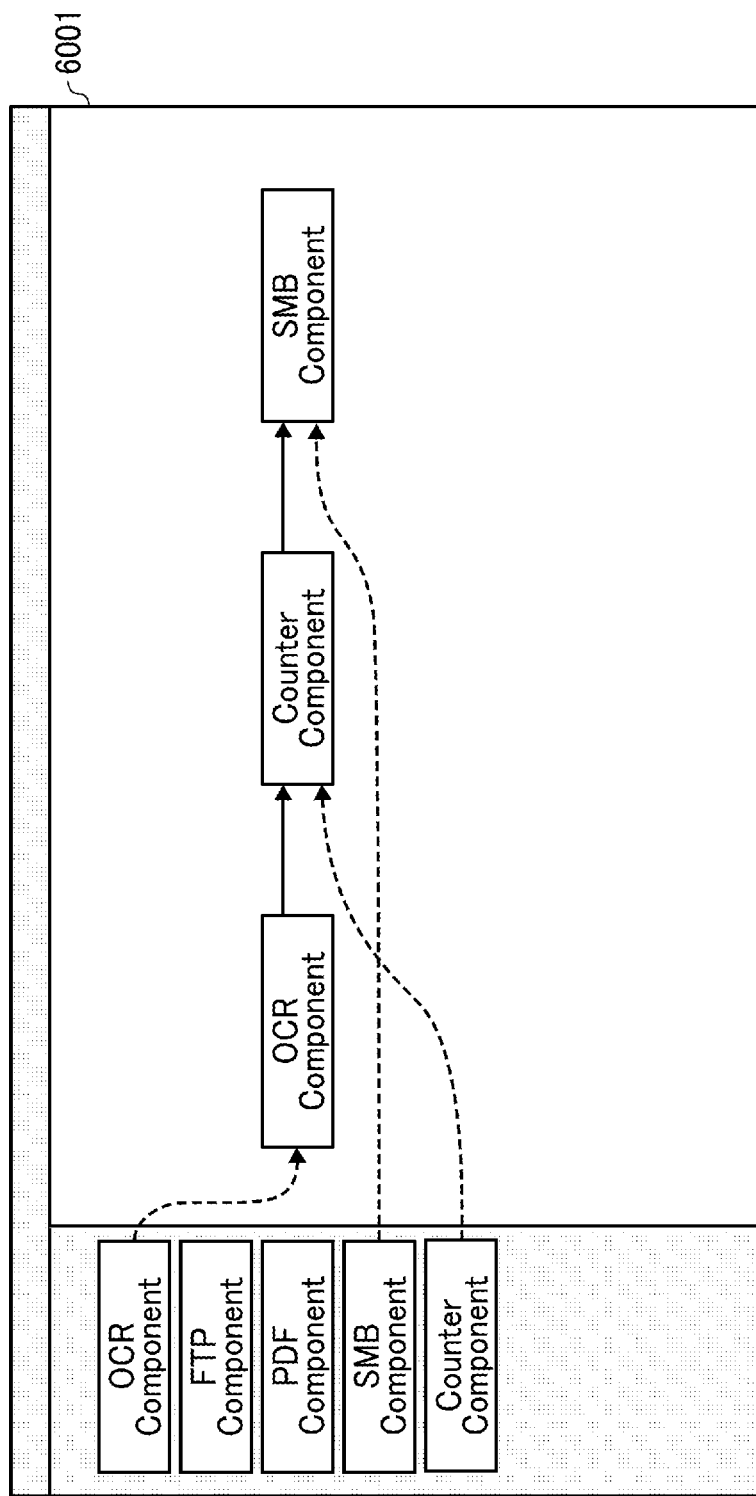

The screen transition in response to the workflow developer further arranging the component on the workflow input screen 6001 is described in the following. FIG. 15D is a diagram illustrating an example of screen transition of the workflow input screen displayed on the communication terminal. As illustrated in FIG. 15D, the workflow developer drags and drops the counter component and the SMB component into the blank area of the workflow input screen 6002 following the OCR component arranged on the workflow input screen 6001 in FIG. 15B. Accordingly, the display control unit 63 arranges the icons of the SMB component and the counter component at the position (coordinate position) dropped by the workflow developer on the workflow input screen 6001. As a result, a workflow is generated in which a file is OCR processed, counted, and saved in SMB. Further, the OCR component, the SMB component, and the counter component are connected by arrows.

In the case of FIG. 15D, a workflow is generated in which the number of pages executed by OCR is counted and then saved in SMB. In this case, the processing of the SMB component after counting the number of OCR processed pages is a workflow specification regardless of whether the processing is completed normally.

Returning to FIG. 14, the data exchange unit 61 transmits the input information according to the operation (input) received in step S15 to the information processing apparatus 10 in step S16. As a result, the data exchange unit 11 of the information processing apparatus 10 receives the input information transmitted by the communication terminal 60. The input information includes the application ID of the application for which the input of the application settings is received in step S15, information of the selected count target, and count condition.

FIG. 16 is a conceptual diagram illustrating an example of output data after an execution of OCR process. As the output data after the execution of OCR process illustrated in FIG. 16, for example, a file name: "output.pdf", a file size: "307200", and the number of pages: "5" are indicated.

In step S17, the determination unit 17 of the information processing apparatus 10 determines whether the workflow is feasible by the setting unit 143 based on the input information received in step S16. In this step, the determination unit 17 may determine whether the setting unit 143 is able to set the workflow.

In step S18, based on a determination by the determination unit 17 that the workflow is feasible, the setting unit 143 of the input/output service processing unit 14 sets in the application information management DB 1001 (see FIG. 6), the workflow including a counter component 219 indicated by input information including the application ID received from the communication terminal 60 in step S16. For example, the application name and the component ID corresponding to the application ID are set in this step. Specifically, the setting unit 143 sets the workflow including the component whose usage history is counted, according to the input information operated (input) on the input screen displayed on the communication terminal 60 based on the input screen information transmitted in step S13.

On the other hand, based on a determination by the determination unit 17 in step S17 that the workflow is not feasible, the information processing apparatus 10 exits this sequence without performing the subsequent processes of steps S18 and S19. In this case, the data exchange unit 11 of the information processing apparatus 10 may transmit a notice to the communication terminal 60 indicating that the workflow is not set.

In step S19, the application management unit 141 of the input/output service processing unit 14 registers in cooperation with the storing and reading unit 19, the count setting in the count setting management DB 1004 (see FIG. 11) in association with the component ID or count condition included in the application information management DB 1001 (see FIG. 6) set in step S16. Specifically, the application management unit 141 registers the count setting (conditional expression) in the count setting management DB 1004 (see FIG. 11) as the count setting included in the application settings in association with the component ID or the count conditions included in the application information management DB 1001 (see FIG. 6) set in step S16.

As described above, the information processing apparatus 10 generates the workflow application including the plurality of components in response to the operation input by the workflow developer or the like.

In the information processing system according to the first embodiment, for example, when the processes of steps S11 and S13 described above are executed, another device or the like may reside between the communication terminal 60 and the information processing apparatus 10. In other words, each information (data) transmitted and received between the communication terminal 60 and the information processing apparatus 10 may be configured to be transmitted and received through another device. The configuration described above is applicable with another processing step executed between the communication terminal 60 and the information processing apparatus 10.

Figure 17:
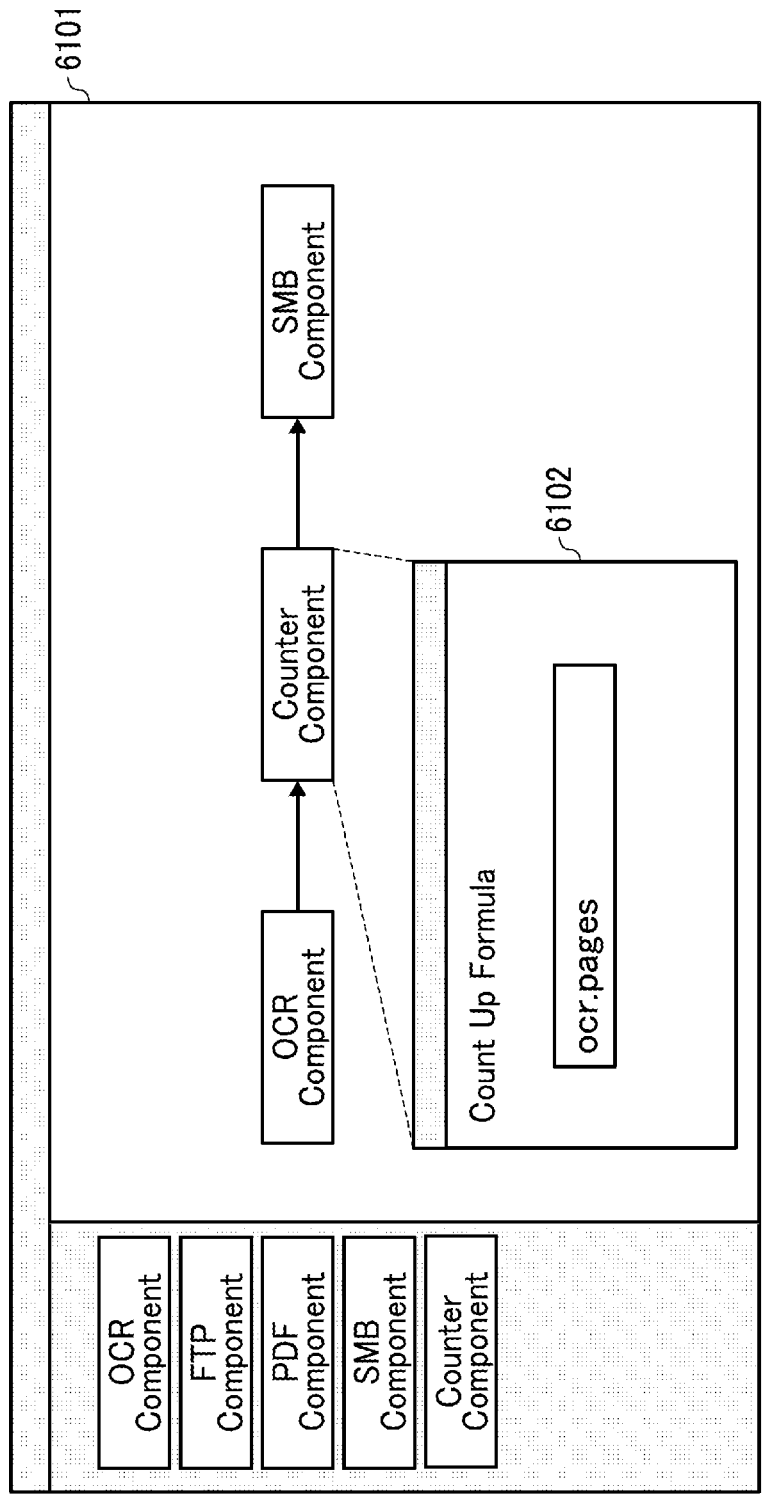
FIG. 17 is a diagram illustrating an example of inputting count-up formula on the workflow input screen displayed on the communication terminal.

FIG. 17 is a diagram illustrating an example of inputting a count-up formula of the workflow input screen displayed on the communication terminal. As illustrated in FIG. 17, the display control unit 63 of the communication terminal 60 displays the workflow input screen 6101 on the display 606. In FIG. 17, the display control unit 63 displays for the counter component displayed on the workflow input screen 6101 illustrated in FIG. 15D, for example, a count-up formula 6102 for executing the count-up as a dialog in a pop-up window. The display of count-up formula 6102 is not limited to the dialog displayed in the pop-up window, and may be provided in, for example, a frame indicating a component arranged by the workflow developer or the like. The display of count-up formula 6102 allows the workflow developer to set a count condition for the screen on which the component including the count-up formula 6102 is displayed. The pop-up window may avoid blocking the display of other components. In the example illustrated in FIG. 17, in response to setting of the formula "ocr.pages" as the output after OCR in the count-up formula 6102 by the workflow developer, the setting unit 143 sets the value "5" corresponding to "pages" as described with reference to FIG. 16. As a result, in the count-up formula illustrated in FIG. 17, "5" is set as a value to be counted.

As a method to confirm the current count value on the application, the explanatory note including the count value may be automatically set (generated) from the placement of the counter component in the setting of workflow. For example, based on the count-up formula "ocr.pages", the setting unit 143 determines the target component by "ocr" and the count target by "pages". On the other hand, the setting unit 143 sets (generates) the explanatory note by applying the explanatory note to a fixed phrase such as "{{unit}} currently executed by {{component}} is {counter}." The count-up expression is, for example, in the form of {{component}}. {{unit}}. In the case of the expression ocr.pages, the component is the ocr key and the unit is the pages key. By holding a label for each key in this way, the label corresponding to the ocr key is set as OCR, and the label corresponding to pages is set as the number of pages, and the setting unit 143 sets (generates) a fixed phrase "The number of pages currently executed by OCR is {counter}." Note that the {counter} is a specified variable, and when the {counter} is displayed on the application, the {counter} is replaced with the current value of the application. As described above, the workflow includes the counter component that counts the usage history of the component to be counted based on the count condition in response to the operation on the input screen displayed on the communication terminal 60. The counter component counts the usage history of the component to be counted in response to an execution of the counter component included in the workflow.

Figure 18:
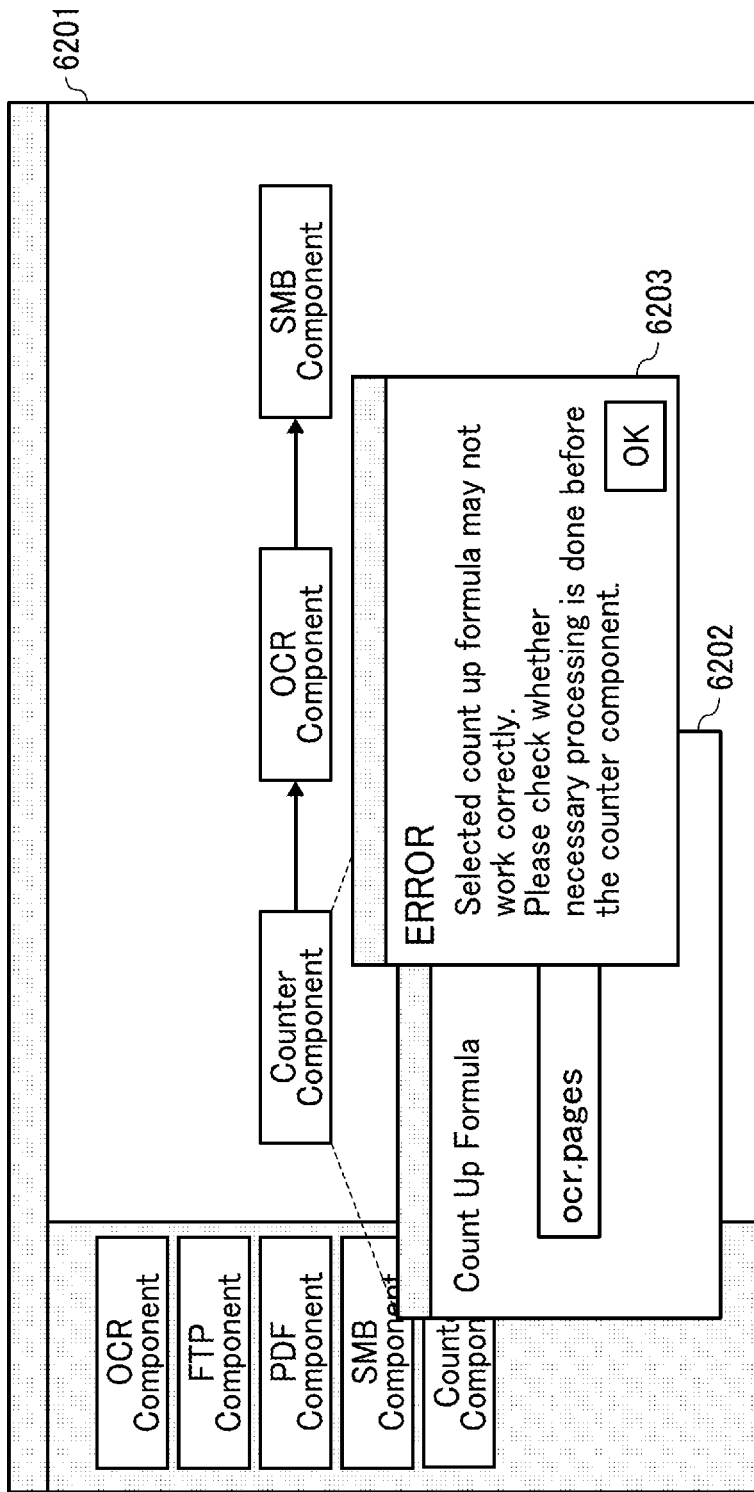
FIG. 18 is a diagram illustrating an example of displaying an error message on the workflow input screen displayed on the communication terminal.

FIG. 18 is a diagram illustrating an example of displaying an error message on the workflow input screen displayed on the communication terminal. As illustrated in FIG. 18, the display control unit 63 of the communication terminal 60 displays the workflow input screen 6201 on the display 606. In FIG. 18, the display control unit 63 displays a dialog presenting the count-up formula 6202 in a pop-up window for executing a count-up for the counter component among the counter component, the OCR component, and the SMB component dragged and dropped by the workflow developer.

FIG. 18 is an example of a screen displayed in response to an occurrence of the error as a result of the determination unit 17 of the information processing apparatus 10 executing a process to determine whether workflow is feasible in step S17 described above. Specifically, when a workflow is saved by a workflow creation editor, the determination unit 17 of the information processing apparatus 10 checks whether the process corresponding to the count-up formula "ocr" exists in a previous stage of the counter component. Here, the previous stage refers to the position where the executed process is placed looking from the component in which the processing is currently executed. In other words, the previous stage refers to a position corresponding to a past process on the time axis. On the other hand, a latter stage refers to a position where an unexecuted process is placed looking from the component in which the processing is currently executed. In other words, the latter stage is the position corresponding to a future process on the time axis. Based on a result of checking that the process corresponding to the count-up expression "ocr" does not exist in the previous stage of the counter component, (in other words, when the counter component is placed before the component to be counted), since count-up is not possible, the data exchange unit 11 transmits the notice screen information to display the notice screen indicating that the workflow is not set to the communication terminal 60.

Then, the display control unit 63 of the communication terminal 60 displays an error screen 6203 indicating the error message based on the notice screen information transmitted by the information processing apparatus 10. As for the display method of the error screen 6203, the error message on the error screen 6203 may be displayed in a pop-up window so as to be superimposed on the dialog of the count-up formula 6202 as illustrated in FIG. 18. In other words, the information processing apparatus 10 cooperates with the communication terminal 60 to notify the user of the error. In addition to the above case, the error notice is made in the case where multiple counter components are arranged in the same count-up formula. Alternatively, the determination process by the determination unit 17 may be executed regardless of the type of workflow.

Figure 19:
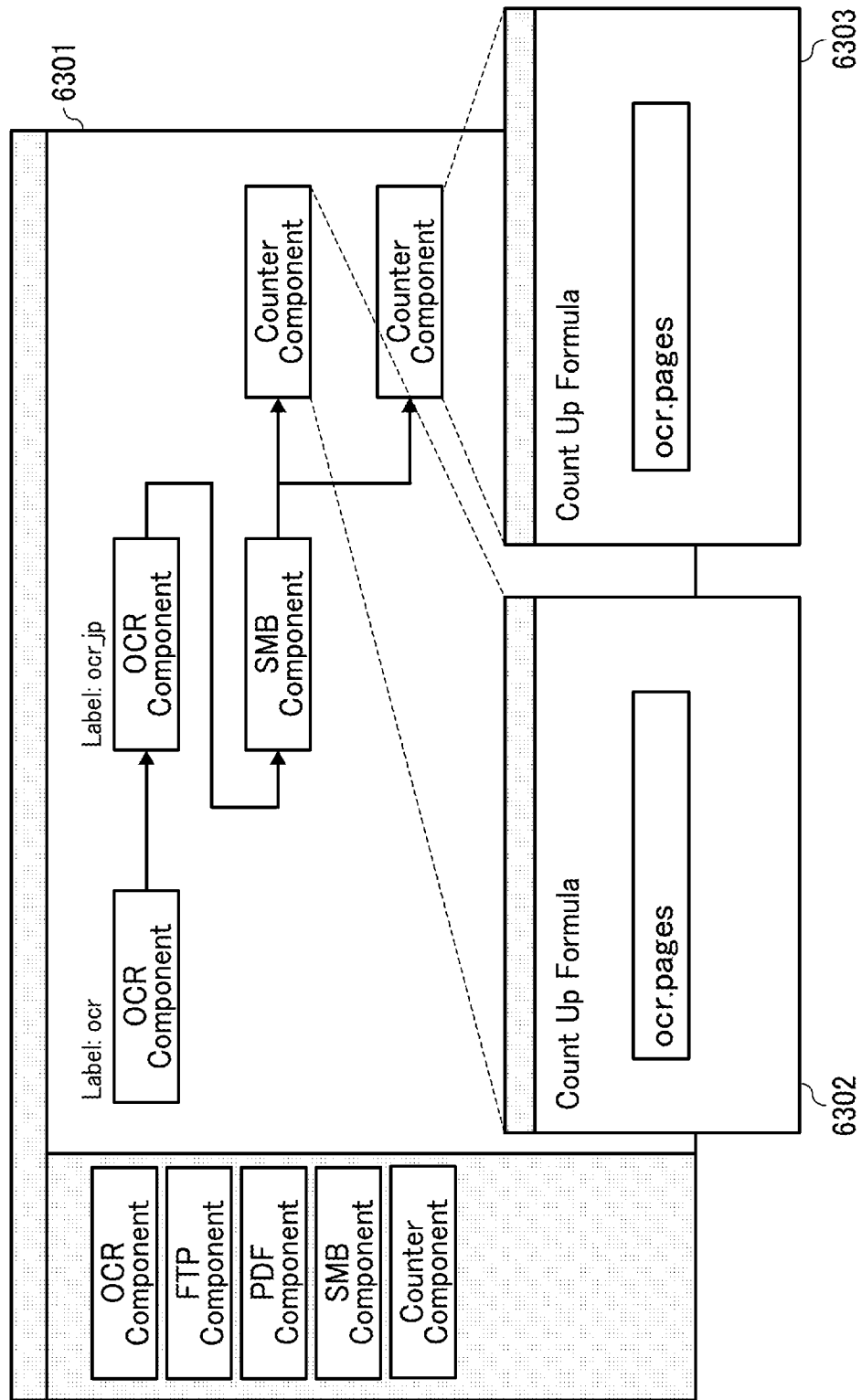
FIG. 19 is a diagram illustrating an example of displaying a plurality of counter components on the workflow input screen displayed on the communication terminal.

FIG. 19 is a diagram illustrating an example of displaying a plurality of counter components on the workflow input screen displayed on the communication terminal. As illustrated in FIG. 19, the display control unit 63 of the communication terminal 60 displays the workflow input screen 6301 on the display 606. In FIG. 19, the display control unit 63 displays each component (OCR component, OCR component, SMB component) included in the workflow application in order, and connects each component with the arrows. Further, the display control unit 63 displays two counter components side by side in parallel after the SMB component, and connects the SMB components in the front stage to each counter component with an arrow. Further, the display control unit 63 displays the pop-up window indicating the count-up formula 6302 and the pop-up window indicating the count-up formula 6303 for each of the two counter components.

Of the two counter components displayed in parallel, "ocr.pages" is displayed in the pop-up window of the count-up formula 6302 of one counter component, and "ocr_jp.pages" is displayed in the pop-up window of the count-up formula 6303 of the other counter component. In the workflow set in this way, a plurality of OCR components is placed. In such case, the workflow developer can set any label in the workflow to identify the same component. In the case the label is set by the workflow developer, the label is assigned to each counter component and the number of pages output by Label: ocr and the number of pages output by Label: ocr_jp is counted separately.

Figure 20:
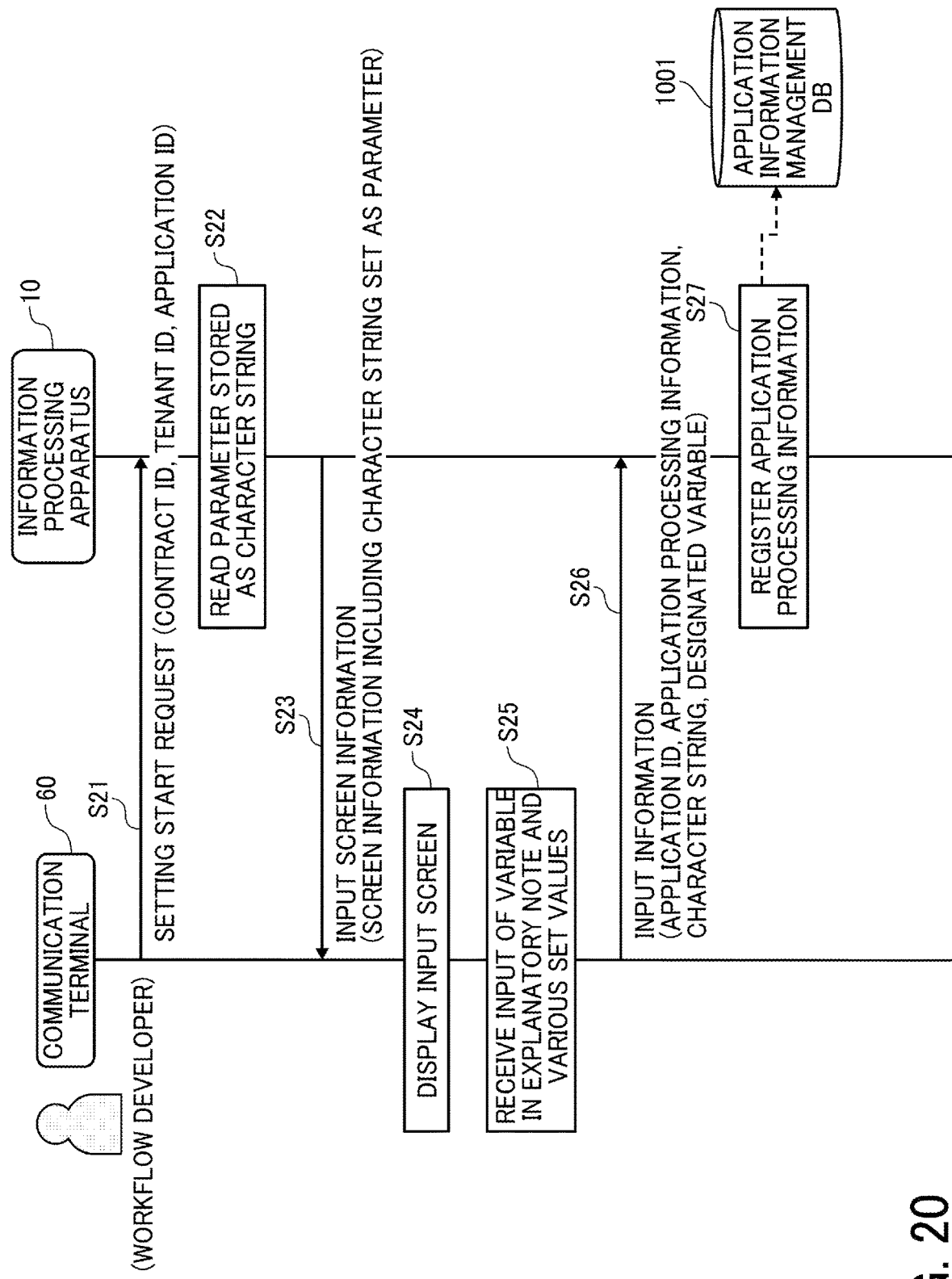
FIG. 20 is a sequence diagram illustrating an example of an application registration process.

An application registration process executed by setting at the communication terminal is described in the following. FIG. 20 is a sequence diagram illustrating an example of the application registration process.

In step S21, in response to an input operation or the like on the communication terminal 60 by the workflow developer, the data exchange unit 61 of the communication terminal 60 transmits a setting start request to the information processing apparatus 10. Accordingly, the data exchange unit 11 of the information processing apparatus 10 receives the setting start request transmitted by the communication terminal 60. The setting start request includes the contract ID, the tenant ID, and the application ID.

In step S22, the storing and reading unit 19 of the information processing apparatus reads a parameter stored as a character string in a specific area of the storage unit 1000.

In step S23, the data exchange unit 11 transmits the input screen information read in step S22 to the communication terminal 60. Accordingly, the data exchange unit 61 of the communication terminal 60 receives the input screen information transmitted by the information processing apparatus 10. At this time, the input screen information includes the parameter as the character string, and screen information data related to the screen information generated by the screen information generation unit 12.

Figure 21:
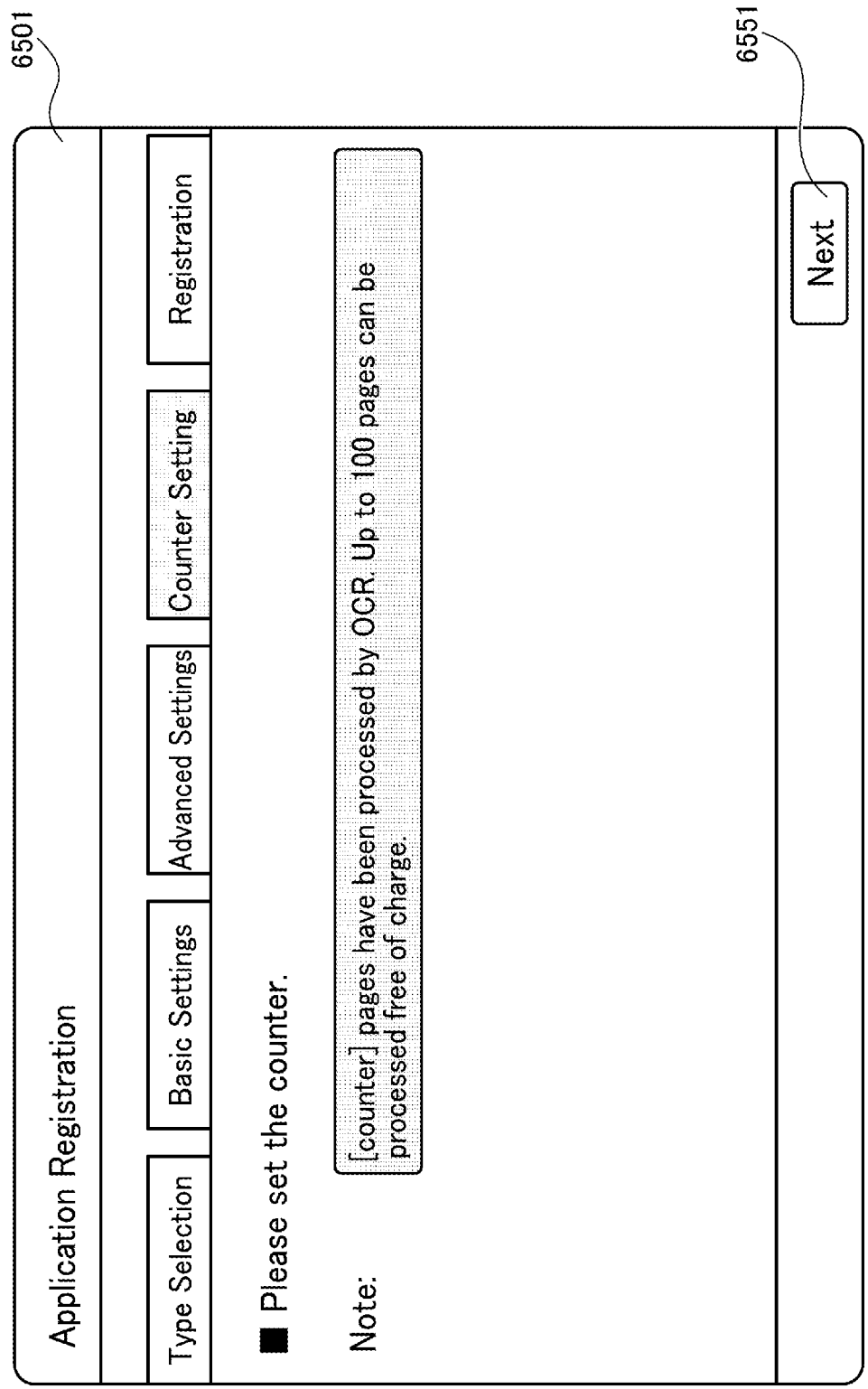
FIG. 21 is diagram illustrating an example of an application registration screen displayed on the communication terminal.

In step S24, the display control unit 63 of the communication terminal 60 displays the application registration screen 6501 on the display 606 based on the input screen information received in step S23. FIG. 21 is diagram illustrating an example of an application registration screen displayed on the communication terminal.

As illustrated in FIG. 21, the application registration screen 6501 displays, for example, various registration screens divided by tabs for type selection, basic settings, detailed settings, counter setting, and registration. In the example illustrated in FIG. 21, the setting screen in the counter setting tab is illustrated. In addition, on the setting screen in the counter setting tab, the explanatory note for setting the counter is displayed. The explanatory note in this case is, for example, "{counter} pages have been processed by OCR. Up to 100 pages can be processed free of charge. The explanatory note includes a designated variable {counter} for setting the number of pages. The designated variable in this case is as described in the explanatory note of FIG. 17.

Returning to FIG. 20, in step S25, the reception unit 62 of the communication terminal 60 receives the input of the variables in the explanatory note input by the workflow developer and various setting values (application processing information).

In step S26, the data exchange unit 61 transmits the input information according to the operation (input) received in step S25 to the information processing apparatus 10. Accordingly, the data exchange unit 11 of the information processing apparatus 10 receives the input information transmitted by the communication terminal 60. The input information includes the application ID, application processing information for application registration received in step S25, the character string, and the variable.

In step S27, the application management unit 141 of the input/output service processing unit 14 stores the application processing information in the application information management DB 1001 (see FIG. 6) based on the input information received in step S26. Further, the setting unit 143 replaces the variable input by the workflow developer with a count value actually counted and sets the explanatory note.

As described above, the information processing apparatus 10 registers the workflow application in response to the operation input by the workflow developer or the like.

The contract information setting process initiated by the service administrator inputting the contract information is described in the following.

FIG. 22 is a table illustrating an example of a contract information management table. In the storage unit 1000, a contract information management DB 1006 storing the contract information management table as illustrated in FIG. 22 is implemented In the contract information management table illustrated in FIG. 22, for each contract ID that identifies the contract information, the tenant ID that identifies the tenant, the user account that identifies the user who uses the user terminal 70 (including administrator ID), the billing target contract that indicates the contract to be billed in response to the execution of the workflow, the billing destination, and the default parameters which are the initial settings at the execution of the workflow are stored in association with each other. The default parameters include the OCR language, blank page removal, and the delivery destination to which files, data, etc. are delivered.

FIG. 23 is a table illustrating an example of an available application management table. In the storage unit 1000, the available application management DB 1007 storing the available application management table as illustrated in FIG. 23 is implemented.

In the available application management table illustrated in FIG. 23, the tenant ID and the application ID are associated and stored for each contract ID. In the available application management table, the application ID that identifies the application that has become available in association with the contract ID corresponding to the billing target contract selected by the service administrator on the user terminal 70 is stored together with the tenant ID.

Figure 24A:
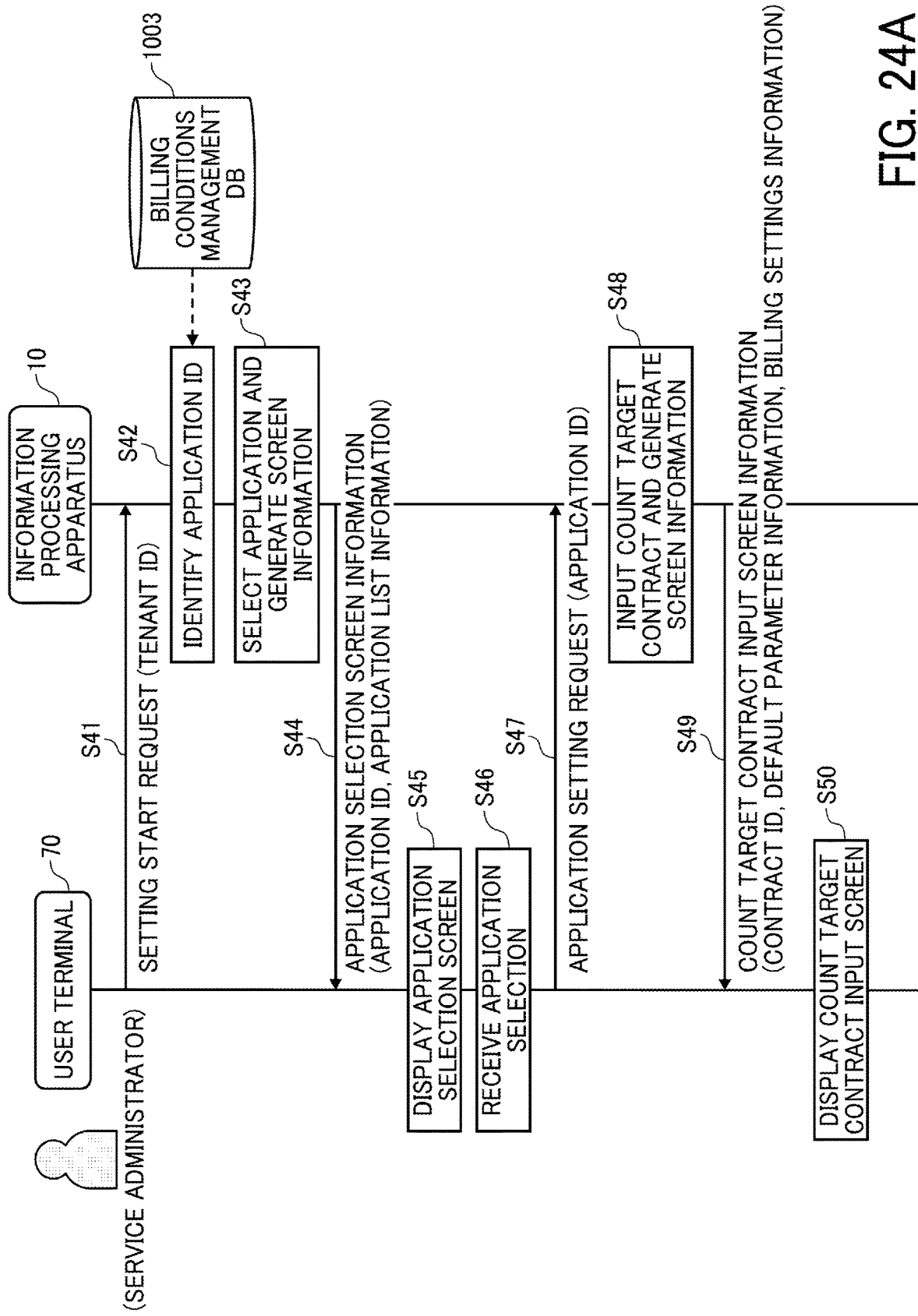
FIGS. 24A and 24B are a sequence diagram illustrating an example of a billing settings input process and an available application registration process.

FIG. 24A is a sequence diagram illustrating an example of a billing settings input process and an available application registration process. In step S41, the service administrator performs an input operation or the like to the input device provided in the user terminal 70 and the data exchange unit 71 of the user terminal 70 transmits a setting start request to the information processing apparatus 10. Accordingly, the data exchange unit 11 of the information processing apparatus 10 receives the setting start request transmitted by the user terminal 70. The tenant ID is included in the apparatus registration request. The process of step S41 may be, for example, a login process performed by the service administrator inputting the tenant ID.

In step S42, the storing and reading unit 19 of the information processing apparatus reads the corresponding contract ID and application ID by searching the billing condition management DB 1003 (see FIG. 10) using the tenant ID received in step S41 as a search key.

In step S43, the screen information generation unit 12 generates application selection screen information from screen information templates stored in the storage unit 1000. Specifically, the screen information generation unit 12 uses, for example, the tenant ID used in the process of step S42 and the application ID read from the billing condition management DB 1003 (see FIG. 10) of the storage unit 1000 and generates the application selection screen information related to the application selection screen from the screen information templates stored in the storage unit 1000. Alternatively, the screen generation unit 131 of the web service processing unit 13 may generate the application selection screen information described above instead of the screen information generation unit 12.

In step S44, the data exchange unit 11 transmits the application selection screen information to the user terminal 70. Accordingly, the data exchange unit 71 of the user terminal 70 receives the application selection screen information transmitted by the information processing apparatus 10. The application selection screen information includes the application selection screen information (data) which is screen data for selecting an application on the user terminal 70, and application list information indicating a list of applications.

Figure 25:
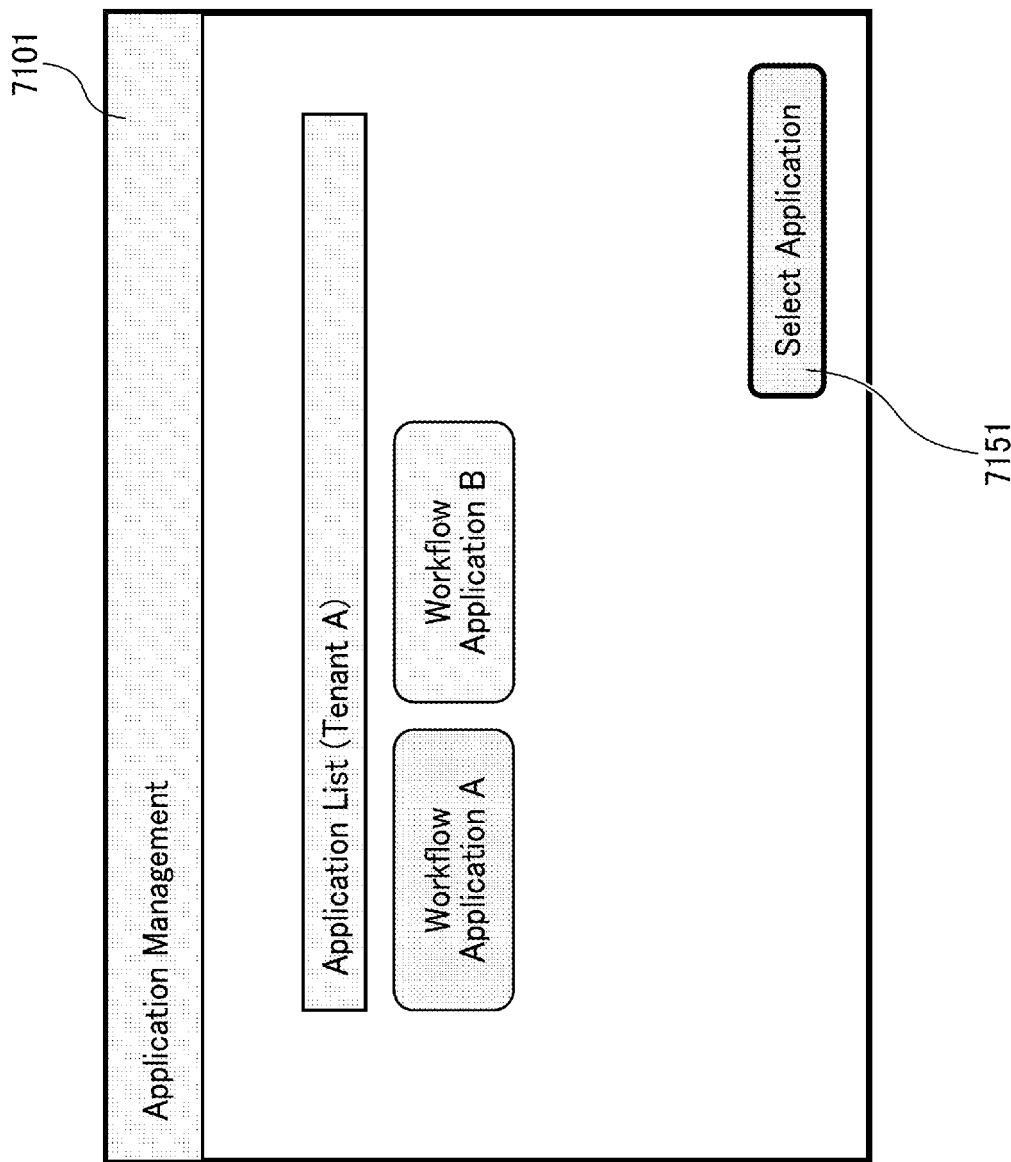
FIG. 25 is a diagram illustrating an example of an application selection screen displayed on the user terminal.

In step S45, the display control unit 73 of the user terminal 70 displays the application selection screen 7101 on the display 706 based on the application selection screen information received in step S43. FIG. 25 is a diagram illustrating an example of the application selection screen displayed on the user terminal.

As illustrated in FIG. 25, on the application selection screen 7101, for example, an icon of a workflow application A and an icon of a workflow application B are displayed as the list of applications registered for tenant A. On the application selection screen 7101, for example, the service administrator confirms the selection of the workflow application by selecting (pressing, tapping, etc.) the workflow application A. In step S46, the reception unit 72 of the user terminal 70 receives the selection of the workflow application according to the operation of the service administrator. After that, the display control unit 73 performs a transition of the screen from the application selection screen 7101 to the setting screen of the selected application. A UI as illustrated in FIG. 25 may be provided to confirm the selection of the workflow application by operating (pressing or tapping, etc.) the application selection button 7151 separately provided for selecting the application. Further, on the application selection screen 7101, in the case the workflow application C and the workflow application D are registered in another tenant (for example, tenant B) the icon of the workflow application C and the icon of the workflow application D are displayed. Note that a button or the like may be displayed instead of the icon.

Returning to FIG. 24A, in step S47, the data exchange unit 71 of the user terminal 70 transmits an application setting request to the information processing apparatus 10. Accordingly, the data exchange unit 11 of the information processing apparatus 10 receives the application setting request transmitted by the user terminal 70. The application setting request includes the application ID. Specifically, the data exchange unit 71 transmits an application setting request including an application ID indicating the selected application to the information processing apparatus 10 in response to receiving the application selection (workflow application selection) on the application selection screen 7101 illustrated in FIG. 25.

In step S48, the screen information generation unit 12 of the information processing apparatus 10 generates count target contract input screen information from the screen information template stored in the specific area of the storage unit 1000. Specifically, the screen information generation unit 12 generates, for example, the count target contract input screen information related to the count target contract input screen from the screen information template stored in the specific area of the storage unit 1000, based on the tenant ID received in the process of step S41 and the default parameter settings set in the workflow application corresponding to the application ID. Alternatively, the screen generation unit 131 of the web service processing unit 13 may generate the above-mentioned count target contract input screen information instead of the screen information generation unit 12.

In step S49, the data exchange unit 11 transmits the count target contract input screen information to the user terminal 70. Accordingly, the data exchange unit 71 of the user terminal 70 receives the count target contract input screen information transmitted by the information processing apparatus 10. The count target contract input screen is a screen for associating the workflow with the count target contract. The count target contract input screen information includes default parameter information for inputting detailed information related to a distribution application on the user terminal 70, billing settings information for selecting the count target contract to be charged, and the contract ID. Specifically, the data exchange unit 11 transmits the count target contract input screen information to display the count target contract input screen for associating the count target contract with the workflow entered by the workflow developer to the user terminal 70 (user terminal) through the communication network 5.

In the information processing system according to the first embodiment, for example, when the processes of steps S41 and S44 described above are executed, another device or the like may reside between the user terminal 70 and the information processing apparatus 10. In other words, each information (data) transmitted and received between the user terminal 70 and the information processing apparatus 10 may be configured to be transmitted and received through another device. The configuration described above is applicable with another processing step executed between the user terminal 70 and the information processing apparatus 10.

Figure 26:
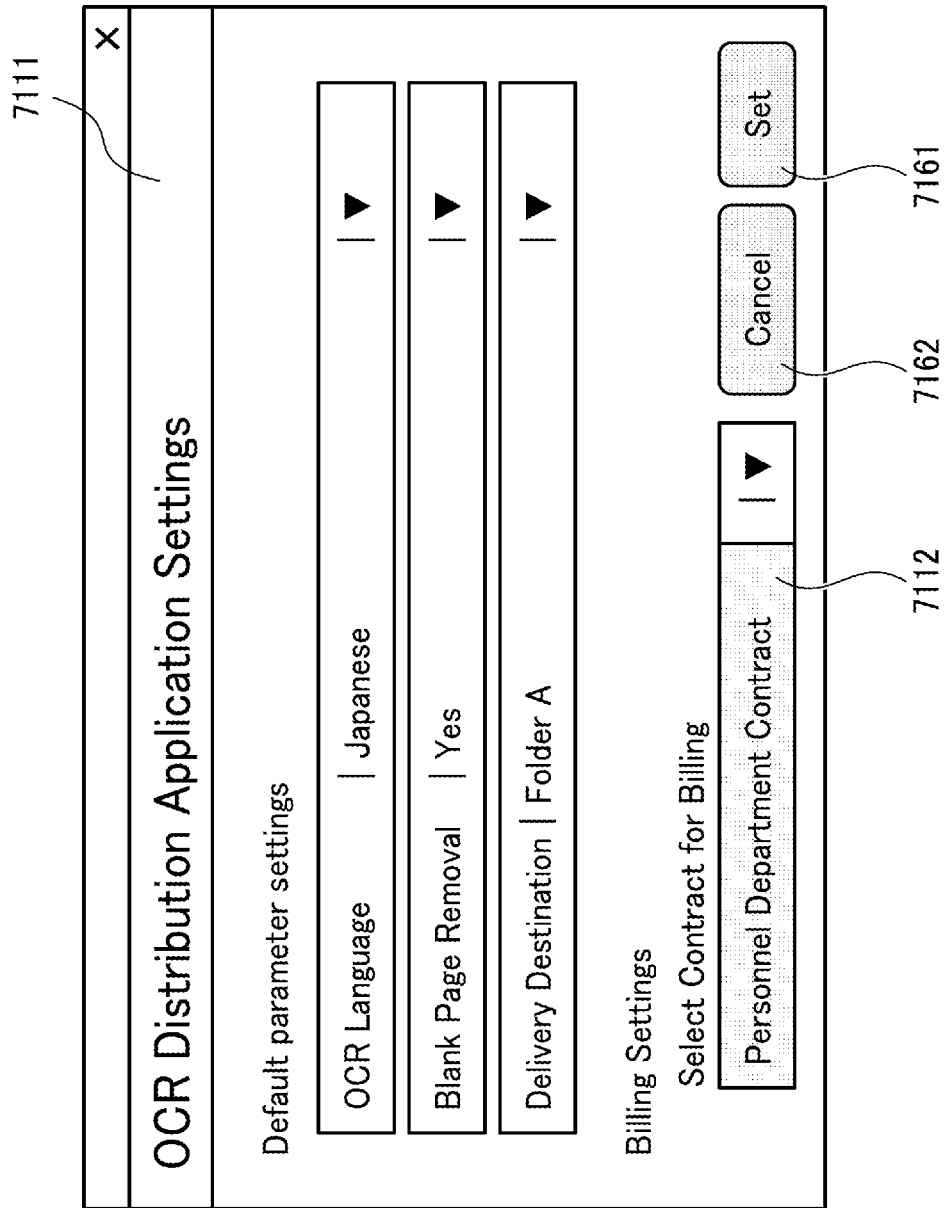
FIG. 26 is a diagram illustrating an example of a count target contract input screen displayed on the user terminal.

In step S50, the display control unit 73 of the user terminal 70 displays the count target contract input screen 7111 on the display 706 based on the count target contract input screen information received in step S49. FIG. 26 is a diagram illustrating an example of the count target contract input screen displayed on the user terminal.

As illustrated in FIG. 26, the default parameter settings and the billing settings are displayed on the count target contract input screen 7111. In the default parameter settings, "Japanese" is displayed as an OCR language, "Yes" is displayed as blank page removal, and "Folder A" is displayed as a delivery destination together with respective pull-down key. The service administrator may reset any parameter using respective pull-down key.

In the billing settings, "personnel department contract" is set as a contract for billing. Similarly for the billing settings, the service administrator may use the pull-down key to reselect contracts that represent other billing settings. Then, the service administrator confirm the reset and reselected contents by operating a setting button 7161. On the other hand, the service administrator may cancel the reset and reselected contents or processes by operating a cancel button 7162.

Figure 24B:
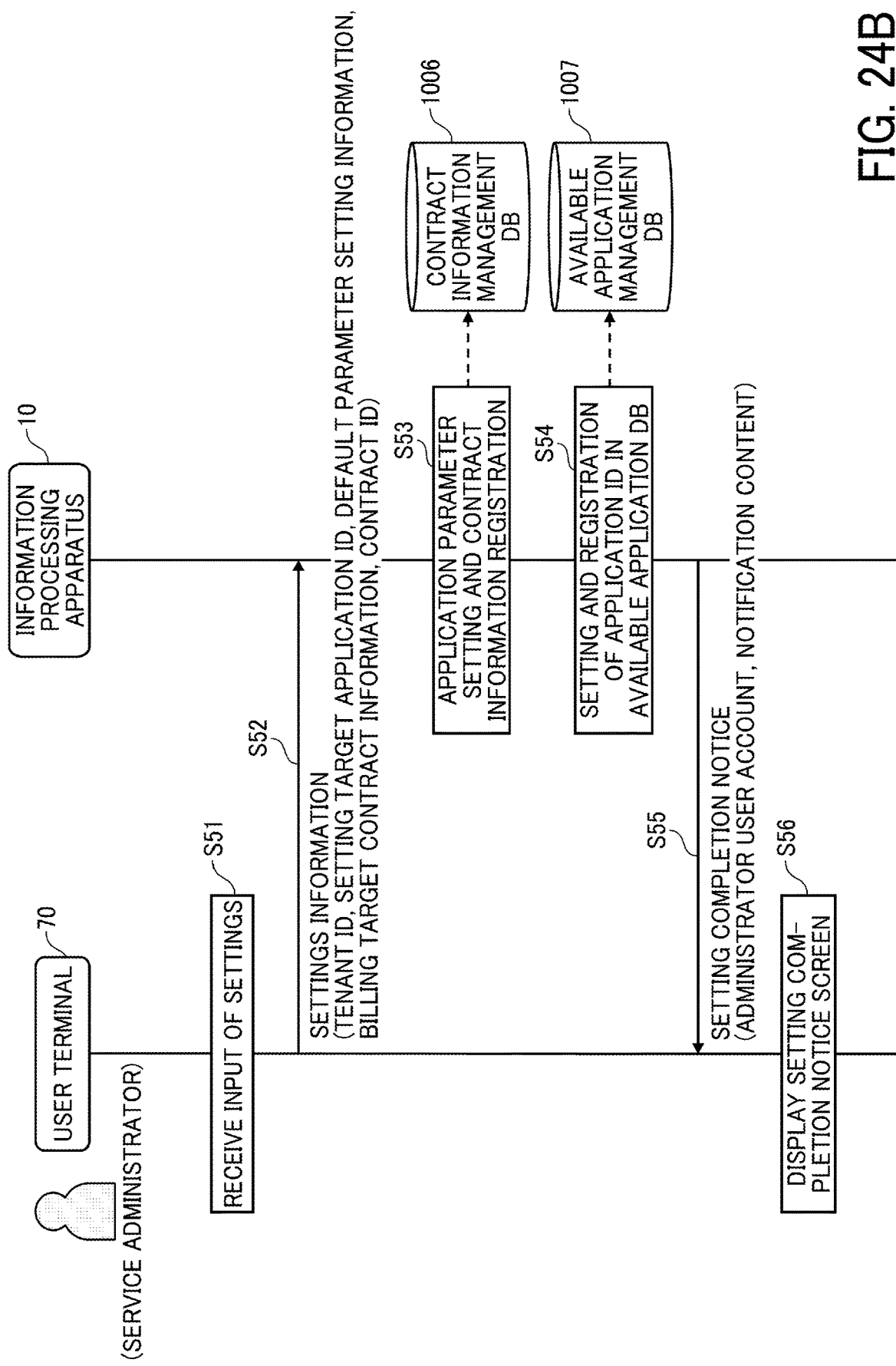

FIG. 24B is a sequence diagram illustrating an example of a billing settings input process and an available application registration process. In step S51, the reception unit 72 of the user terminal 70 receives the settings set and selected by the service administrator.

In step S52, the data exchange unit 71 transmits settings information to the information processing apparatus 10. Accordingly, the data exchange unit 11 of the information processing apparatus 10 receives the settings information transmitted by the user terminal 70. The settings information includes the tenant ID, the application ID of the application to be set, default parameter settings information, the billing target contract information which is an example of the predetermined count target contract, and the contract ID of the billing target contract.

In step S53, the setting unit 143 cooperates with the storing and reading unit 19 and stores the parameters of the application in the contract information management DB 1006 (see FIG. 22) and the billing target contract information related to the billing target contract, which is an example of the predetermined count target contract, based on the settings information received in step S52. Specifically, the setting unit 143 stores the predetermined workflow received in step S52 in association with the predetermined billing target contract information (for example, "personnel department contract information" or the like). The billing target contract information in this case is an example of predetermined count target contract information indicating a predetermined count target contract. The setting unit 143 further stores the billing target contract, the billing destination, and default parameters, which are examples of billing target contract information corresponding to the contract ID stored in the contract information management DB 1006 (see FIG. 22).

In step S54, the setting unit 143 cooperates with the storing and reading unit 19 and stores the application ID indicating the available application corresponding to the contract ID and the tenant ID of the contract information management DB 1006 (see FIG. 22) stored in step S53, in the available application management DB 1007 (see FIG. 23). Specifically, the setting unit 143 and the storing and reading unit 19 stores the tenant ID associated with the contract ID and the application ID of the application (workflow application) that became available by being associated with the contract ID in association with each other, based on the contract ID indicating the billing target contract received from the user terminal 70 (user terminal) in step S52.

In step S55, the data exchange unit 11 transmits a setting completion notice to the user terminal 70 before the predetermined workflow is executed. Accordingly, the data exchange unit 71 of the user terminal 70 receives the setting completion notice transmitted by the information processing apparatus 10. The setting completion notice may be a notice by email and includes the administrator user account to which the notice is sent and content indicating completion of the setting. Further, the setting completion notice may be transmitted to a user other than the user (for example, the service administrator) who uses the user terminal 70. In this case, for example, the setting completion notice may be broadcasted to other service administrators who belong to the same tenant as the service administrator and have the same contract setting authority as the service administrator described above. Further, the setting completion notice may be simultaneously distributed to all users represented by the user account associated with the tenant ID stored in the contract information management DB 1006 (see FIG. 22).

With these delivery forms, one or more users (for example, a service administrator) who use the user terminal 70 are notified of the fact that the tenant to which the service administrator belongs and the predetermined workflow application (for example, OCR distribution application) are associated with the predetermined count target contract before executing the predetermined workflow.

In step S56, the display control unit 73 of the user terminal 70 displays the setting completion notice screen 7121 (content of the email) including the received setting completion notice on the display 706.

As described above, in response to the input from the service administrator, the information processing apparatus 10 stores the billing target contract information, which is an example of the contract information associated with the predetermined workflow application, and the parameters. Further, the information processing apparatus 10 registers the parameters in response to an operation input from a general service user instead of the service administrator. In this case, the process that can be executed by the service user is the process excluding the selection and setting of the billing target contract in step S52 among the processes up to steps S41 to S50 and S51 to S56 described above.

Figure 27:
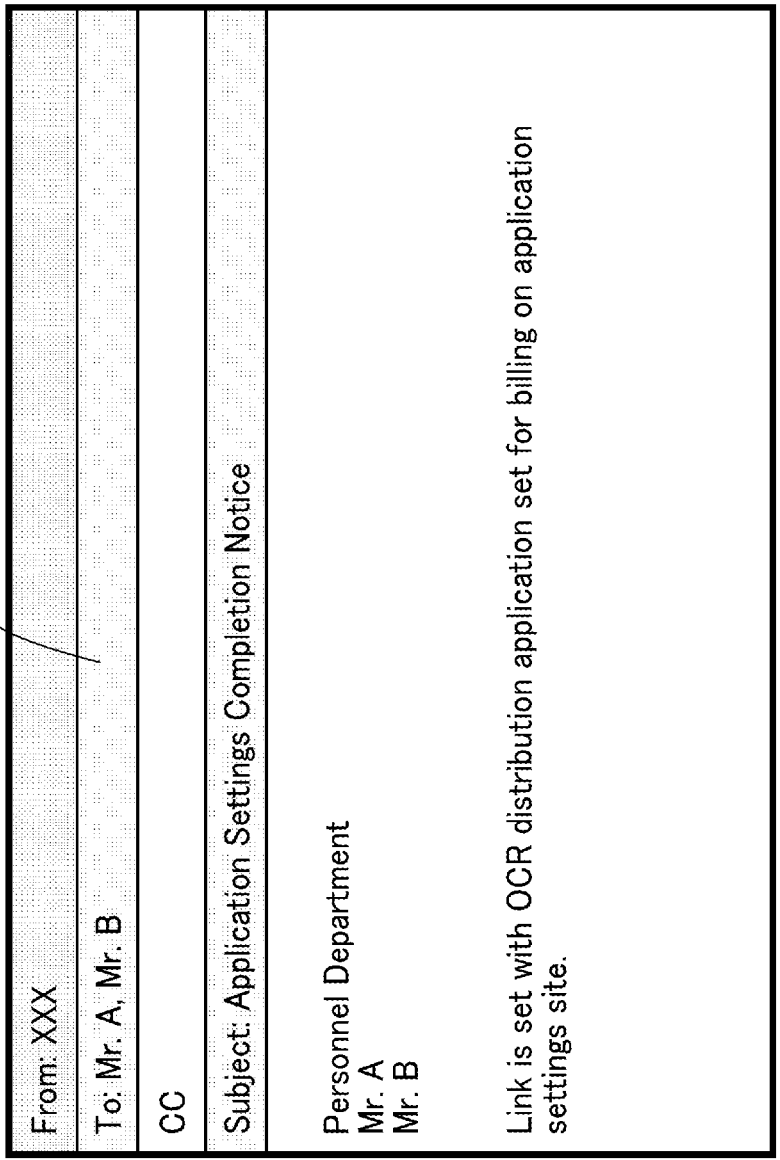
FIG. 27 is a diagram illustrating an example of an application settings completion notice displayed on the user terminal.

FIG. 27 is a diagram illustrating an example of an application setting completion notice displayed on the user terminal. As illustrated in FIG. 27, the display control unit 73 of the user terminal 70 displays the setting completion notice screen 7121 on the display 706 based on the setting completion notice received in step S55.

The setting completion notice screen 7121 is, for example, a notice screen displaying an email and among the user accounts stored in the contract information management DB 1006 (see FIG. 22), at least one email address indicated by the administrator ID assigned as the service administrator is set as the destination. This allows at least one service administrator to receive the email related to application setting completion notice and recognize that the predetermined billing target contract has been concluded for the application used by the user belonging to the tenant. The application setting completion notice is not limited to the email, but may be a notice by chat or the like.

Figure 28:
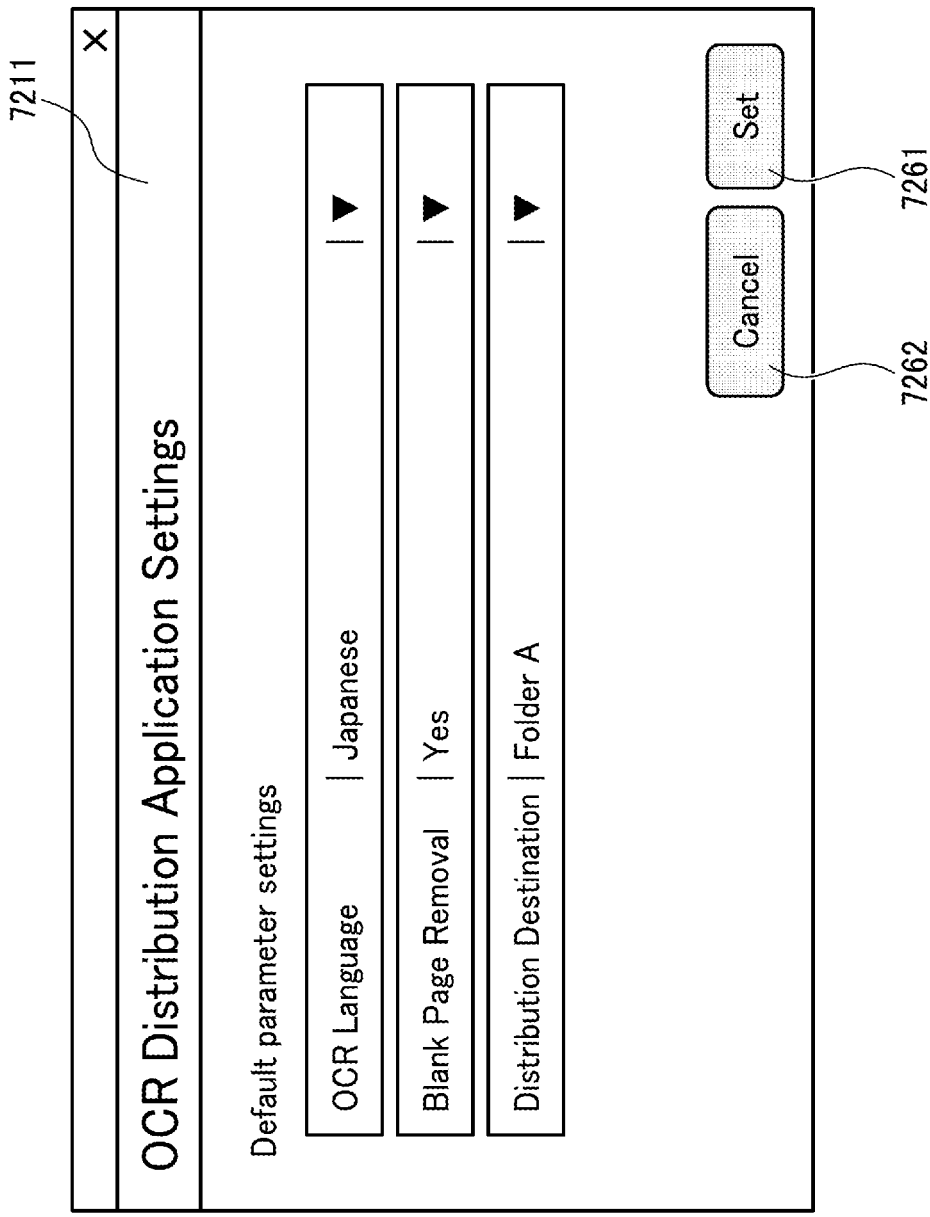
FIG. 28 is a diagram illustrating another example of the count target contract input screen displayed on the user terminal.

FIG. 28 is a diagram illustrating another example of the count target contract input screen displayed on the user terminal. As illustrated in FIG. 28, default parameter settings are displayed on a distribution application settings input screen 7211. In the default parameter settings, "Japanese" is displayed as an OCR language, "Yes" is displayed as blank page removal, and "Folder A" is displayed as a delivery destination together with respective pull-down key. The service user at the service usage site resets any parameter by using each pull-down key.

Then, the user confirms the reset by pressing a set button 7261. On the other hand, the user may cancel the reset or processing by pressing a cancel button 7262. On the distribution application settings input screen 7211 operable by the service user, settings for a billing target contract, which is an example of the count target contract, is not displayed since authority to set the contract is assigned to the service administrator and not to the service user.

Figure 29:
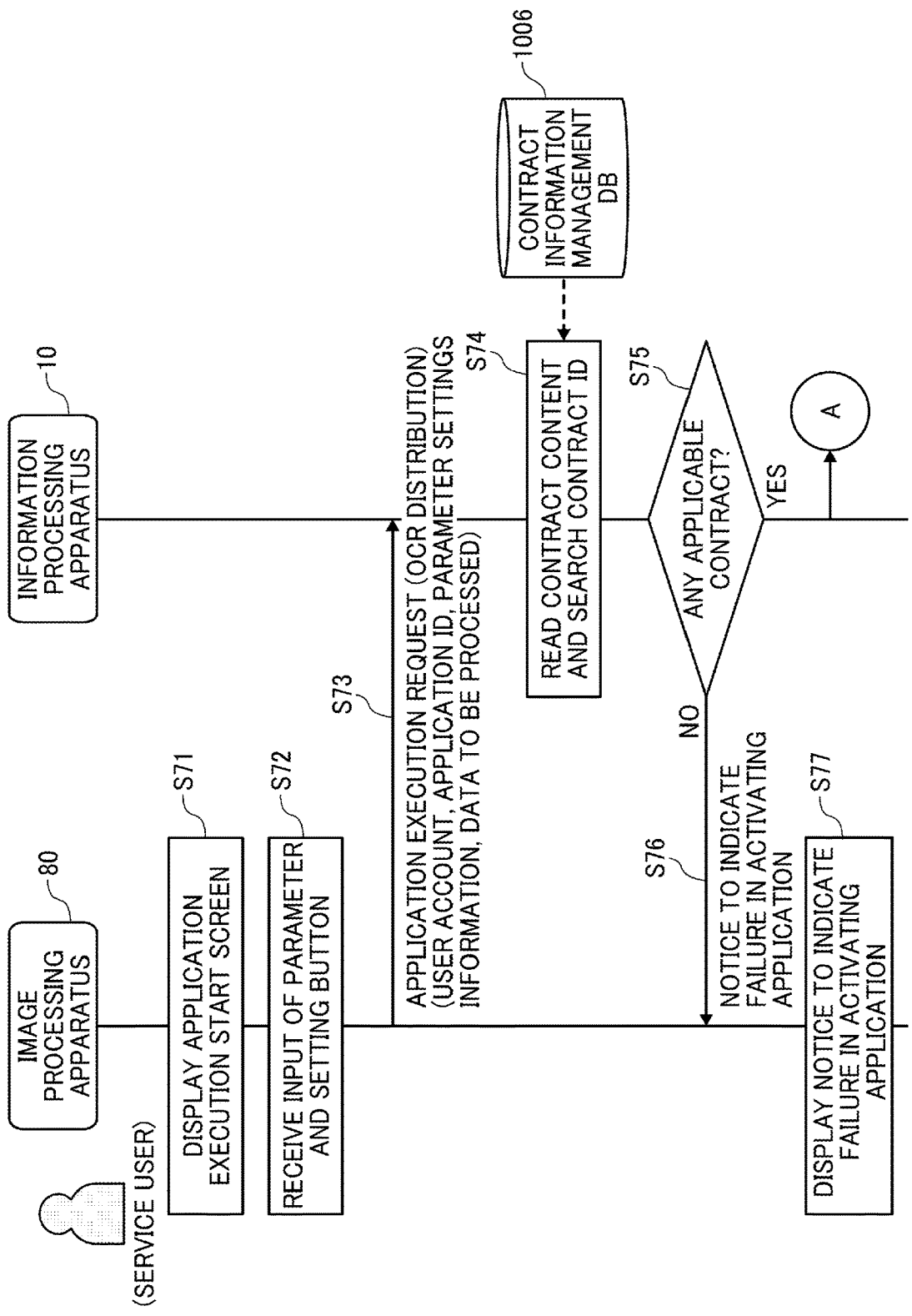
FIG. 29 is a sequence diagram illustrating an example of a workflow execution start process.

A workflow execution process executed by the service user is described in the following. FIG. 29 is a sequence diagram illustrating an example of a workflow execution start process. In step S71 in FIG. 29, the display control unit 83 of the image processing apparatus 80 displays an application execution start screen on the control panel 840.

In step S72, the reception unit 82 of the image processing apparatus 80 receives input of the various parameters and pressing of the setting button by the service user on the application execution start screen described below. In step S73, the data exchange unit 11 transmits an application execution request to the information processing apparatus 10. Accordingly, the data exchange unit 11 of the information processing apparatus 10 receives the application execution request transmitted by the image processing apparatus 80. The application execution request includes the user account, the application ID, parameter settings information, and processing target data.

In step S74, the storing and reading unit 19 of the information processing apparatus uses the user account received in step S73 as a search key and searches the contract information management DB 1006 (see FIG. 22) for the corresponding billing target contract and contract ID. In step S75, the determination unit 17 determines whether an applicable contract is stored.

Figure 31:
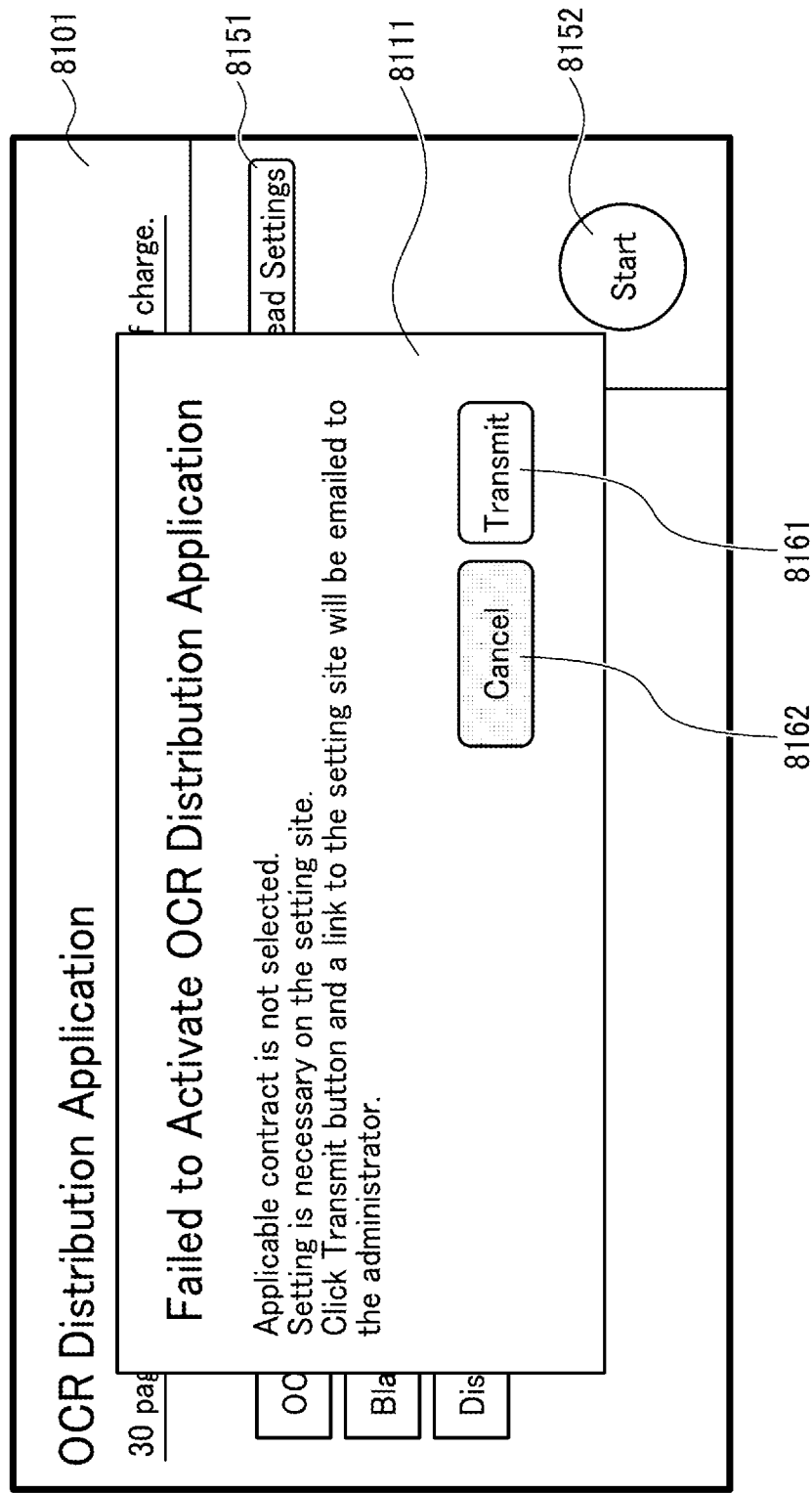
FIG. 31 is a diagram illustrating an example of a screen prompting setting of contract information displayed on an image processing apparatus.

In step S76, based on a determination by the determination unit 17 that the applicable contract is not stored, the data exchange unit 11 transmits an application start failure notice to the image processing apparatus 80. Accordingly, the data exchange unit 81 of the image processing apparatus 80 receives the application start failure notice transmitted by the information processing apparatus 10. The application start failure notice includes a message as illustrated in FIG. 31 as described below. Specifically, in response to an attempt to execute a workflow not associated with the predetermined count target contract information by the image processing apparatus 80 (an example of the predetermined processing execution device), the data exchange unit 11 transmits a notice prompting the image processing apparatus 80 to set the predetermined count target contract as described in steps S51 to S56 above.

In step S77, the display control unit 83 of the image processing apparatus 80 displays the application start failure notice screen indicating the application start failure notice on the control panel 840 based on the application start failure notice received in step S76.

On the other hand, based on a determination by the determination unit 17 that the applicable contract is stored, the information processing apparatus 10 executes the processing following "A".

In the information processing system according to the first embodiment, for example, when the processes of step S73 and S76 described above is executed, another device or the like may reside between the image processing apparatus 80 and the information processing apparatus 10. In other words, each information (data) transmitted and received between the image processing apparatus 80 and the information processing apparatus 10 may be configured to be transmitted and received through another device. The configuration described above is applicable with another processing step executed between the image processing apparatus 80 and the information processing apparatus 10.

Figure 30:
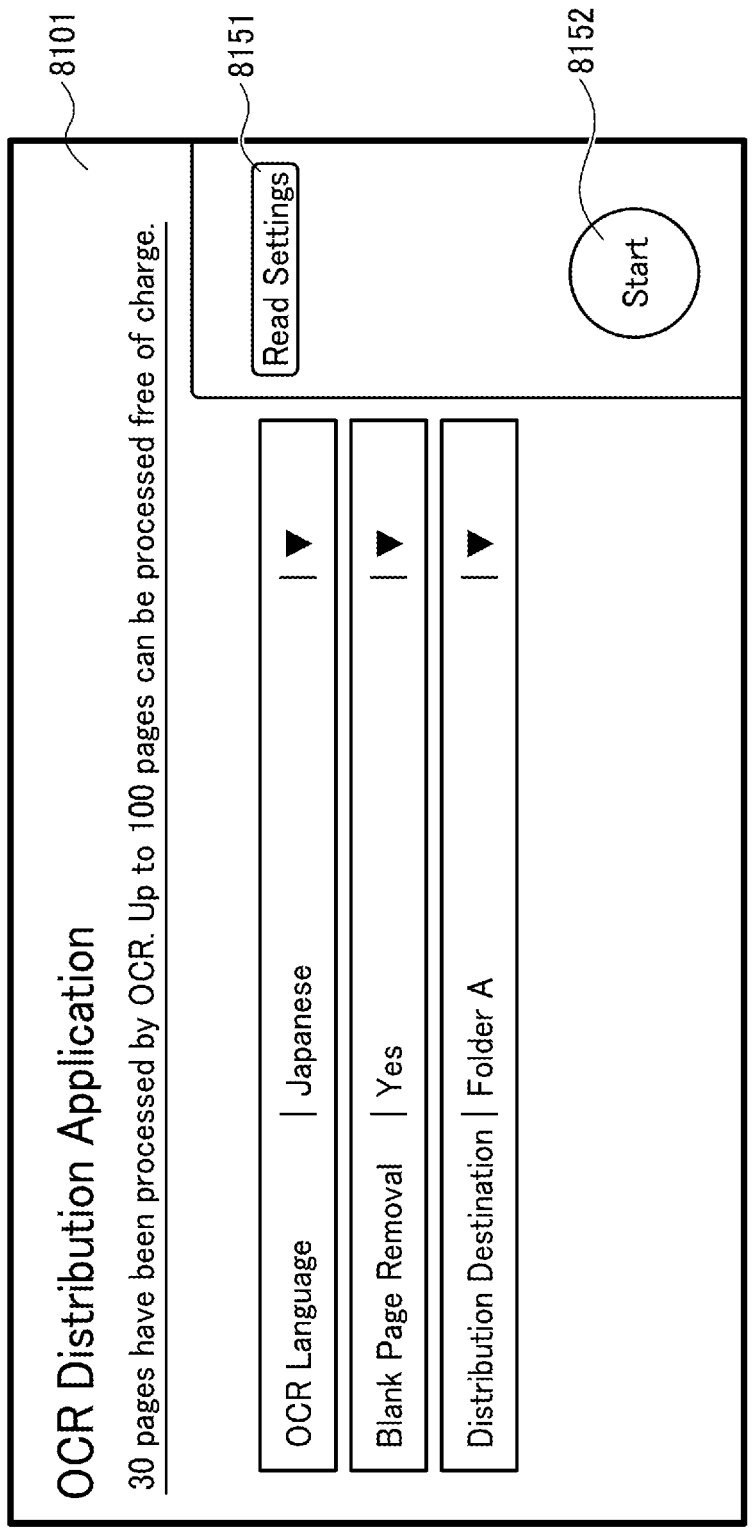
FIG. 30 is a diagram illustrating an example of an application execution start screen displayed on an image processing apparatus.

FIG. 30 is a diagram illustrating an example of an application execution start screen displayed on the image processing apparatus. As illustrated in FIG. 30, the display control unit 83 of the image processing apparatus 80 displays the application execution start screen 8101 on the control panel 840. On the application execution start screen 8101, the application name ("OCR distribution application" in the example illustrated in FIG. 30), current processing status, for example, the number of pages processed and the number of pages to be processed free of charge in the case of OCR processing, various parameters set in the parameter settings, a read settings button 8151, and a start button 8152 are displayed. The service user presses the read settings button 8151 to make settings related to reading, and then presses the start button 8152 to execute the OCR distribution application. The pressing of the read settings button 8151 may be omitted.

FIG. 31 is a diagram illustrating an example of a screen prompting to set the contract information displayed at the image processing apparatus. As illustrated in FIG. 31, the display control unit 83 of the image processing apparatus 80 displays the application start failure notice screen 8111 on the control panel 840. The application start failure notice screen 8111 is, for example, a pop-up window displayed on the application execution start screen 8101, and includes a notice indicating the failure of starting the application. Further, the application start failure notice screen 8111 includes a transmit button 8161 and a cancel button 8162, and the service user may transmit an email to the service administrator to request the service administrator to conclude a contract by pressing the transmit button 8161. The content of the email may be generated by either the information processing apparatus 10 or the image processing apparatus 80, and a message in the email may be preset including a request to conclude the contract.

FIG. 32 is a sequence diagram illustrating an example of a workflow execution process. In step S81, based on a determination by the determination unit 17 that the applicable contract is stored in step S75, the application management unit 141 of the input/output service processing unit 14 identifies the processing content. Specifically, the application management unit 141 searches the application information management DB 1001 (see FIG. 6) and obtains a corresponding application name and the component ID that identifies the component included in the application using the received application ID as a search key. Further, the application management unit 141 identifies the language information as the settings information and the transmission destination information such as the destination and carbon copy (CC) by searching the application settings management DB 1002 (see FIG. 9) using the identified component ID as a search key.

In step S82, the document service unit 16 executes a process included in a series of processes based on the identified processing content (process flow information). As described above, since the document service unit 16 includes the OCR processing unit 161 and the file conversion unit 162, each processing is executed by a functional unit according to the processing content identified in step S81.

Figure 33A:
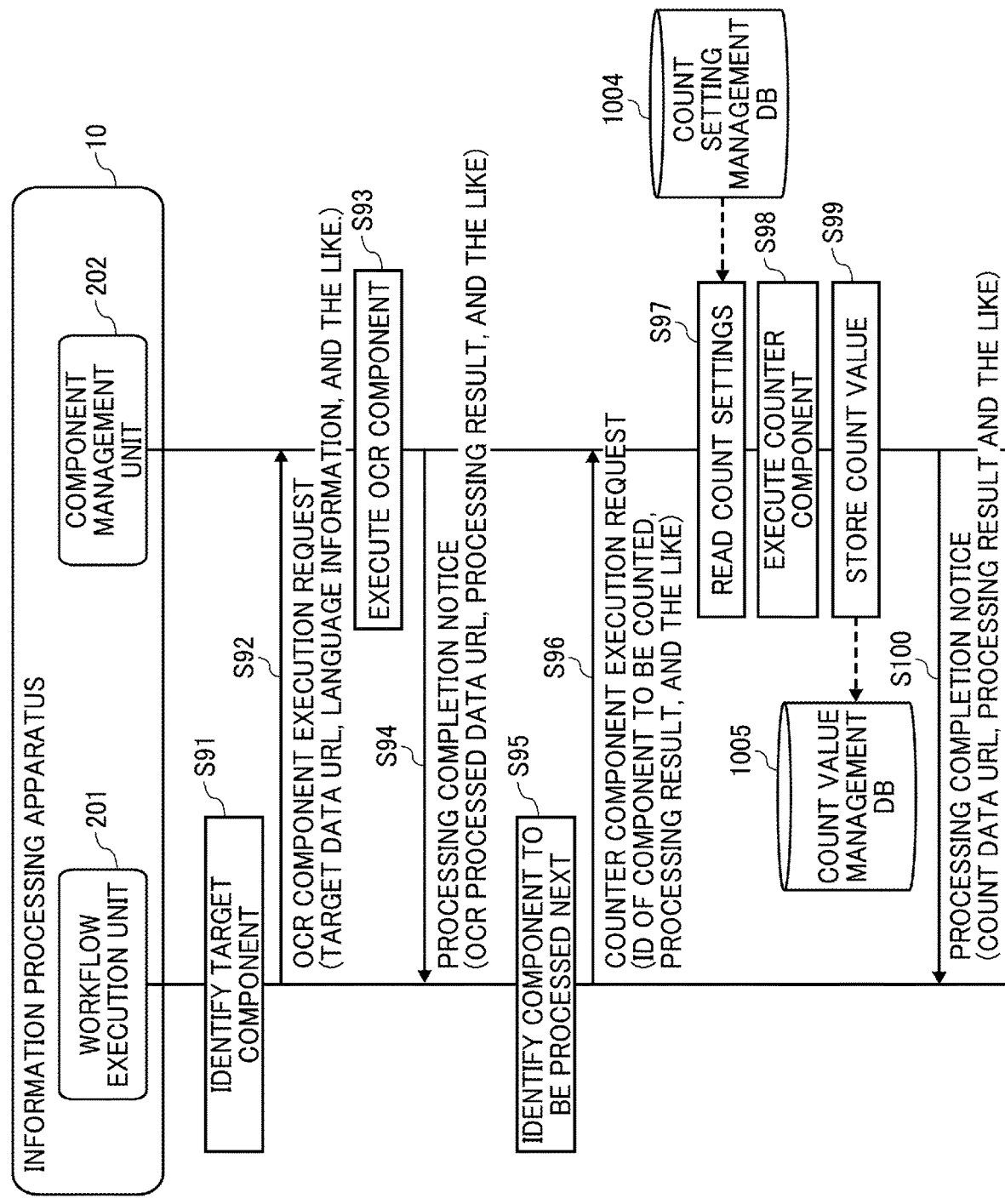
FIGS. 33A and 33B are a sequence diagram illustrating an example of detailed process of executing a workflow.
Figure 33B:
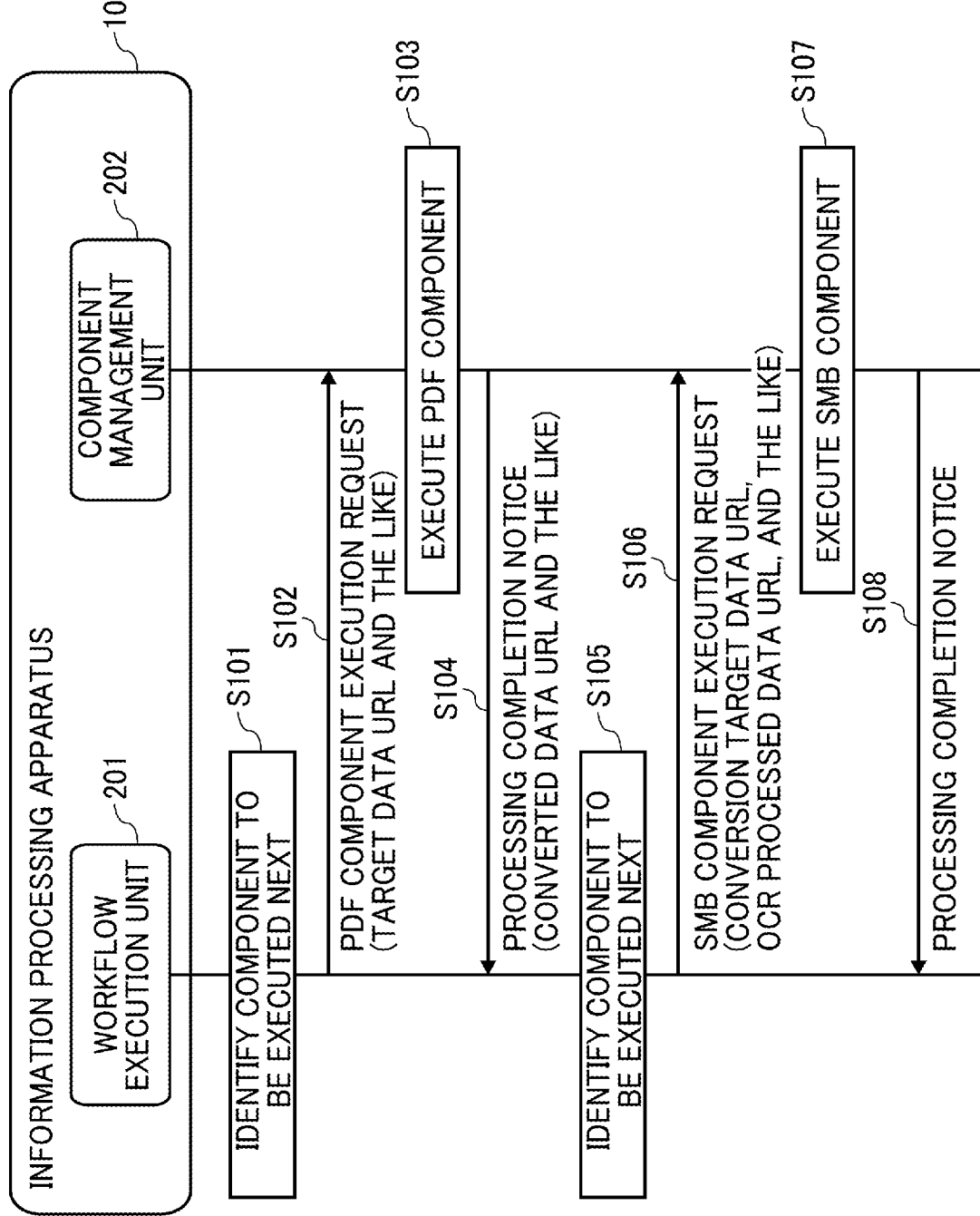

FIGS. 33A and 33B are a sequence diagram illustrating an example of detailed process of executing the workflow. In FIG. 33A, an example of executing "workflow application B" among the applications managed by the application information management DB 1001 (see FIG. 6) as the processing content of the workflow identified in step S81 is described. The description is made based on the examples illustrated in FIGS. 6A and 11A, with reference to the data table stored in the application information management DB 1001 (see FIG. 6A) and the data table stored in the count setting management DB 1004 (see FIG. 11A).

As illustrated in FIG. 33A, in step S91, the workflow execution unit 201 of the information processing apparatus 10 identifies the OCR component as the first component to be processed from the workflow B to be executed.

In step S92, the workflow execution unit 201 transmits an OCR component execution request to the component management unit 202. Accordingly, the component management unit 202 receives the OCR component execution request from the workflow execution unit 201. The OCR component execution request includes the URL and language information of the target data identified in step S81.

In step S93, the component management unit 202 executes the OCR processing using the OCR component identified in step S71 stored in the component group 210.

In step S94, the component management unit 202 transmits the processing completion notice to the workflow execution unit 201. Accordingly, the workflow execution unit 201 receives the processing completion notice from the component management unit 202. The processing completion notice includes the URL of the target data and the language information.

In step S95, the workflow execution unit 201 identifies a counter component as a component to be executed in the next process of the workflow application B.

In step S96, the workflow execution unit 201 transmits a counter component execution request to the component management unit 202. Accordingly, the component management unit 202 receives the counter component execution request from the workflow execution unit 201. The counter component execution request includes the component ID that identifies the OCR component to be counted, and the processing result of the OCR component.

In step S97, the component management unit 202 reads the corresponding count setting by searching the count setting management DB 1004 (see FIGS. 11A and 11B) using the count setting ID or the counter condition that identifies the target counter component as a search key.

In step S98, the component management unit 202 causes the counter component 219 identified in step S75 to execute the count process under the count condition included in the count setting (conditional expression) read in step S97. Specifically, in response to the execution of the workflow, the counter component 219 counts the usage history of the OCR component to be counted based on the count setting read in step S77 corresponding to the set predetermined count target contract. For example, in the case the count setting is "ocr_pages", the counter component 219 counts the usage amount (for example, the number of pages) of the OCR component to count the usage history. Further, for example, in the case the count setting is "executions", the counter component 219 counts the number of processes of the OCR component to count the usage history. As described above, in response to an execution of the predetermined workflow, the counter component 219 counts the usage history of the components (for example, OCR component) included in the predetermined workflow as usage information associated with the set predetermined count target contract. Since information on the usage, i.e., usage information, is used for billing, the usage information may be referred to as billing information.

FIGS. 34A and 34B are tables illustrating examples of count value management tables. In the storage unit 1000, a count value management DB 1005 storing count value management tables as illustrated in FIGS. 34A and 34B is implemented.

In the count value management table illustrated in FIG. 34A, the tenant ID, the user account, and the count value are stored in association with each contract ID described above. In the count value management table illustrated in FIG. 34B, the tenant ID, the user account, a keyword, and the count value are stored in association with each contract ID described above. Among these, the keyword is information associated with a label input by the communication terminal 60, and includes the above-mentioned "ocr_pages", "evacuations", and the like. The count value managed in the count value management table is, for example, the number of pages.

Returning to FIG. 33A, in step S99, the component management unit 202 stores (registers) the count value obtained in the count process in the count value management DB 1005 (see FIG. 22), and in step S100, notifies the workflow execution unit 201 of the completion of process. Accordingly, the workflow execution unit 201 receives the processing completion notice from the component management unit 202.

In FIG. 33B, in step S101, the workflow execution unit 201 identifies a PDF component which is an example of image conversion function as a component to be executed in the next process of the workflow application B.

In step S102, the workflow execution unit 201 transmits the PDF component execution request to the component management unit 202. Accordingly, the component management unit 202 receives the OCR component execution request from the workflow execution unit 201. The PDF component execution request includes the URL of the data to be image-converted.

In step S103, the component management unit 202 executes the image conversion process as an example of the execution content of the PDF component.

In step S104, the component management unit 202 transmits the processing completion notice to the workflow execution unit 201. Accordingly, the workflow execution unit 201 receives the processing completion notice from the component management unit 202. The processing completion notice includes the URL of the image-converted data and the like.

In step S105, the workflow execution unit 201 identifies an SMB component as a component to be executed in the next process of the workflow application B.

In step S106, the workflow execution unit 201 transmits the SMB component execution request to the component management unit 202. Accordingly, the component management unit 202 receives the OCR component execution request from the workflow execution unit 201. The SMB component execution request includes the URL of the data to be converted, the URL of the OCR processing data, and the like.

In step S107, the component management unit 202 executes a file sharing process or the like as an example of the execution content of the SMB component.

In step S108, the component management unit 202 transmits the processing completion notice to the workflow execution unit 201. Accordingly, the workflow execution unit 201 receives the processing completion notice from the component management unit 202.

As described above, the information processing apparatus 10 executes the predetermined workflow including the plurality of components operated (input) by the workflow developer or the like.

Returning to FIG. 32, in step S83, the storing and reading unit 19 of the information processing apparatus 10 reads the corresponding billing conditions by searching the billing conditions management DB 1003 (see FIG. 10) using the application ID received in step S51 as a search key. The billing conditions read here include a billing frequency, a billing unit, and a calculation formula.

In step S84, the storing and reading unit 19 reads the corresponding count value by searching the count value management DB 1005 (see FIG. 34) using the user account, which is an example of the account information received in step S51, as a search key.

In step S85, the data exchange unit 11 transmits the billing information for the workflow used by the user to the billing processing system 90. Accordingly, the communication unit 91 of the billing processing system 90 receives the billing information transmitted by the information processing apparatus 10. The billing information includes the contract ID, the tenant ID, and the count value read in step S84. In other words, in step S85, the data exchange unit 11 transmits the usage history (count value) counted by the count service unit 18 to the billing processing system 90 according to the condition, time, etc. set for each tenant.

In step S86, the data exchange unit 11 may transmit an application execution response to the image processing apparatus 80. Accordingly, the data exchange unit 81 of the image processing apparatus 80 receives the application execution response transmitted by the information processing apparatus 10. The application execution response includes the processing completion notice. The process of step S86 may be omitted.

In response to receiving the billing information transmitted by the information processing apparatus 10 in step S85, the service processing unit 92 of the billing processing system 90 calculates the usage fee based on the count value included in the billing information in step S86. Specifically, the billing processing system 90 calculates the usage fee based on the count value included in the billing information received in step S56 and the billing conditions for each user stored in advance in the storage unit 9000. The billing conditions stored in the storage unit 9000 are the same as the billing conditions stored in the billing conditions management DB 1003.

In this way, the information processing apparatus 10 sets the workflow including the plurality of components set according to the operation (input) by the workflow developer or the like. Further, the information processing apparatus 10 executes the set workflow and transmit the count value obtained by the executed workflow to the billing processing system 90 at a specific time. Accordingly, the billing processing system 90 calculates the usage fee based on the received count value.

In the above-described embodiment, an example of calculating the usage fee based on the usage history (count value) received by the billing processing system 90 is illustrated, however, the information processing apparatus 10 may calculate the usage fee based on the count value obtained in the executed workflow.

In this case, the component management unit 202 (counter component 219) multiplies the billing conditions (billing frequency, billing unit, calculation formula, etc.) read in step S83 by the count value stored in the count value management DB 1005 (see FIG. 22) to calculate the usage fee. The usage amount calculated by the component management unit 202 may be transmitted to the billing processing system 90 by the data exchange unit 11 in step S85 described above, for example.

Further, in the information processing system according to the first embodiment, for example, when the process of step S85 described above is executed, another device or the like may reside between the information processing apparatus 10 and the billing processing system 90. In other words, the information (data) transmitted and received between the information processing apparatus 10 and the billing processing system 90 may be configured to be transmitted and received through another device. The configuration described above is applicable with another processing step executed between the information processing apparatus 10 and the billing processing system 90.

As described above, according to the first embodiment, the information processing apparatus 10 transmits the count target contract input screen information to the user terminal 70 in step S49, sets the application parameters in the contract information management DB 1006 based on the settings information received and transmitted by the user terminal 70, and stores the billing target contract information related to the billing target contract, which is an example of the predetermined count target contract in step S53. In response to an execution of the workflow, the counter component 219 counts the usage history of the OCR component to be counted in association with the set predetermined count target contract in step S98. As a result, when executing the predetermined workflow, the user can easily understand which contract the workflow is based on.

A description is given of a second embodiment of the present disclosure in the following. In the description of the second embodiment, the component management unit 202 (counter component 219) counts the number of executions of the workflow instead of the count service unit 18. Since the entire system configuration and various hardware configurations in various hardware resources are the same as those in the first embodiment, the description thereof is omitted. Regarding the functional configuration, each functional configuration except for the billing condition management DB 1003 (see FIG. 10) and the count value management DB 1005 (see FIG. 34) is the same as the functional configuration of the first embodiment.

Figure 35:
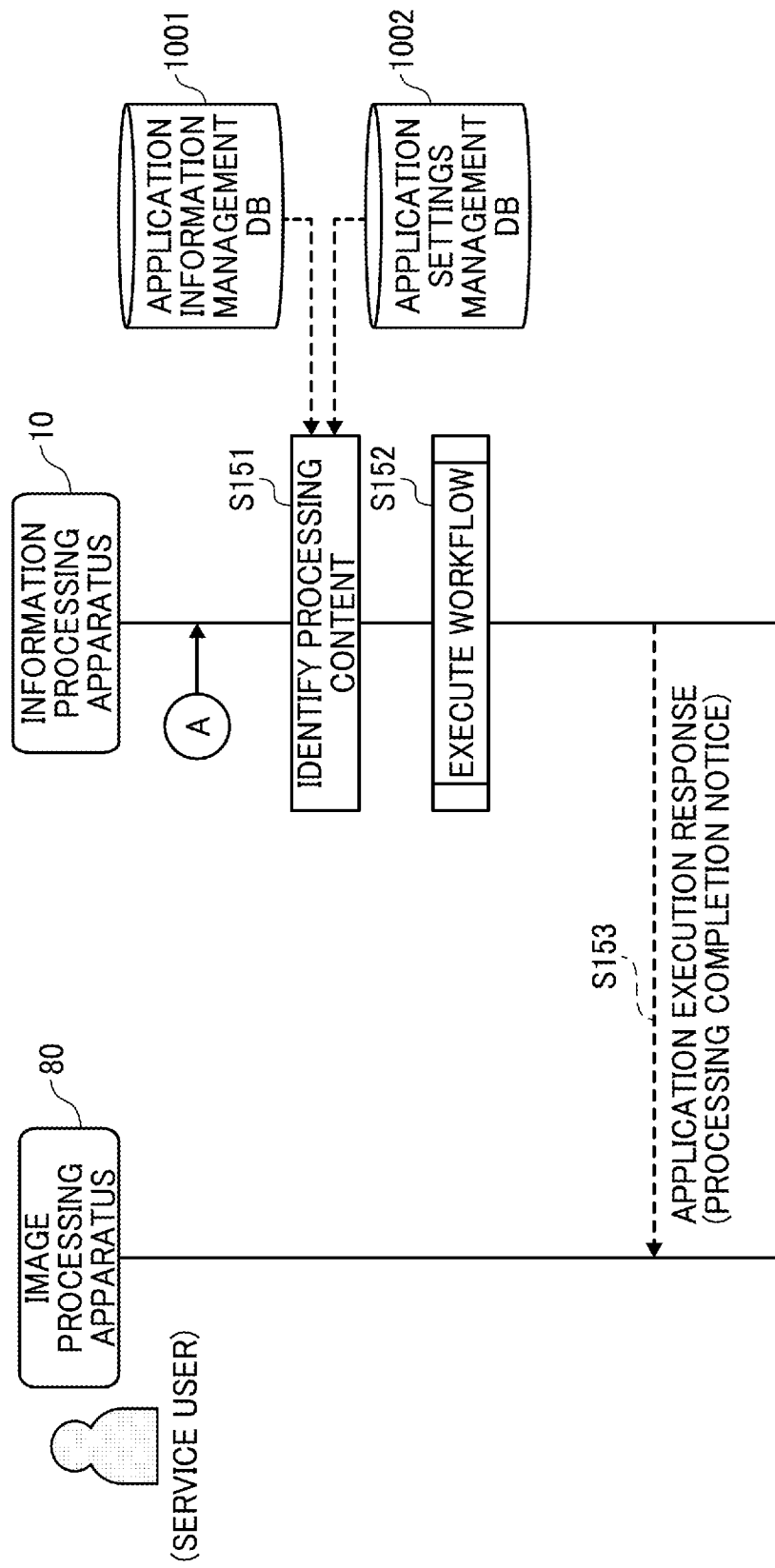
FIG. 35 is a sequence diagram illustrating an example of a workflow execution process according to a second embodiment.

FIG. 35 is a sequence diagram illustrating an example of a workflow execution process according to the second embodiment. In the second embodiment, in the process of step S75 of the first embodiment, the following process is executed based on a determination that applicable contract is available (process after "A" in FIG. 35). In step S151, the application management unit 141 of the input/output service processing unit 14 identifies the processing content. Since this process is the same as the process executed in step S81, detailed description thereof is omitted.

In step S152, the document service unit 16 executes a specific process included in a series of processes based on the identified process content (process flow information). In step S153, the data exchange unit 11 may transmit an application execution response to the image processing apparatus 80 as described in step S86.

Figure 36A:
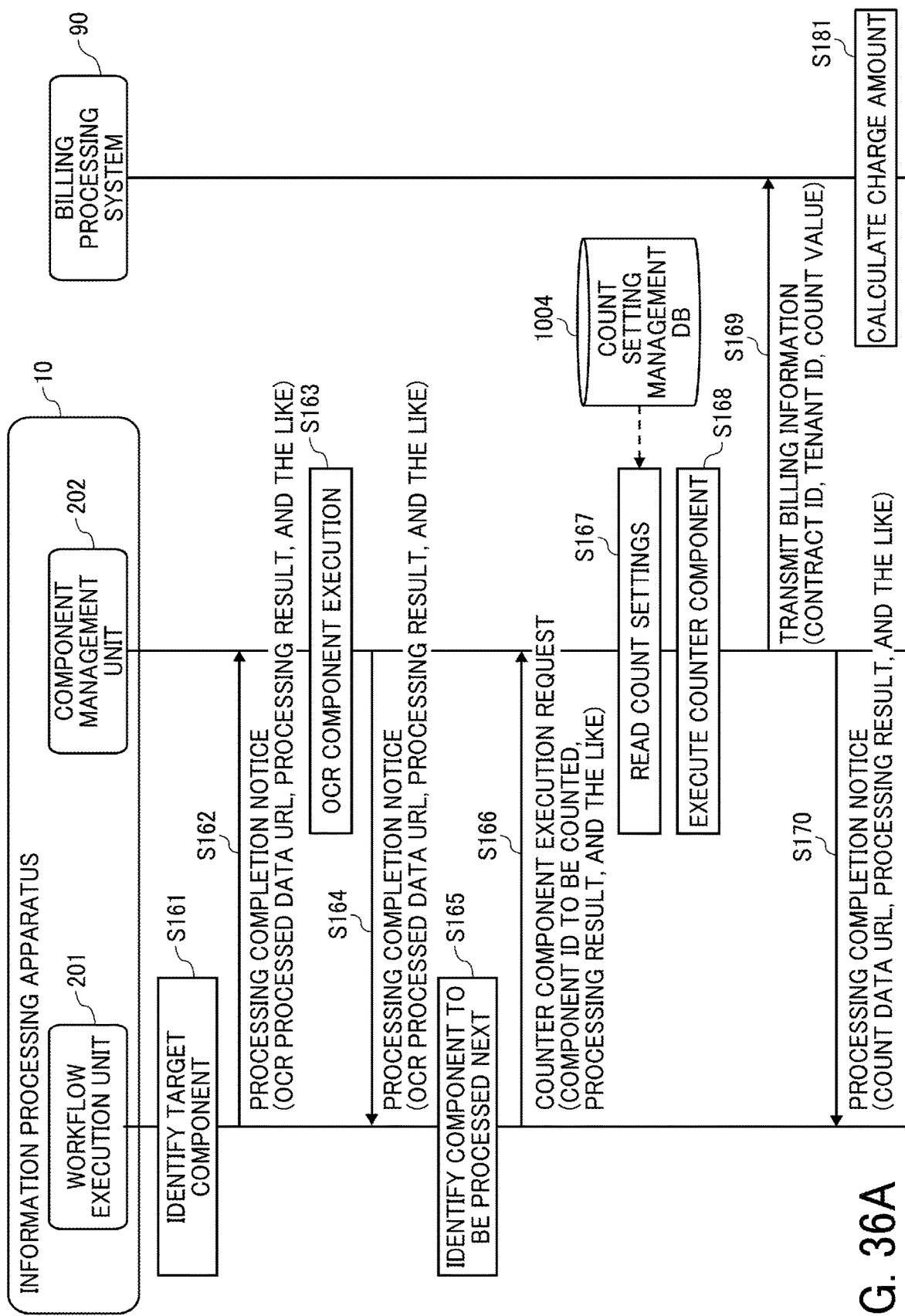

FIGS. 36A and 36B are a sequence diagram illustrating an example of detailed process of executing the workflow according to the second embodiment. Here, since the processes of steps S161 to S168 illustrated in FIG. 36A are the same as the processes of steps S91 to S98 illustrated in FIG. 33A, the description thereof is omitted. In step S169, after executing the counting process by the counter component, the data exchange unit 11 transmits the billing information to the billing processing system 90. Accordingly, the communication unit 91 of the billing processing system 90 receives the billing information transmitted by the information processing apparatus 10. The billing information includes the contract ID, the tenant ID, and the count value counted in step S168. In other words, in step S85, the data exchange unit 11 transmits the usage history (count value) counted by the count service unit 18 to the billing processing system 90 according to the condition, time, etc. set for each tenant.

In step S181, the service processing unit 92 of the billing processing system 90 calculates the usage fee based on the count value included in the billing information. Specifically, the billing processing system 90 calculates the usage fee based on the count value included in the billing information received in step S169. Regarding the calculation of the usage fee executed in the billing processing system 90, for example, the usage fee for each processing count or page managed by the information processing apparatus 10 may be set and calculated.

Since the processes of steps S171 to S178 illustrated in FIG. 36B are the same as the processes of steps S101 to S108 described above, detailed description thereof is omitted.

As described above, according to the second embodiment, the information processing apparatus 10 executes the counting process of the component to be counted in the set predetermined workflow in step S168, and transmits the counted value to the billing processing system 90 in step S169. As a result, in addition to the effect of the first embodiment, the information processing apparatus 10 does not manage the billing conditions for calculating the usage fee and the counted count value, and the system configuration and the functional configuration are simplified.

The various data tables, types of data definitions, and managed data are examples, and are not limited to the content exemplified in each embodiment, the usage environment, and the like.

Further, the various tables of the above-described embodiments may be generated by the learning effect of machine learning, and by classifying the data of each associated item by machine learning, the tables may not be used. Here, the machine learning is a technology for making a computer acquire learning ability like a human being and the computer autonomously generates an algorithm for determination such as data identification from learning data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more of these learning.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
a memory; and
circuitry configured to:
execute a predetermined workflow including a plurality of components,
receive the predetermined workflow and billing setting information indicating a billing destination, the billing setting information being selected by a user, and the billing destination being a target to be billed for an execution of the component included in the predetermined workflow;
store the predetermined workflow received in association with the billing setting information indicating the billing destination;
identify at least one component to be counted among the plurality of the components that are executed in the predetermined workflow, and
count, in association with the billing destination, usage history of the at least one component that is to be counted,
wherein the plurality of the components includes the at least one component to be counted and at least one component not to be counted,
wherein the circuitry is configured to:
transmit to a user terminal through a communication network, input screen information for displaying an input screen on a display of the user terminal, the input screen associating the billing setting information indicating the billing destination with the plurality of the components included in the predetermined workflow; and
in response to receiving information that is generated according to an operation on the input screen displayed on the display of the user terminal based on the input screen information, set, based on the information, the at least one component that is to be counted among the plurality of the components.

2. The information processing apparatus of claim 1, wherein the circuitry is further configured to:
receive tenant identification information transmitted by the user terminal for identifying a tenant allowed to execute the predetermined workflow; and
set the predetermined workflow by associating the tenant identification information with the billing setting information.

3. The information processing apparatus of claim 1, wherein the circuitry is further configured to, based on tenant identification information and workflow identification information for identifying the workflow transmitted by the user terminal, generate the input screen information for displaying the input screen on the display of the user terminal.

4. The information processing apparatus of claim 1, wherein the circuitry is further configured to count the usage history of the component included in the predetermined workflow as usage information associated with the billing destination.

5. The information processing apparatus of claim 1, wherein the circuitry is further configured to transmit to one or more user terminals including the user terminal, a notice indicating that the billing setting information and the component are associated with each other, before the predetermined workflow is executed.

6. The information processing apparatus of claim 1, wherein the circuitry is further configured to determine whether the component is associated with the billing destination before the predetermined workflow is executed.

7. The information processing apparatus of claim 6, wherein the circuitry is further configured to, based on a determination that the component is not associated with the billing destination, transmit a notice prompting to set the billing destination to a predetermined apparatus that executes processing.

8. The information processing apparatus of claim 1, wherein the circuitry is further configured to set at least one of a character string in which a variable indicating a count value as a usage history of the component is embedded, or an explanatory note relating to the execution of the component, at a communication terminal for transmitting input information for setting the predetermined workflow.

9. The information processing apparatus of claim 8, wherein the circuitry is further configured to set the explanatory note by replacing the variable with the count value actually counted.

10. The information processing apparatus of claim 1, wherein the predetermined workflow includes a function related to an electronic file as the component.

11. The information processing apparatus of claim 10, wherein the function includes at least one of printing, scanning, facsimile transmission, data format conversion, email delivery, OCR processing, file processing, compression, decompression, or storage in a repository.

12. The information processing apparatus of claim 1, wherein the billing destination includes identification information of a department to be billed for the execution of the component included in the predetermined workflow.

13. An information processing method comprising:
executing a predetermined workflow including a plurality of components;
receiving the predetermined workflow and billing setting information indicating a billing destination, the billing setting information being selected by a user, and the billing destination being a target to be billed for an execution of the component included in the predetermined workflow;
storing the predetermined workflow received in association with the billing setting information indicating the billing destination;
identifying at least one component to be counted among the plurality of the components that are executed in the predetermined workflow, and
counting, in association with the billing destination for the component, usage history of the at least one component that is to be counted wherein the plurality of the components includes the at least one component to be counted and at least one component not to be counted, wherein the method further comprises:

transmitting to a user terminal through a communication network, input screen information for displaying an input screen on a display of the user terminal, the input screen associating the billing setting information indicating the billing destination with the plurality of the components included in the predetermined workflow; and in response to receiving information that is generated according to an operation on the input screen displayed on the display of the user terminal based on the input screen information, setting, based on the information, the at least one component that is to be counted among the plurality of the components.

\* \* \* \* \*